United States Patent
Wu et al.

(10) Patent No.: US 12,050,831 B2
(45) Date of Patent: Jul. 30, 2024

(54) DISPLAY METHOD AND ELECTRONIC DEVICE

(71) Applicant: Huawei Technologies Co., Ltd., Shenzhen (CN)

(72) Inventors: Fuyao Wu, Shenzhen (CN); Kang Li, Shenzhen (CN); Shouyu Wang, Shenzhen (CN); Xue Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 17/691,908

(22) Filed: Mar. 10, 2022

(65) Prior Publication Data

US 2022/0269463 A1    Aug. 25, 2022

Related U.S. Application Data

(63) Continuation of application No. PCT/CN2020/099463, filed on Jun. 30, 2020.

(30) Foreign Application Priority Data

Sep. 10, 2019 (CN) .......................... 201910854073.X

(51) Int. Cl.
*G06F 3/14* (2006.01)
(52) U.S. Cl.
CPC ........................................ *G06F 3/14* (2013.01)
(58) Field of Classification Search
CPC ............................ G09G 2380/02; G09G 3/035
See application file for complete search history.

(56) References Cited

U.S. PATENT DOCUMENTS

| 10,254,863 | B2 * | 4/2019 | Shin ...................... G06F 3/041 |
| 2012/0235894 | A1 * | 9/2012 | Phillips .................. G09G 3/36 |
| | | | 345/156 |

(Continued)

FOREIGN PATENT DOCUMENTS

| CN | 105320352 A | 2/2016 |
| CN | 106933330 A | 7/2017 |

(Continued)

OTHER PUBLICATIONS

Ouyang Autumn Leaves et al., "Huawei Mate X real machine trial. The animation of the folding switch is directly stretched, which is a really good experience," from Weibo Video Number, Total 3 pages, https://m.weibo.cn/detail/4430619893112974 (Oct. 23, 2019).

(Continued)

*Primary Examiner* — Samantha (Yuehan) Wang
(74) *Attorney, Agent, or Firm* — Leydig, Voit & Mayer, Ltd.

(57) ABSTRACT

This application provides a display method and an electronic device. In the method, in a state switching process of a foldable display screen of the electronic device, the electronic device may display a target interface whose size changes on the foldable display screen. According to the application, smooth transition of interface switching in the state switching process of the foldable display screen can be achieved, so that a visual effect in which a size change of the target interface coincides an actual state switching process of the foldable display screen is implemented, thereby improving visual experience of a user.

20 Claims, 44 Drawing Sheets

Expanded state

Folded state

Screen drawing area

(56) References Cited

U.S. PATENT DOCUMENTS

2014/0218375 A1    8/2014   Kim
2018/0342226 A1   11/2018   Shin et al.

FOREIGN PATENT DOCUMENTS

| CN | 107980158 A | 5/2018 |
| --- | --- | --- |
| CN | 108064371 A | 5/2018 |
| CN | 108766235 A | 11/2018 |
| CN | 110119295 A | 8/2019 |
| CN | 110673697 A | 1/2020 |

OTHER PUBLICATIONS

Royole Technology et al., "Royole flexible screen folding mobile phone soft pie," Total 3 pages, https://www.bilibili.com/video/av43609254/?spm_id_from=trigger_reload (Feb. 15, 2019).

Android Developers et al., "Build apps for foldable devices," Total 17 pages, https://developer.android.google.cn/guide/topics/ui/foldables (Last Updated Sep. 8, 2022).

Android Developers et al., "Behavior change: Apps that target APIs 29 and beyond," Total 5 pages, https://developer.android.google.cn/about/versions/10/behavior-changes-10#foldables (Last Updated Dec. 27, 2019).

Tech Nirvana et al., "Huawei Mate X folding 5G mobile phone experience chicken eating game, the switching effect Is shocking, the media teacher direct call is too smooth it!," Total 2 pages, https://www.ixigua.com/6750878551731424520 (Published Oct. 23, 2019).

* cited by examiner

Expanded state  Folded state

Screen drawing area

Unfolded angle

CONT. FROM FIG. 3A(a)

CONT. FROM FIG. 3A(a)

Screen drawing area

TO FIG. 3A(c)

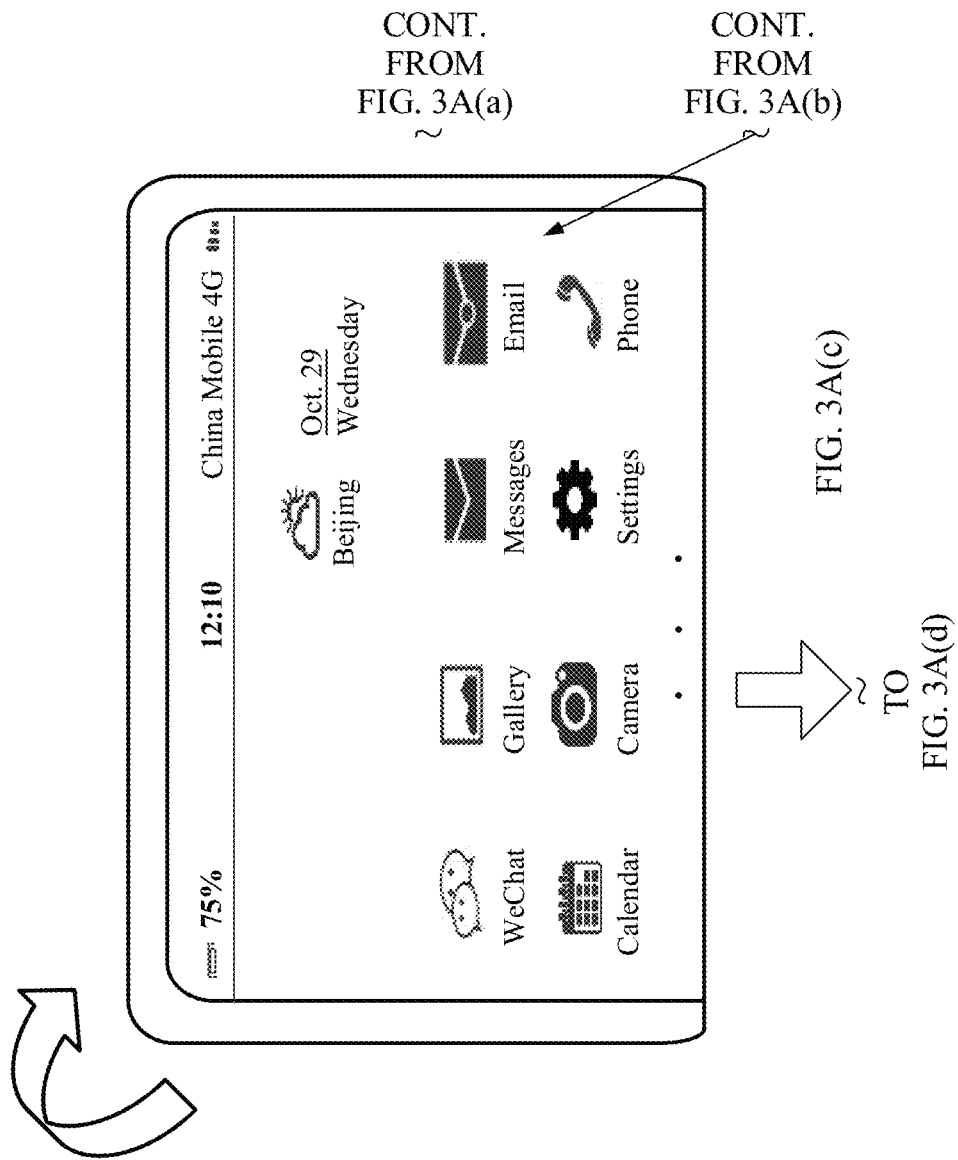

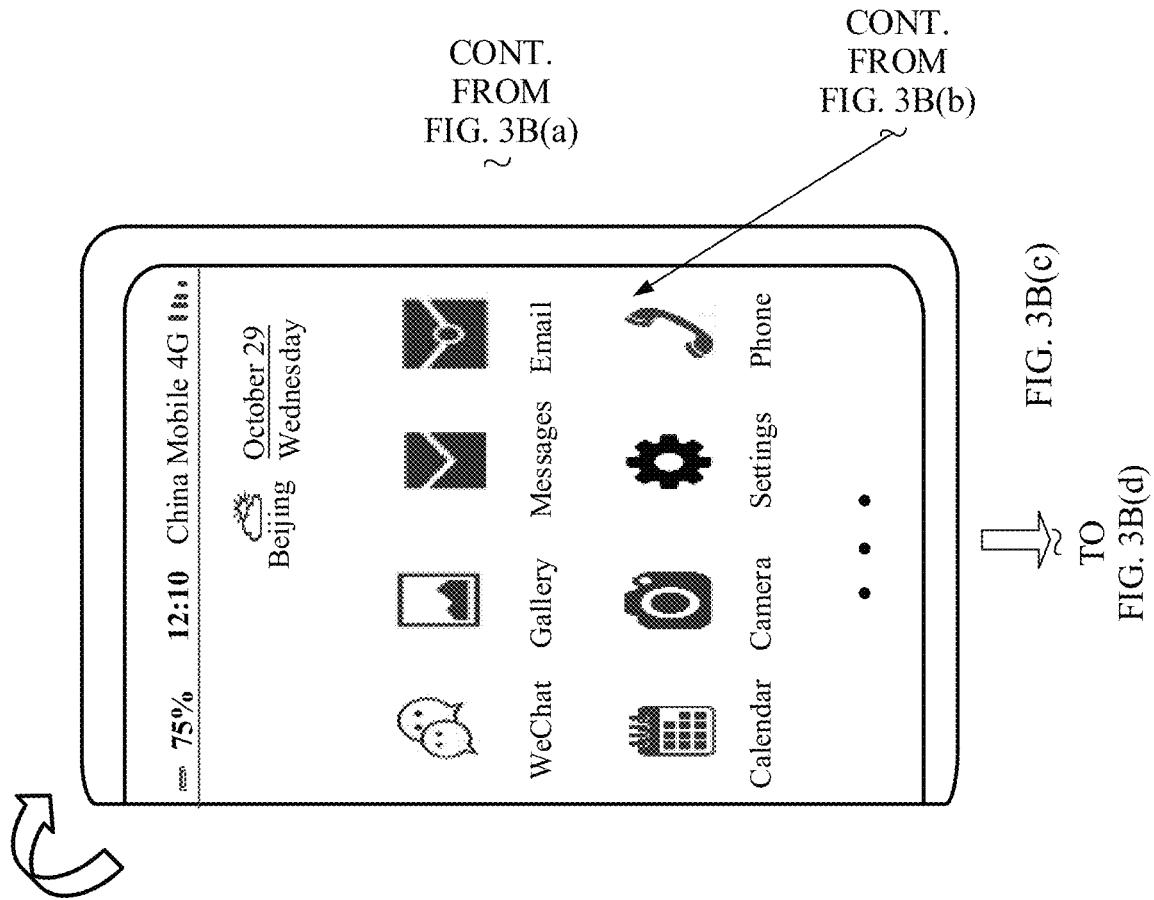

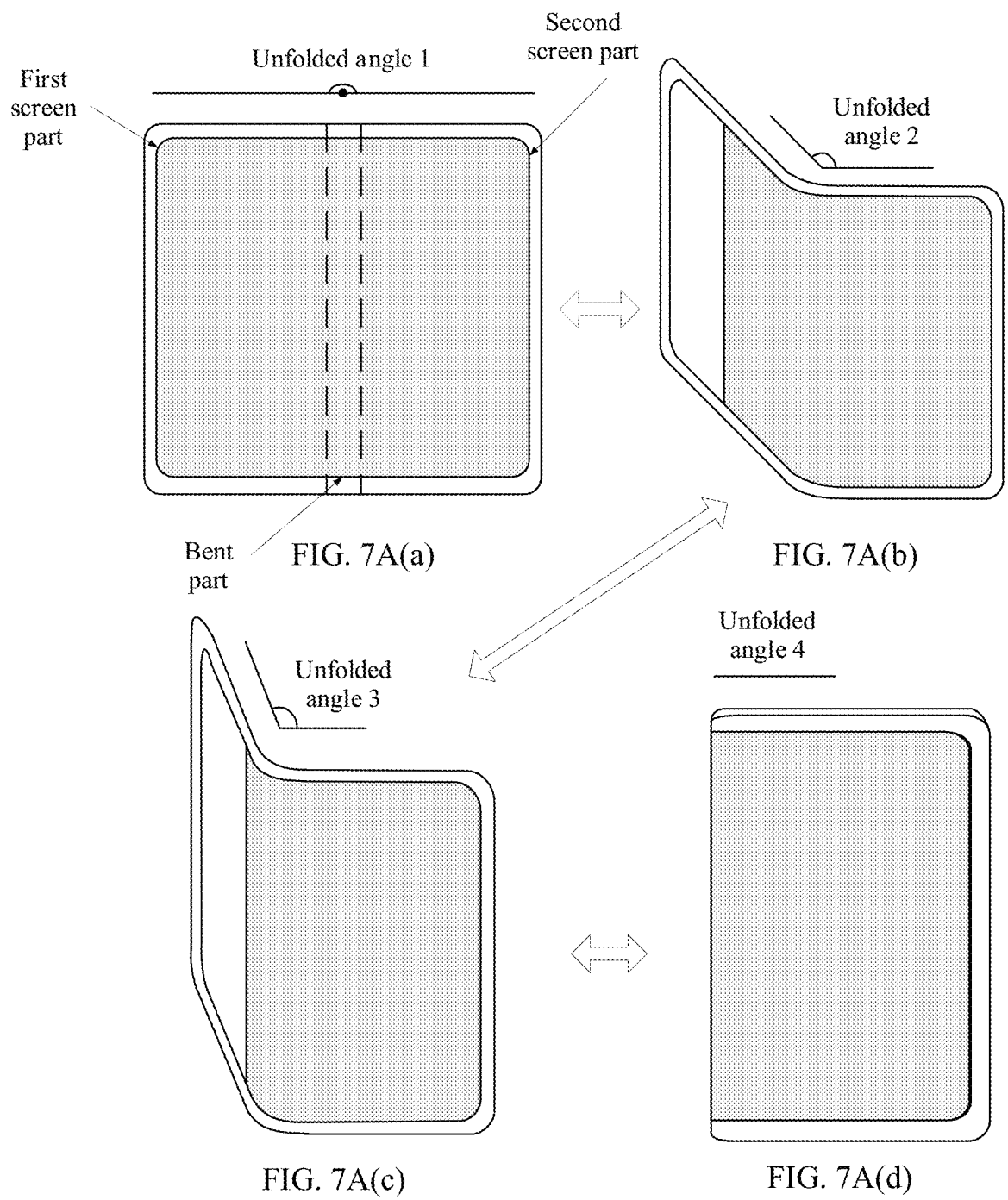

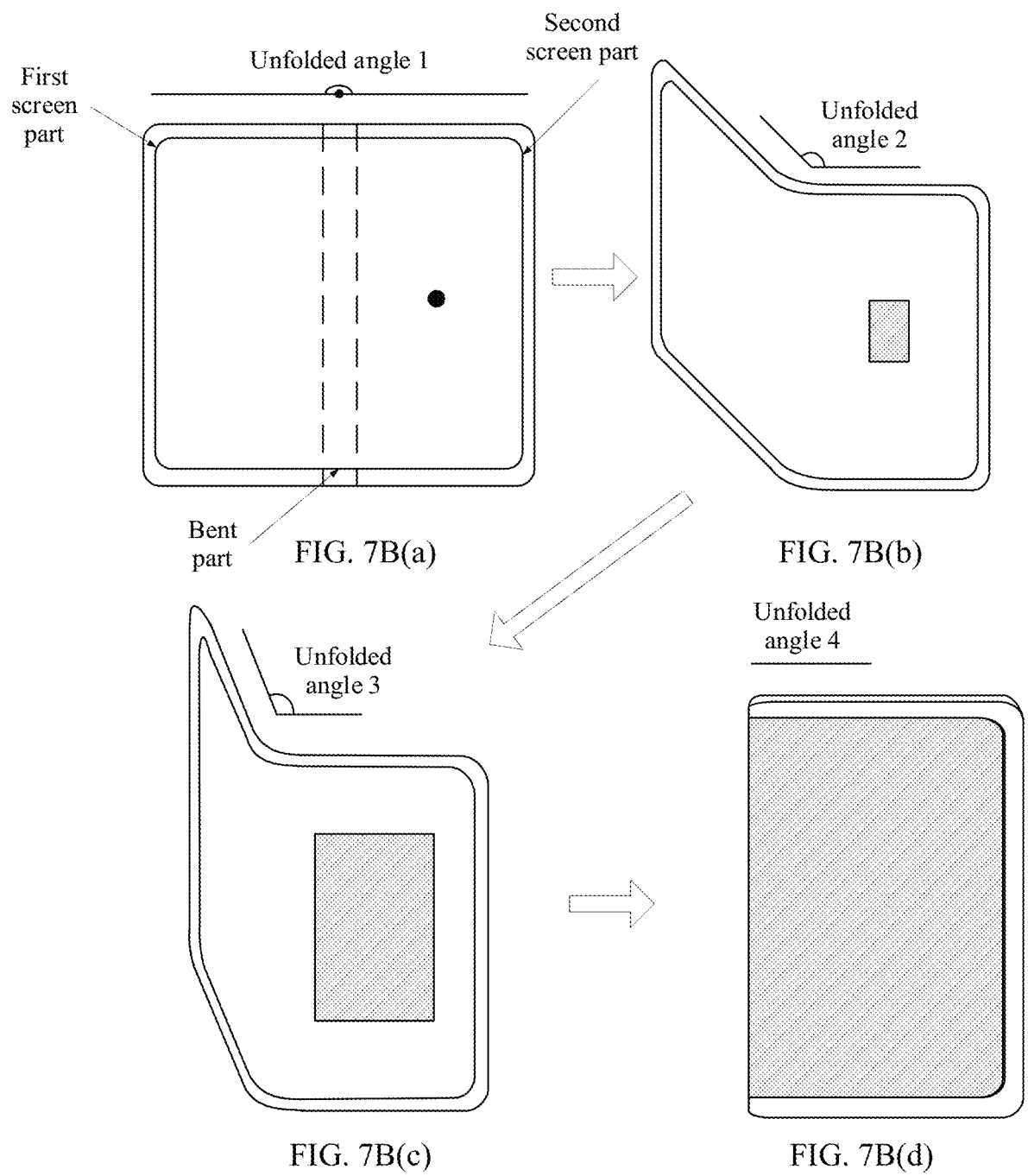

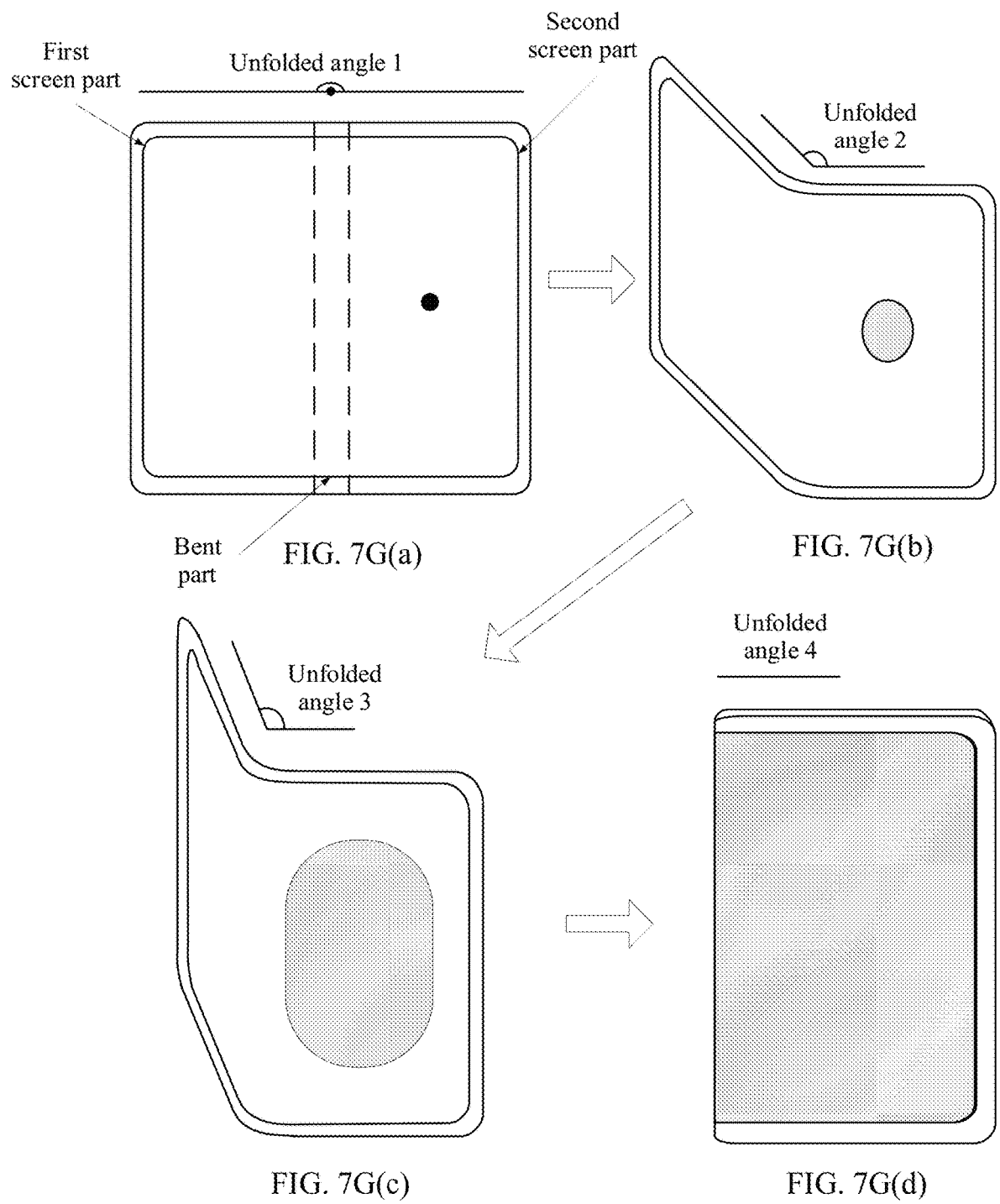

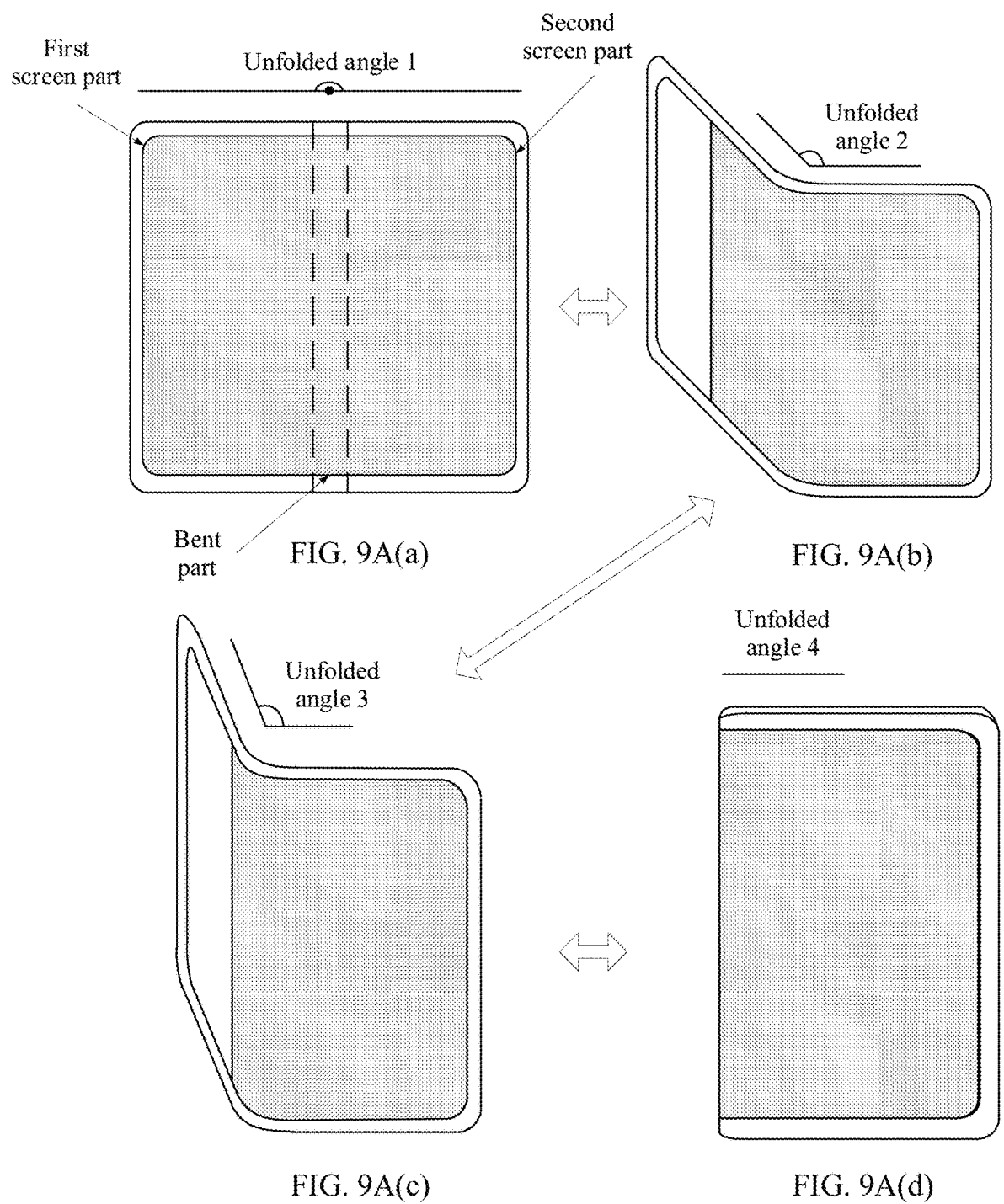

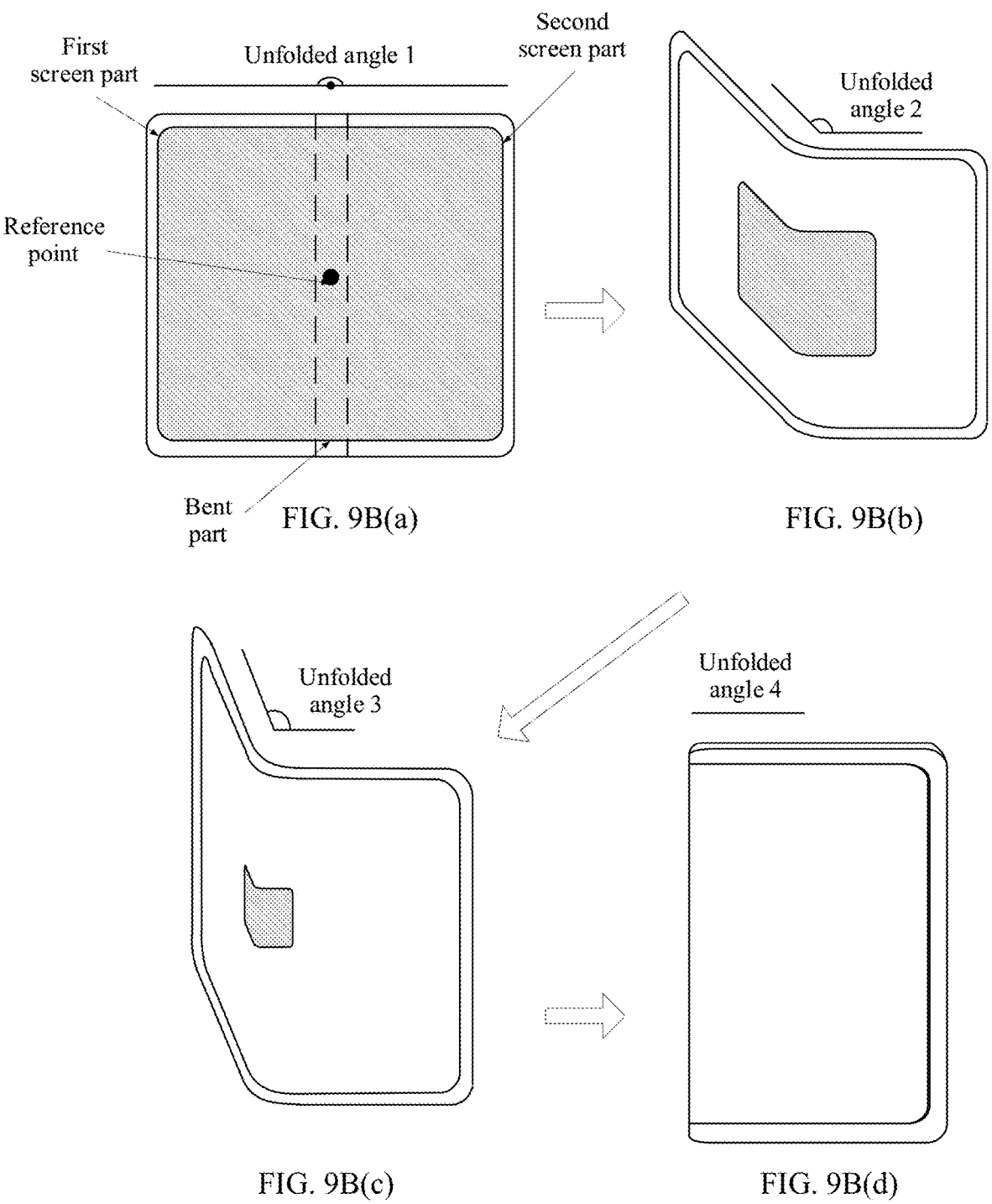

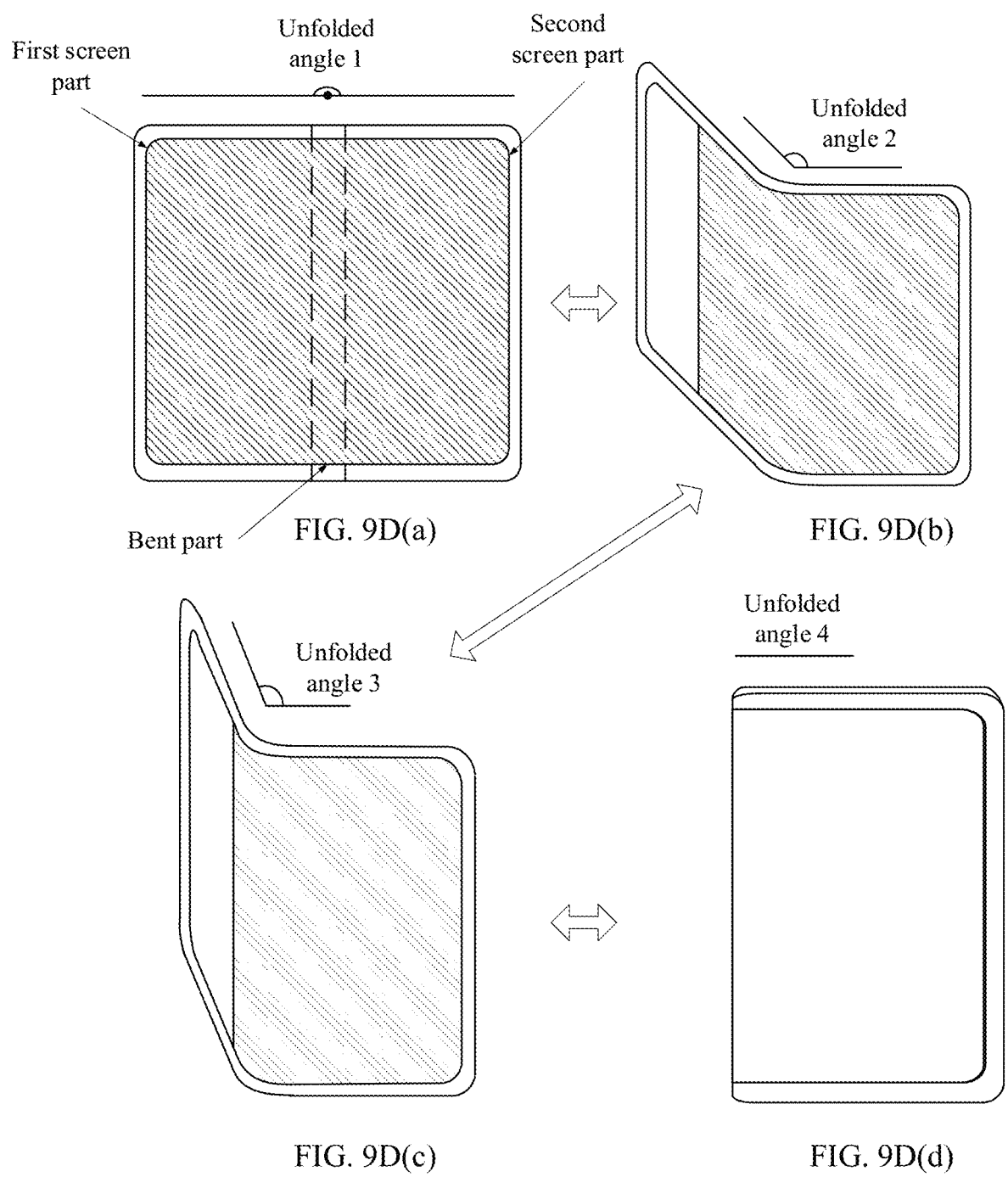

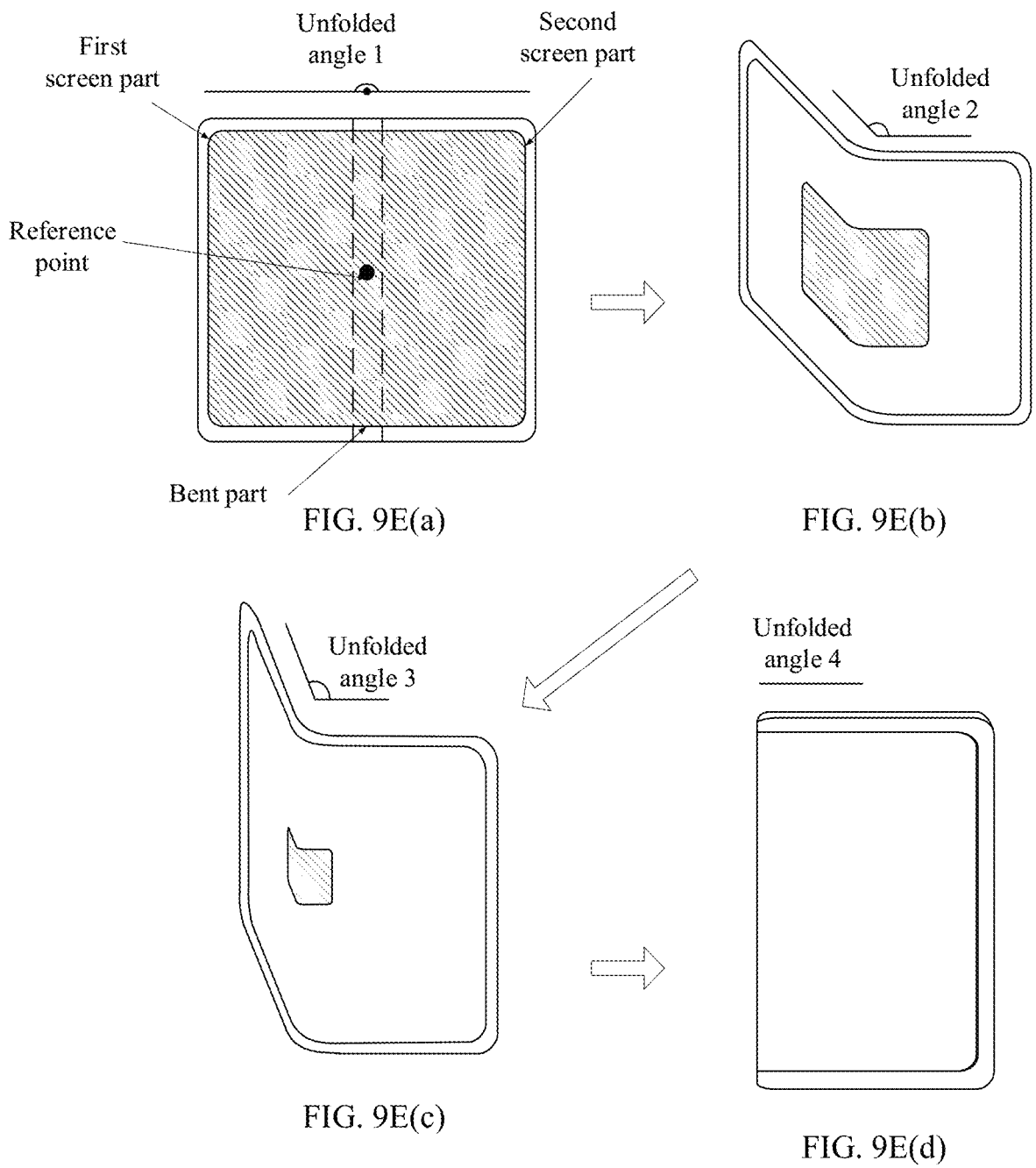

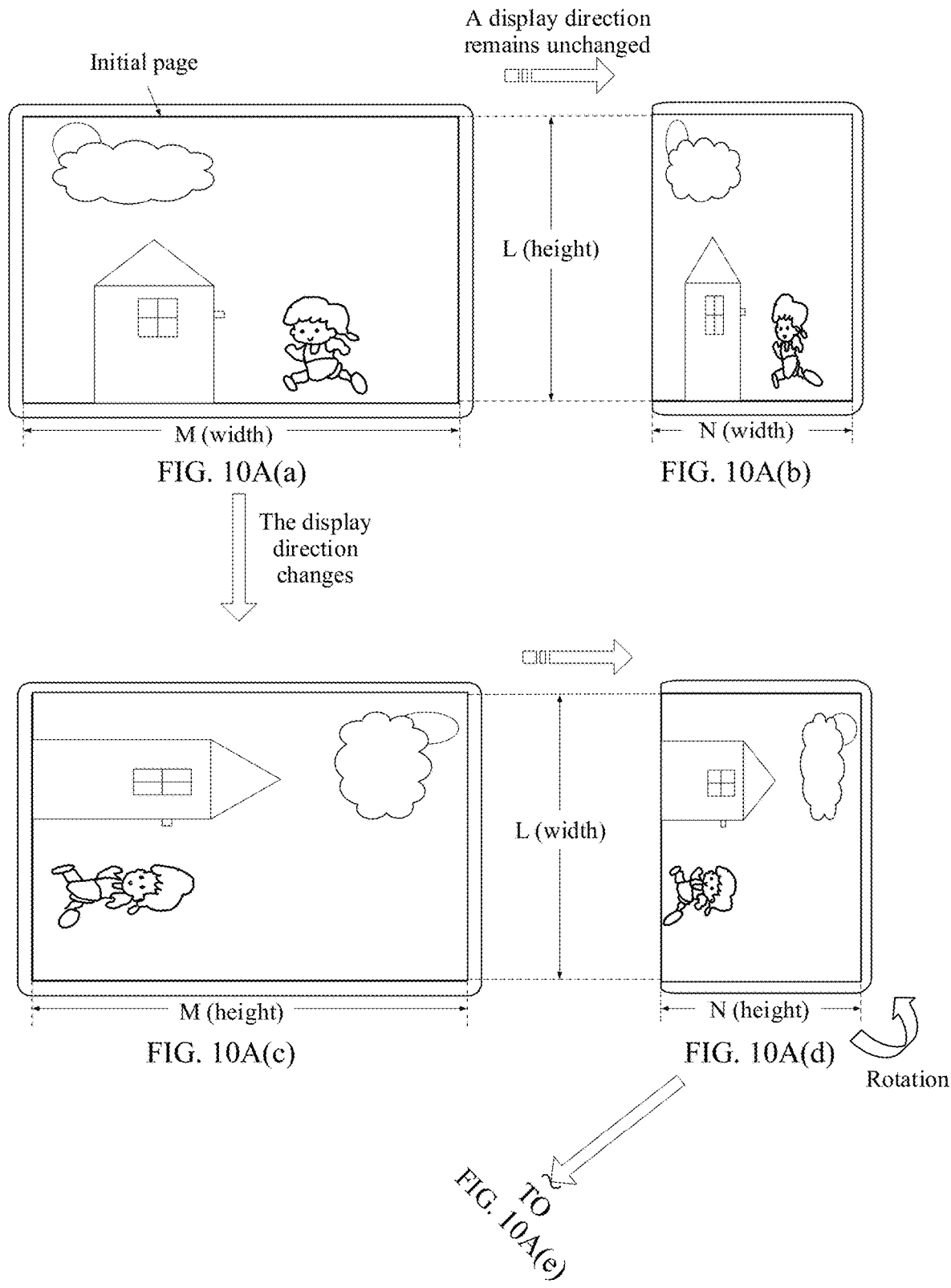

FIG. 10B(d)　　Rotation　　FIG. 10B(c)

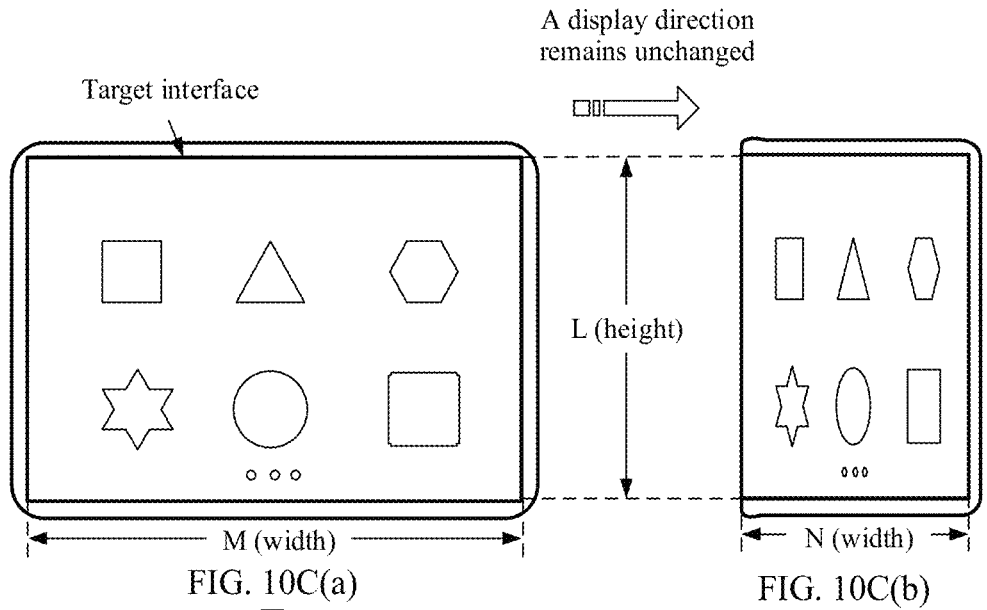
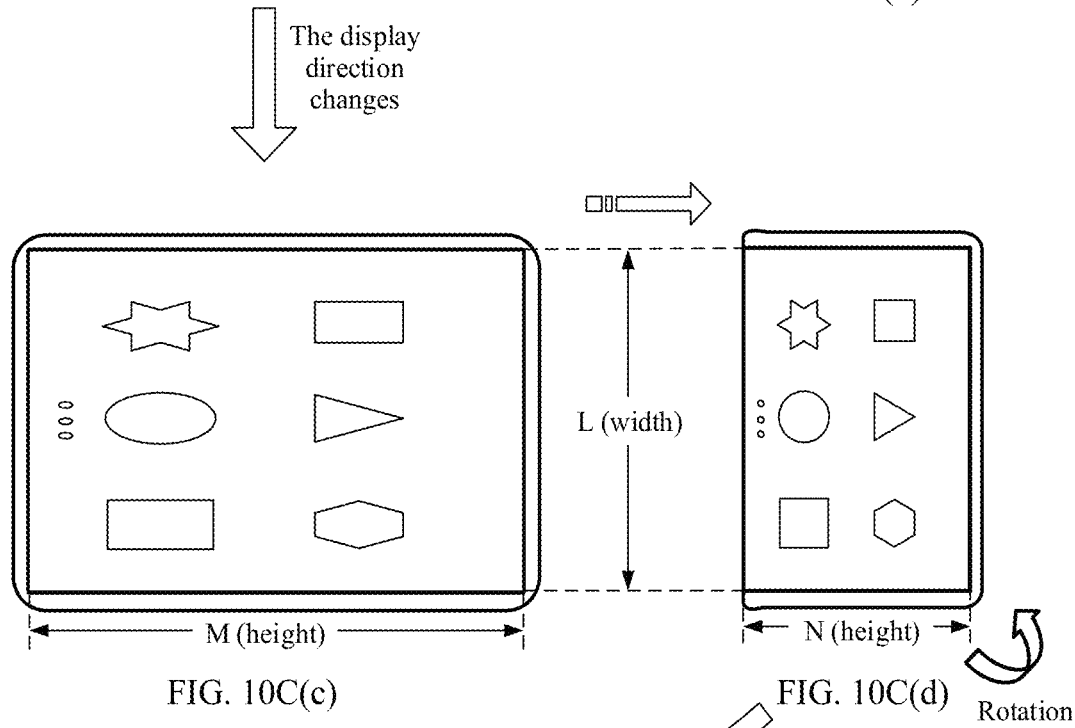
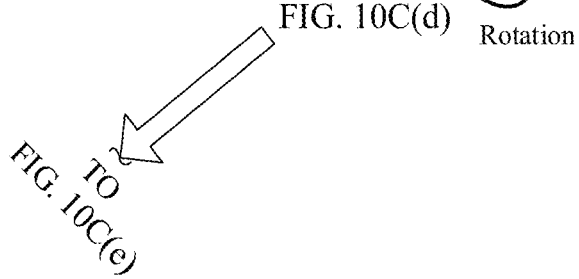

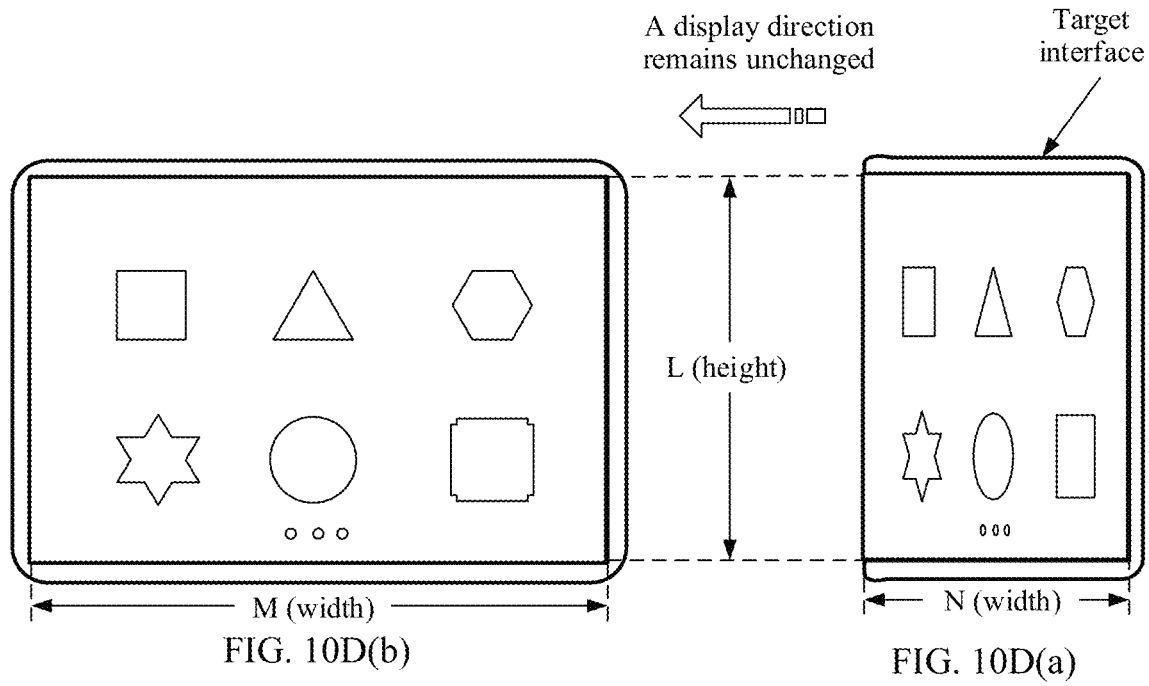
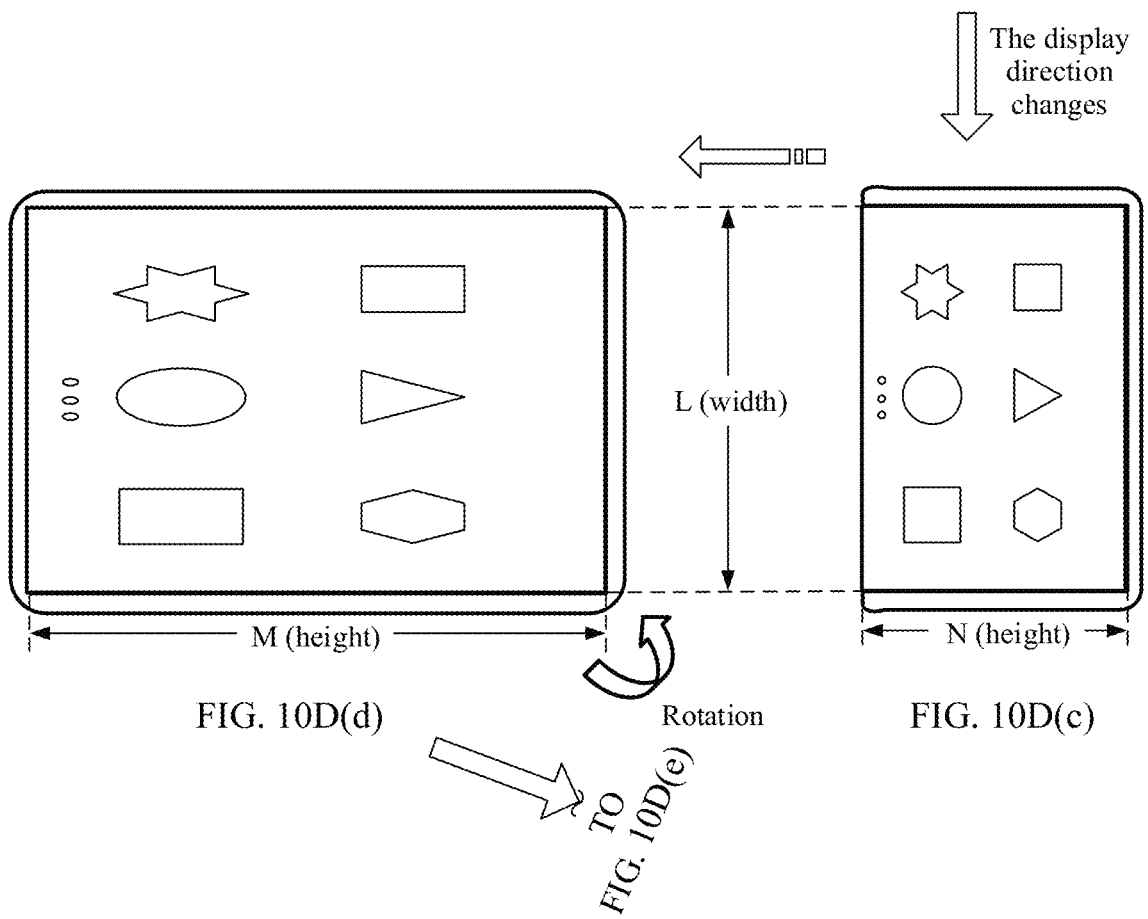
FIG. 10D(b)  FIG. 10D(a)
FIG. 10D(d)  FIG. 10D(c)

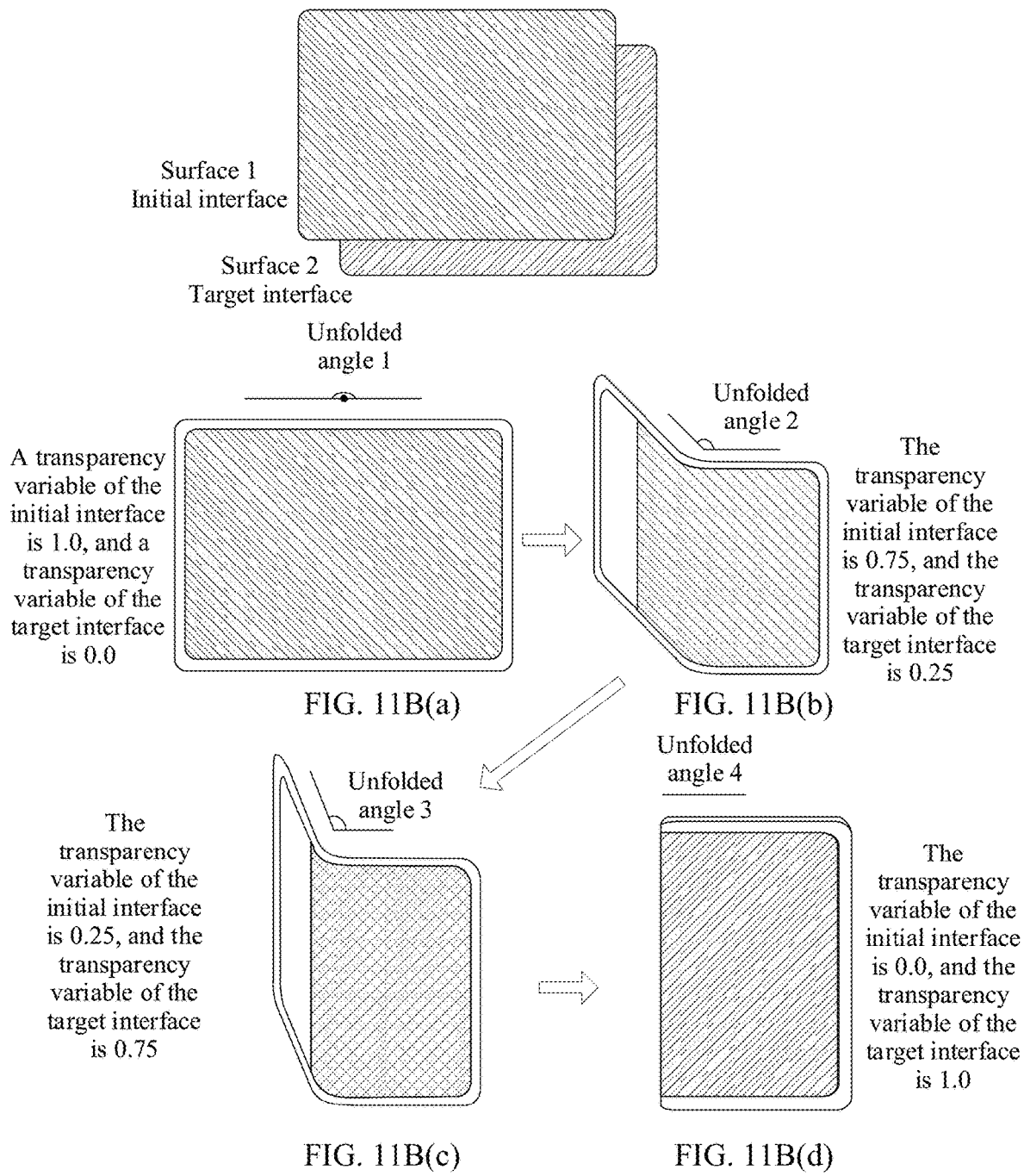

DISPLAY METHOD AND ELECTRONIC DEVICE

CROSS-REFERENCE TO RELATED APPLICATIONS

This application is a continuation of International Application No. PCT/CN2020/099463, filed on Jun. 30, 2020, which claims priority to Chinese Patent Application No. 201910854073.X, filed on Sep. 10, 2019. The disclosures of the aforementioned applications are hereby incorporated by reference in their entireties.

TECHNICAL FIELD

Embodiments of this application relate to computer technologies, and in particular, to a display method, an electronic device, and the like.

BACKGROUND

Currently, electronic devices are technically developing toward foldable display screens with advantages such as convenience in carrying the electronic devices and a large screen size. The foldable display screen has different screen drawing areas (areas for displaying an interface on the screen) visible to a user on a front side in an unfolded state and a folded state.

For example, for a mobile phone with a foldable display screen shown in FIG. 1, a left diagram shows a screen drawing area visible to a user on a front side in an unfolded state of the foldable display screen, and the current screen drawing area is the entire screen. A right diagram shows a screen drawing area visible to a user on a front side in a folded state of the foldable display screen, and the current screen drawing area is a right half part of the screen.

Generally, in a process in which a user folds or unfolds a foldable display screen of an electronic device, to achieve consistency between operation and vision, a screen drawing area of the electronic device displays a presentation of a dynamic display effect of folding or unfolding.

Currently, the dynamic display effect is generally implemented by transparent gradient. An animation process of a state change of the foldable display screen may be divided into an exit animation and an entry animation. The exit animation is a process in which a current interface is visible to invisible. The entry animation is a process in which an interface to be displayed to the user is invisible to visible. When a state of the foldable display screen changes, the electronic device first executes the exit animation, and then executes the entry animation after the exit animation ends.

For example, in a process in which the foldable display screen of the electronic device changes from an unfolded state to a folded state, the electronic device captures a screenshot of a current interface in the unfolded state, and then displays the screenshot. In a display process, an exit animation of gradually decreasing transparency from 1.0 to 0.0 is performed on the screenshot. When the transparency of the screenshot is 0.0, the exit animation ends. Then, the electronic device displays a window in the folded state. In a display process, an entry animation of gradually increasing transparency from 0.0 to 1.0 is performed on the window. When the transparency of the window is 1.0, the entry animation ends, and an animation process of the state change of the foldable display screen ends.

It can be learned from the foregoing example that, in the conventional animation display process of the state change of the foldable display screen, when the exit animation ends and the entry animation just starts, transparency of all elements (the screenshot of the current interface in the original state and the window in the target state) in an interface displayed by the electronic device is 0.0. As a result, the screen is completely dark. Therefore, in the animation process of the state change of the foldable display screen, the interface is visually presented to the user with a feeling of being dark for a little while, and a display effect is undiversified and inflexible, so that visual experience of the user is poor.

SUMMARY

This application provides a display method and an electronic device, to achieve a smooth transition of interface switching in a state switching process of a foldable display screen, and improve visual experience of a user.

According to a first aspect, an embodiment of this application provides a display method. The method is applied to an electronic device equipped with a foldable display screen. The method includes: The electronic device displays a target interface whose size changes on the foldable display screen in a process in which the foldable display screen switches from a first state to a second state. When the first state is an unfolded state, the second state is a folded state. When the first state is the folded state, the second state is the unfolded state. The target interface is a first interface that needs to be displayed after the foldable display screen switches to the second state.

According to the method, a smooth transition of interface switching in the state switching process of the foldable display screen can be achieved, and a visual effect in which a size change of the target interface coincides with an actual state switching process of the foldable display screen is implemented, thereby improving visual experience of a user.

In a possible design, before state switching of the foldable display screen, the foldable display screen is in the first state and is displaying an initial interface. In this way, it can be ensured that the foldable display screen switches from displaying the initial interface to displaying the target interface in the state switching process, and the size of the target interface changes as the state switching process progresses. Therefore, in the method, a smooth transition of interface switching in the state switching process of the foldable display screen can be achieved, so that a visual effect in which a size change of the target interface coincides with an actual state switching process of the foldable display screen is implemented, thereby improving visual experience of a user.

In a possible design, in the state switching process of the foldable display screen, when displaying the target interface whose size changes on the foldable display screen, the electronic device may further control the target interface to generate at least one of the following dynamic changes, so as to diversify a display effect of the target interface: A. a gradual transparency change from transparent to opaque; B. a color change; and C. a shape change.

In a possible design, the size change of the target interface may be, but not limited to, the following manners:

A first manner is gradually changing from a size adapted to the first state to a size adapted to the second state.

A second manner is gradually changing from a preset interface size to the size adapted to the second state.

In a possible design, in the process in which the foldable display screen switches from the first state to the second state, the electronic device may further display an initial interface that dynamically changes on the foldable display screen. The initial interface is a last interface displayed in the first state before the state switching of the foldable display screen.

According to the design, a smooth transition of interface switching in the state switching process of the foldable display screen can be achieved, and a visual effect in which a size change of the target interface and a dynamic change of the initial interface coincide with an actual state switching process of the foldable display screen is implemented, thereby improving visual experience of a user.

In a possible design, the dynamic change of the initial interface may be, but not limited to, any one or a combination of the following manners: A. a size change; B. a gradual transparency change from opaque to transparent; C. a color change; and D. a shape change. In this way, the electronic device may display the initial interface that flexibly and dynamically changes on the foldable display screen, to diversify a display effect of the initial interface.

In a possible design, a time at which the electronic device displays the initial interface that dynamically changes overlaps a time at which the electronic device displays the target interface whose size changes. For a specific overlap manner, refer to FIG. 8(c) to FIG. 8(e).

In a possible design, the size change of the initial interface may be, but not limited to, the following manners:

A first manner is gradually changing from the size adapted to the first state to the size adapted to the second state.

A second manner is gradually shrinking from the size adapted to the first state until disappearing.

In a possible design, when the size change of the target interface/initial interface is gradually changing from the size adapted to the first state to the size adapted to the second state, the electronic device may display the target interface whose size changes on the foldable display screen by performing the following step: The electronic device displays the target interface/initial interface whose size changes on the foldable display screen based on a display ratio that gradually changes from a first ratio to a second ratio. The first ratio is a ratio between the size adapted to the first state and a default size of the target interface/initial interface, and the second ratio is a ratio between the size adapted to the second state and the default size of the target interface/initial interface.

In a possible design, when the size change of the target interface/initial interface is gradually changing from the size adapted to the first state to the size adapted to the second state, and the target interface/initial interface is displayed on a surface of the foldable display screen, the electronic device may display the target interface/initial interface whose size changes on the foldable display screen by using the following two implementations:

In one implementation, if the electronic device determines that the size of the target interface/initial interface is bound to/associated with a size of the surface, the electronic device may adjust the size of the surface on which the target interface/initial interface is displayed, to change the size of the target interface. To enable the target interface/initial interface to gradually change from the size adapted to the first state to the size adapted to the second state, the electronic device also needs to control the surface on which the target interface/initial interface is displayed to gradually change from the size adapted to the first state to the size adapted to the second state.

In the other implementation, if the electronic device determines that the size of the target interface/initial interface is not bound to/associated with a size of a corresponding surface, the electronic device needs to adjust the size of the target interface/initial interface, and displays the target interface/initial interface whose size changes on the corresponding surface.

In some cases, when a current size of the surface (a size of the surface in the first state of the foldable display screen) is enough to display the target interface/initial interface adapted to the size of the second state (for example, when the foldable display screen switches from the unfolded state to the folded state), to improve efficiency and reduce power consumption, the electronic device may not adjust the size of the surface, that is, adjust only the size of the target interface/initial interface.

In some other cases, when a current size of the surface is not enough to display the target interface/initial interface adapted to the size of the second state (for example, when the foldable display screen switches from the folded state to the unfolded state), the electronic device may directly adjust, at a start moment of the state switching process, the size of the surface to the size adapted to the second state. The size adapted to the second state is a size of a screen that is in the foldable display screen and that is in a displaying state in the second state, and when the second state is the unfolded state, the size adapted to the second state may be a size of a full screen.

In still some other cases, to ensure a display effect of the target interface/initial interface, the electronic device may adjust the size of the corresponding surface when adjusting the size of the target interface/initial interface. That is, the electronic device needs to control both the surface on which the target interface/initial interface is displayed and the target interface/initial interface to gradually change from the size adapted to the first state to the size adapted to the second state.

It should be noted that, in an implementation, the size of the surface is the same as a size of a screen drawing area in which the surface is located. Therefore, the electronic device may adjust the size of the surface by directly adjusting the size of the screen drawing area on the foldable display screen.

According to a second aspect, an embodiment of this application further provides an electronic device, including a unit or a module configured to perform steps in the first aspect.

According to a third aspect, this application provides an electronic device, including at least one processing element and at least one storage element. The at least one storage element is configured to store a program and data, and the at least one processing element is configured to perform the method provided in the first aspect of this application.

According to a fourth aspect, an embodiment of this application further provides a computer storage medium. The storage medium stores a software program; and when the software program is read and executed by one or more processors, the method provided in any one of the first aspect or the designs of the first aspect may be implemented.

According to a fifth aspect, an embodiment of this application further provides a computer program product including instructions. When the computer program product is run on a computer, the computer is enabled to perform the method provided in any one of the first aspect or the designs of the first aspect.

According to a sixth aspect, an embodiment of this application provides a chip system. The chip system includes a processor, configured to support an electronic device in implementing functions in the first aspect. In a possible design, the chip system further includes a memory, and the memory is configured to store program instructions and data that are necessary for an electronic device. The chip system may include a chip, or may include a chip and another discrete device.

According to a seventh aspect, an embodiment of this application further provides a graphical user interface on an electronic device. The electronic device has a foldable display screen, a memory, and a processor, the processor is configured to execute a computer program stored in the memory, and the graphical user interface includes a graphical user interface displayed when the electronic device performs the method according to the first aspect.

BRIEF DESCRIPTION OF DRAWINGS

FIG. 7A(a) to FIG. 7A(d) are example diagrams of a dynamic change of a target interface according to an embodiment of this application;

FIG. 7B(a) to FIG. 7B(d) are example diagrams of a dynamic change of a target interface according to an embodiment of this application;

FIG. 7G(a) to FIG. 7G(d) are example diagrams of a dynamic change of a target interface according to an embodiment of this application;

FIG. 9A(a) to FIG. 9A(d) are example diagrams of a dynamic change of a target interface according to an embodiment of this application;

FIG. 9B(a) to FIG. 9B(d) are example diagrams of a dynamic change of a target interface according to an embodiment of this application;

FIG. 9D(a) to FIG. 9D(d) are example diagrams of a dynamic change of a target interface according to an embodiment of this application;

FIG. 9E(a) to FIG. 9E(d) are example diagrams of a dynamic change of a target interface according to an embodiment of this application;

FIG. 11B(a) to FIG. 11B(d) are example diagrams of a display effect according to an embodiment of this application.

DESCRIPTION OF EMBODIMENTS

Figure 1:
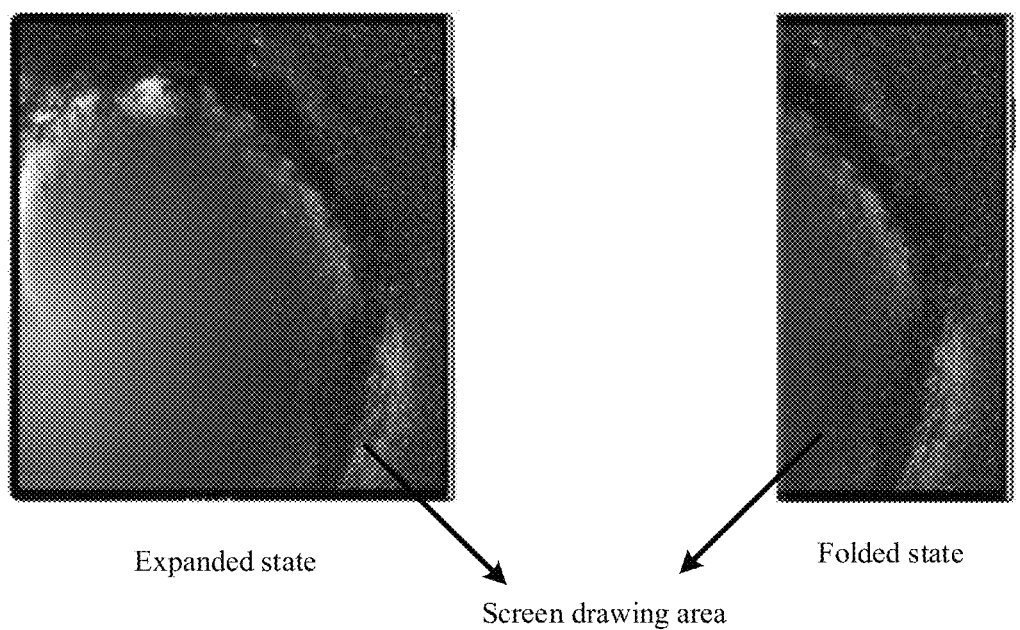
FIG. 1 is a schematic diagram of screen drawing areas of a foldable display screen of an electronic device in different states according to an embodiment of this application.

This application provides a display method and an electronic device, to achieve a smooth transition of interface switching in an animation display process of a state change of a foldable display screen, and improve visual experience of a user. The method and the electronic device are based on a same technical concept. Because the method and the electronic device have similar principles for resolving the problem, reference may be mutually made to implementations of the electronic device and the method. No repeated description is provided.

In the solution provided in embodiments of this application, in a state switching process of the foldable display screen of the electronic device, the electronic device may display a target interface whose size changes on the foldable display screen. In this way, according to the solution, a smooth transition of interface switching in the state switching process of the foldable display screen can be achieved, so that a visual effect in which a size change of the target interface coincides with an actual state switching process of the foldable display screen is implemented, thereby improving visual experience of a user.

In the following, some terms in this application are described, so as to help persons skilled in the art have a better understanding.

(1) The electronic device is a device that is equipped with a foldable display screen and can perform human-machine interaction by using the foldable display screen. For example, the electronic device may be a mobile phone, a tablet computer, a notebook computer, a netbook, a vehicle-mounted device, or a business intelligent terminal (including a video phone and an intelligent conference desktop terminal), a personal digital assistant (PDA), or an augmented reality (AR)\ virtual reality (VR) device. A specific form of the electronic device is not limited in this application.

(2) The foldable display screen is a screen whose form may be changed by external force, and includes at least two screen parts. Sizes of the screen parts may be different, or may be the same. In the following embodiments, a "screen" or a "screen part" refers to a part or a whole of the foldable display screen.

The screen part may be an independent and complete screen (or an independent display unit, for example, the screen can be controlled by a processor as a whole), or may be a part of a display area on a complete screen. The electronic device may separately control display states of different screen parts. Based on the control, a display state of each screen part may be specifically a display-enabled state (also referred to as a displaying state, for example, a screen-on state) or a display-disabled state (for example, a screen-off state).

Two adjacent screen parts may be movably connected based on a bent part (for example, a hinge or a flexible material). In some implementations, the bent part is also covered with a display screen (which may also be referred to as a connecting screen or a folding edge). In this way, different screen parts of the foldable display screen may be flatly unfolded based on external force (for example, unfolded by a user by hand) into a full screen for display, or may be folded based on external force (for example, folded by a user by hand) into a single screen for display. For example, the foldable display screen may perform display as an 8-inch bezel-less screen when unfolded into a full screen, and may perform display as a 6.6-inch or 6.38-inch screen part after folded.

In conclusion, the foldable display screen includes at least one bent part and a plurality of screen parts located on two sides of the bent part.

Figure 2A:
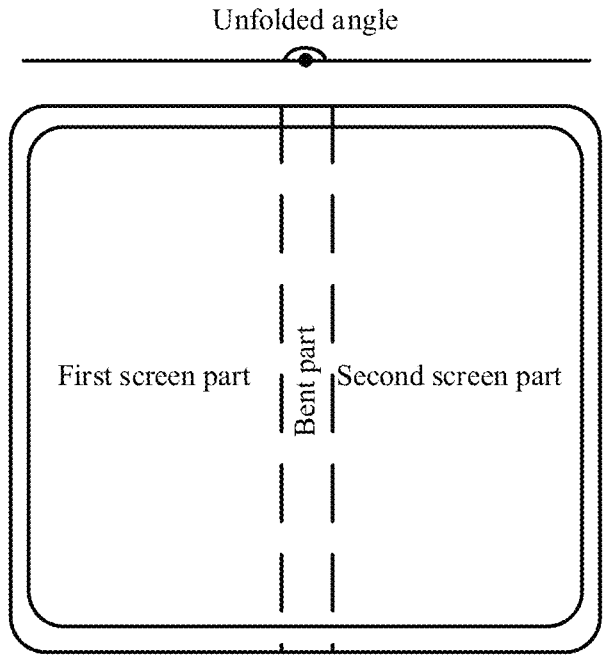
FIG. 2A(a) to FIG. 2A(d) are example diagrams of a foldable display screen according to an embodiment of this application.
Figure 2A:
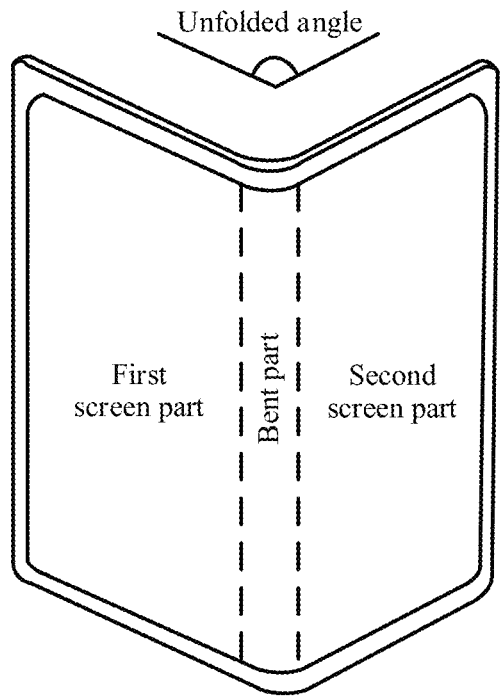
Figure 2A:
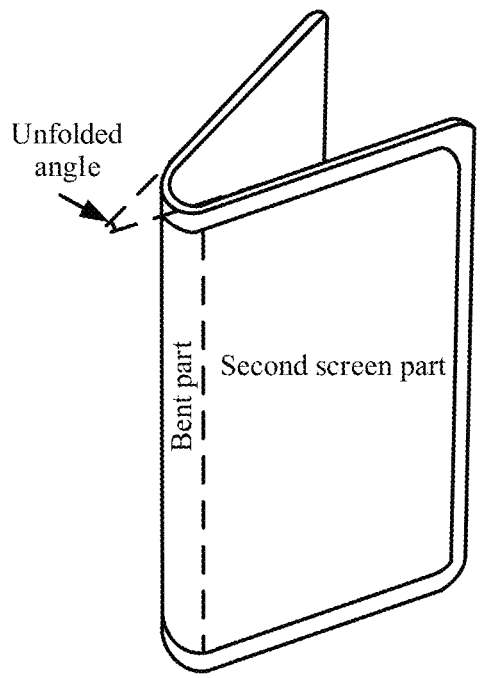
Figure 2A:
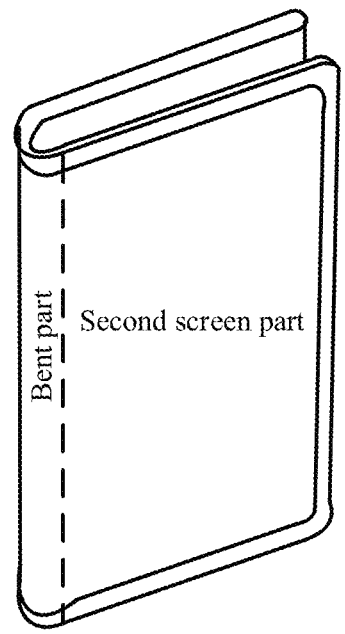

For example, referring to a foldable display screen shown in FIG. 2A, the foldable display screen has three parts: a bent part, and a first screen part and a second screen part on two sides of the bent part.

When the bent part is bent or deformed, an angle between the first screen part and the second screen part (referred to as an unfolded angle for short below) may change, as shown in FIG. 2A(b) and FIG. 2A(c).

In an actual application, the foldable display screen generally has two regular physical states: an unfolded state shown in FIG. 2A(a) and a folded state shown in FIG. 2A(d). In a state change process in which the foldable display screen switches from one regular state to the other regular state (referred to as a state change process below), the foldable display screen further presents a semi-folded intermediate state, as shown in FIG. 2A(b) and FIG. 2A(c).

In some embodiments, the electronic device may specifically determine a state of the foldable display screen by using the unfolded angle. For example, when the unfolded angle is within an interval (that is, a preset unfolded state condition) from a first threshold to 180 degrees, the electronic device determines that the state of the foldable display screen is the unfolded state. When the unfolded angle is within an interval (that is, a preset folded state condition) from 0 degree to a second threshold, the electronic device determines that the state of the foldable display screen is the folded state. When the unfolded angle is within an interval (that is, a preset intermediate state condition) from the second threshold to the first threshold, the electronic device determines that the state of the foldable display screen is the intermediate state, that is, the foldable display screen is in the state change process. A value of the first threshold is greater than a value of the second threshold, and the first threshold and the second threshold may be specifically set based on an actual application. For example, the first threshold is 180 degrees, 170 degrees, or 150 degrees, and the second threshold is 0 degree, 5 degrees, 45 degrees, or 90 degrees.

Figure 2B:
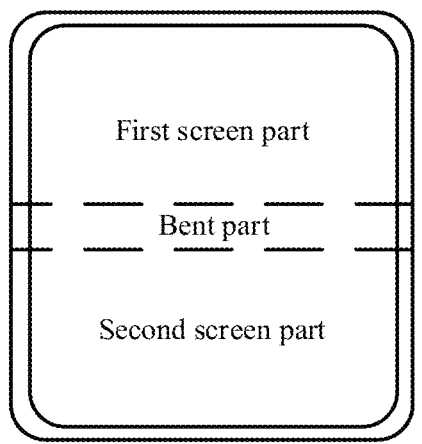
FIG. 2B(a) to FIG. 2B(d) are example diagrams of a foldable display screen according to an embodiment of this application.
Figure 2B:
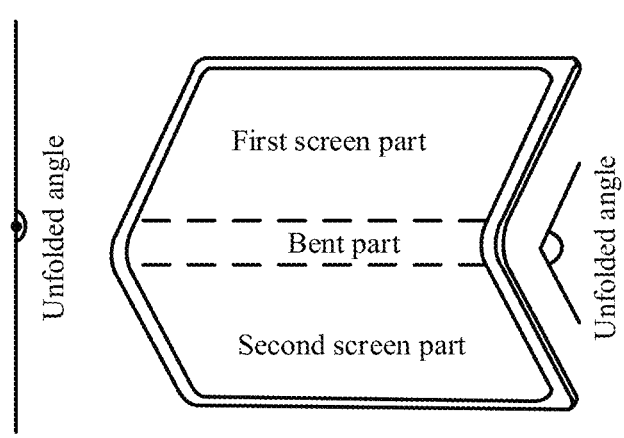
Figure 2B:
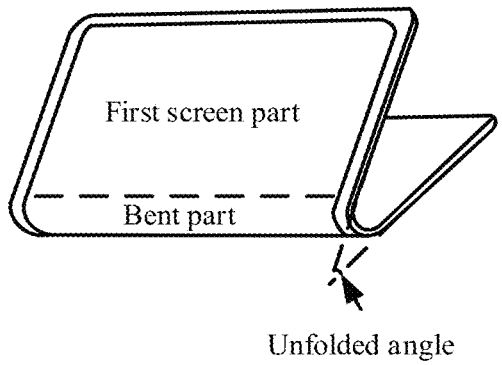
Figure 2B:
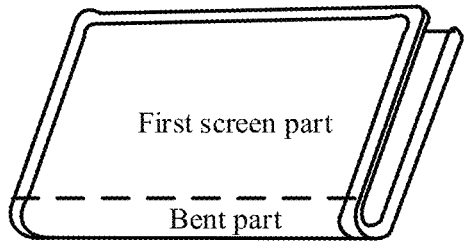

It should be further noted that in the example shown in FIG. 2A, a folding manner of the foldable display screen is left-right folding (that is, longitudinal folding). In some other embodiments, a folding manner of the foldable display screen may alternatively be up-down folding (that is, transverse folding), as shown in FIG. 2B. The folding manner of the foldable display screen is not limited in this application.

Generally, in a scenario in which the display method provided in this application is used, a user can view a screen (or a screen part) of the foldable display screen before and after state switching. In the following embodiments of this application, the method provided in this application is described by using outward folding as an example. The outward folding means that after the foldable display screen is folded, at least one screen part is visible on a front side and at least one screen part is on a back side. In other embodiments, the method provided in this application is not limited to being necessarily applied to an outward folding scenario.

A display state of the foldable display screen and a change of the display state are further described below by using the foldable display screen shown in FIG. 2A.

As shown in FIG. 2A(a), a state of the foldable display screen is the unfolded state. When the foldable display screen is in a working state (displaying state), the first screen part, the second screen part, and the bent part are all in the displaying state. In this way, the entire foldable display screen can be used to display content.

As shown in FIG. 2A(d), the state of the foldable display screen is the folded state. When the foldable display screen is in the working state, a default primary screen (for example, the second screen part) is in the displaying state and can display content, while a default secondary screen (for example, the first screen part) is in a non-displaying state, and displays no content, or is in the screen-off state. Certainly, the user may operate the electronic device, the primary screen, or the secondary screen (for example, flip over the electronic device or double-tap the secondary screen), to set the secondary screen to the displaying state and set the primary screen to the non-displaying state. The default primary screen and the default secondary screen in the foldable display screen may be set by the user based on an actual use situation, or may be set by default before the electronic device is delivered.

As shown in FIG. 2A(d), the state of the foldable display screen is the folded state. When the foldable display screen is in the working state, the electronic device may determine which screen part is visible to the user, for example, may detect, by using a camera located at a screen part, whether a face exists in front of the camera, or determine, by using an infrared sensor located at a screen part, whether the user exists in front of the infrared sensor, or it is determined based on an operation manner in which the user folds the foldable display screen. When determining that the second screen part is visible to the user, the electronic device sets the second screen part to the displaying state, so as to display content, and then sets the first screen part to the non-displaying state, so as not to display content, or to be in the screen-off state. In other embodiments, the first screen part may alternatively display content and/or have a capability to control the first screen part.

In some embodiments, in a scenario in which the foldable display screen is in the folded state shown in FIG. 2A(d), when setting a screen part to the displaying state, the electronic device may further set a bent part connected to the screen part to the displaying state, so as to display content.

In embodiments of this application, the display state of the foldable display screen changes as the state of the foldable display screen changes. For example, when the state and the display state of the foldable display screen are those shown in FIG. 2A(a), the user may perform a folding operation on the foldable display screen, so that the state and the display state of the foldable display screen change to those shown in FIG. 2A(d). For another example, when the state and the display state of the foldable display screen are those shown in FIG. 2A(d), the user may perform an unfolding operation on the foldable display screen, so that the state and the display state of the foldable display screen change to those shown in FIG. 2A(a).

Figure 2C:
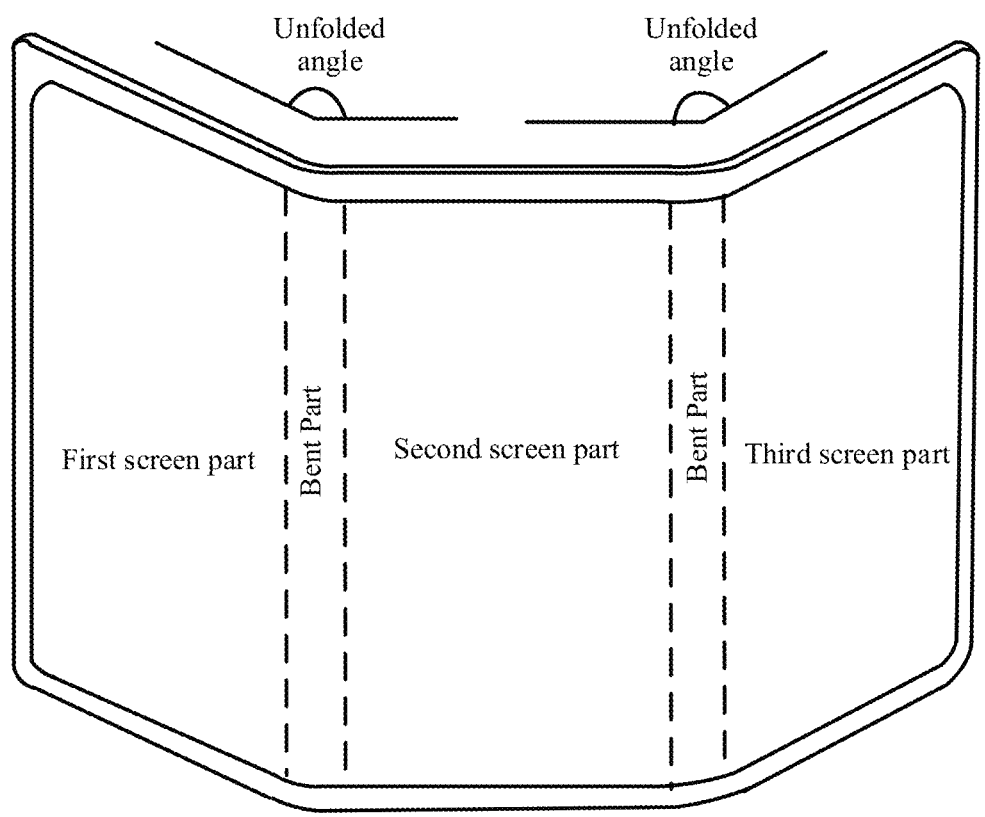
FIG. 2C is an example diagram of a foldable display screen according to an embodiment of this application.

It should be noted that the foldable display screens shown in FIG. 2A and FIG. 2B include two screen parts. The method provided in this application is also applicable to a foldable display screen having three or more screen parts, for example, a foldable display screen with three screen parts shown in FIG. 2C. When an unfolded angle between any two adjacent screen parts meets the preset folded state condition, a state of the foldable display screen is the folded state. When each two adjacent screen parts meet the preset unfolded state condition, a state of the foldable display screen is the unfolded state. Other cases fall within the intermediate state.

(3) A screen drawing area is located on a screen that is in the foldable display screen and that is in the displaying state, and is an area for drawing and displaying an interface. The screen drawing area may have a same size or different sizes and positions for different regular states of the foldable display screen. Generally, a size of the screen drawing area is the same as a size of a screen currently in the displaying state.

For example, when the foldable display screen is in the unfolded state, the size of the screen drawing area is the same as a size of the entire foldable display screen; and when the foldable display screen is in the folded state, the size of the screen drawing area is the same as a size of the primary screen, as shown in FIG. 1.

Figure 3A:
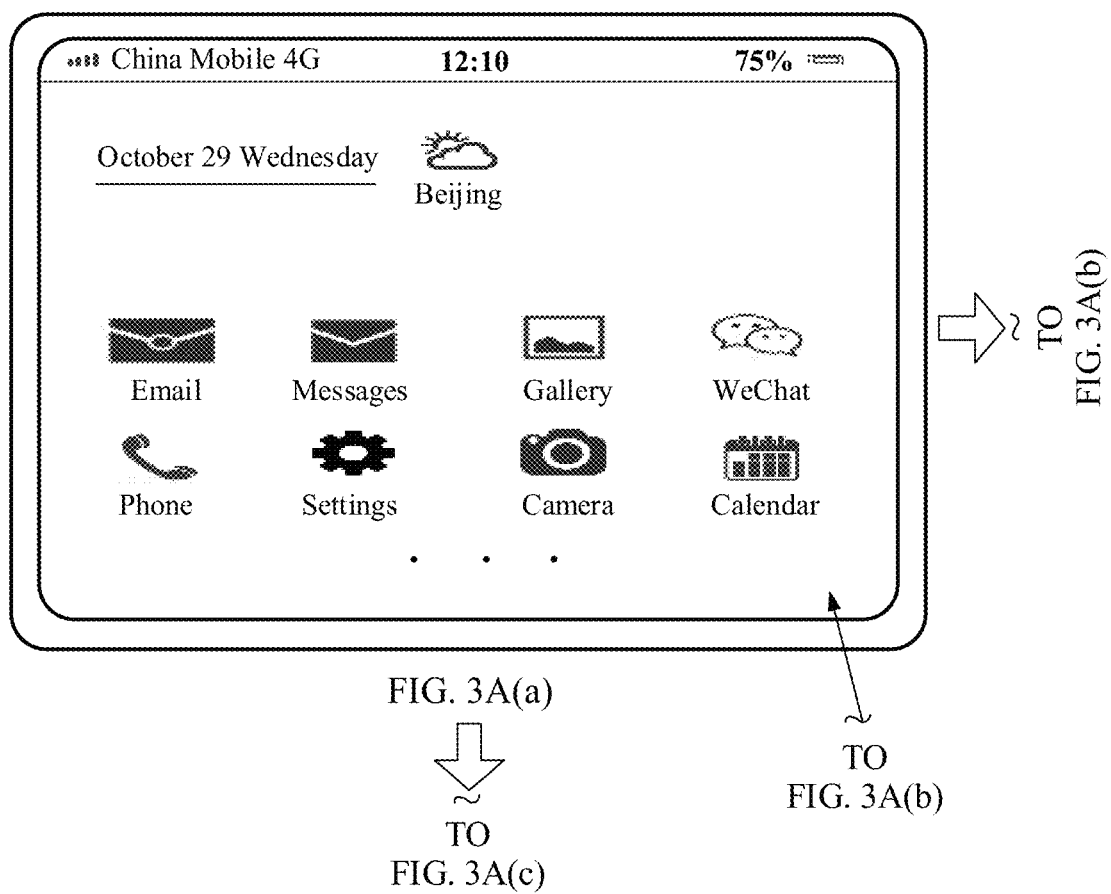
FIG. 3A(a) to FIG. 3A(d) are example diagrams of a screen drawing area according to an embodiment of this application.
Figure 3A:
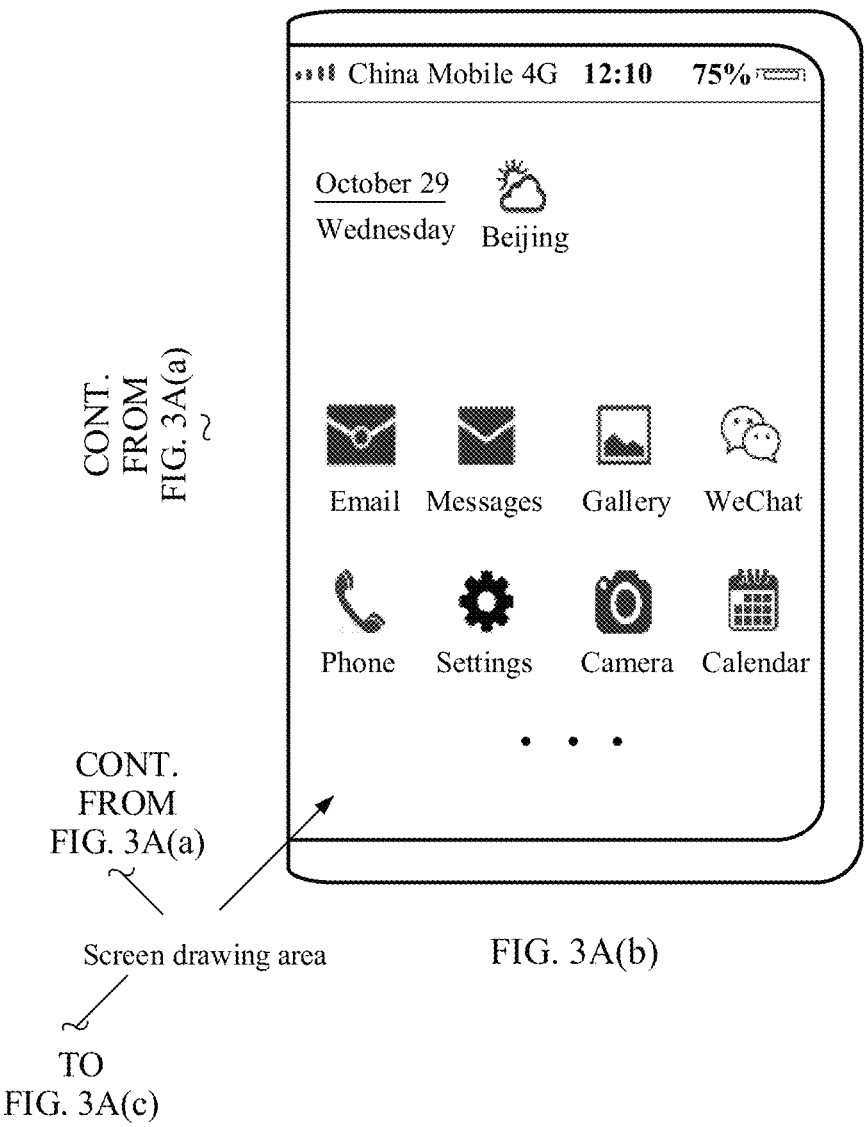
Figure 3A:
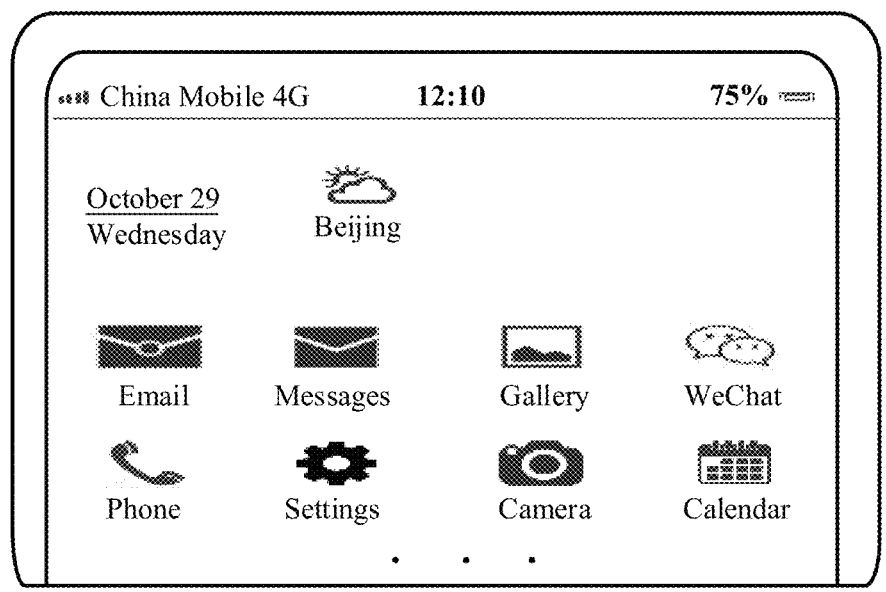
Figure 3B:
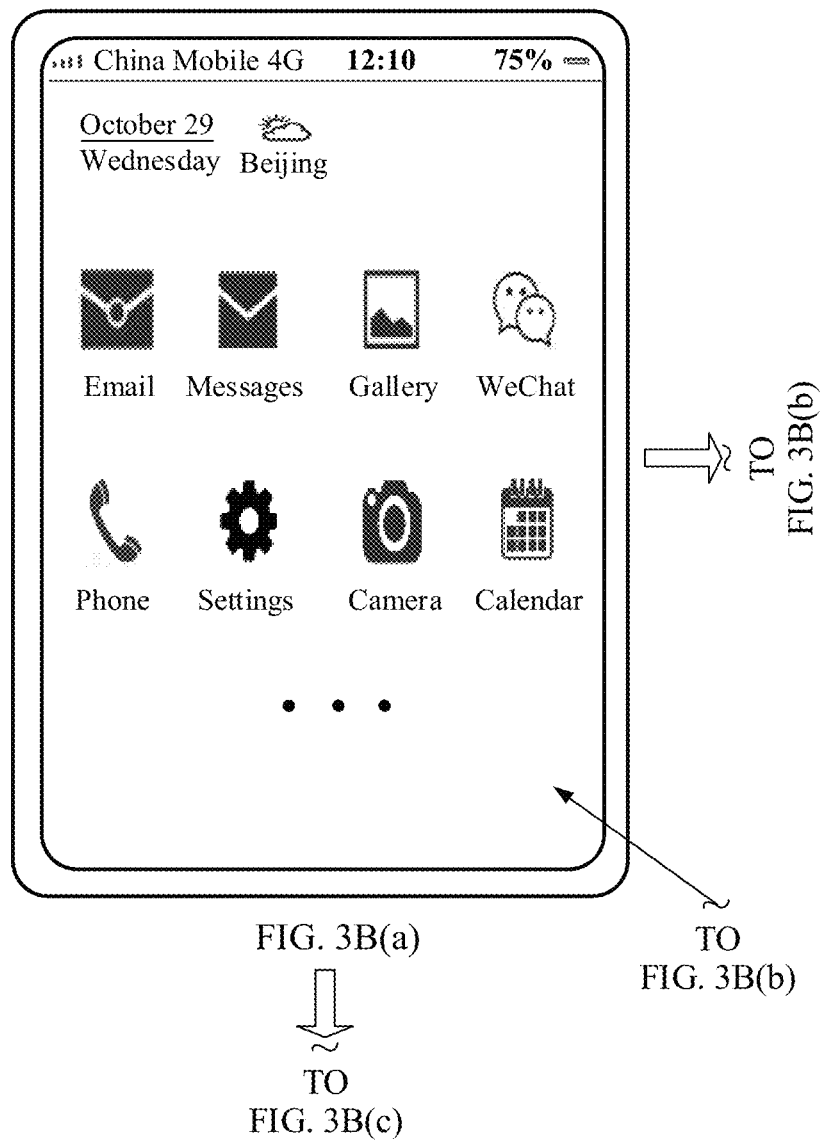
FIG. 3B(a) to FIG. 3B(d) are example diagrams of a screen drawing area according to an embodiment of this application.
Figure 3B:
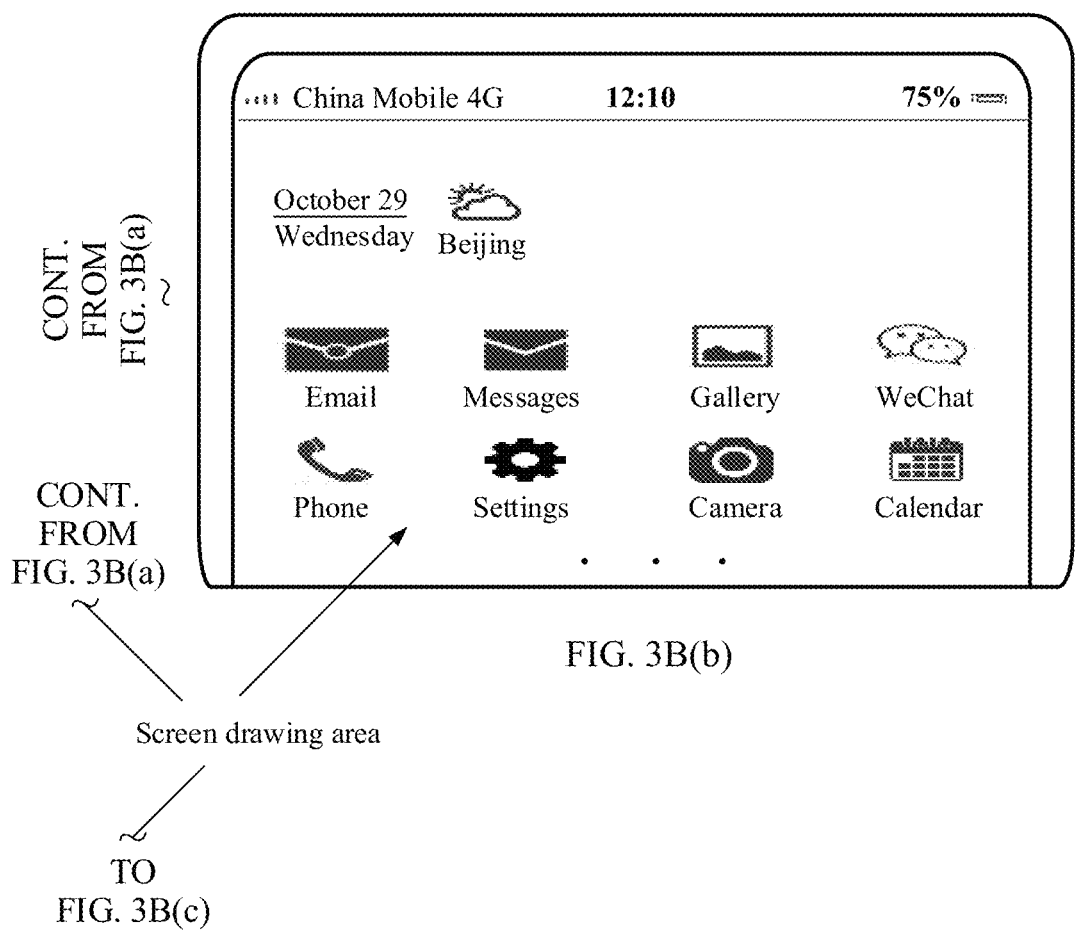
Figure 3B:
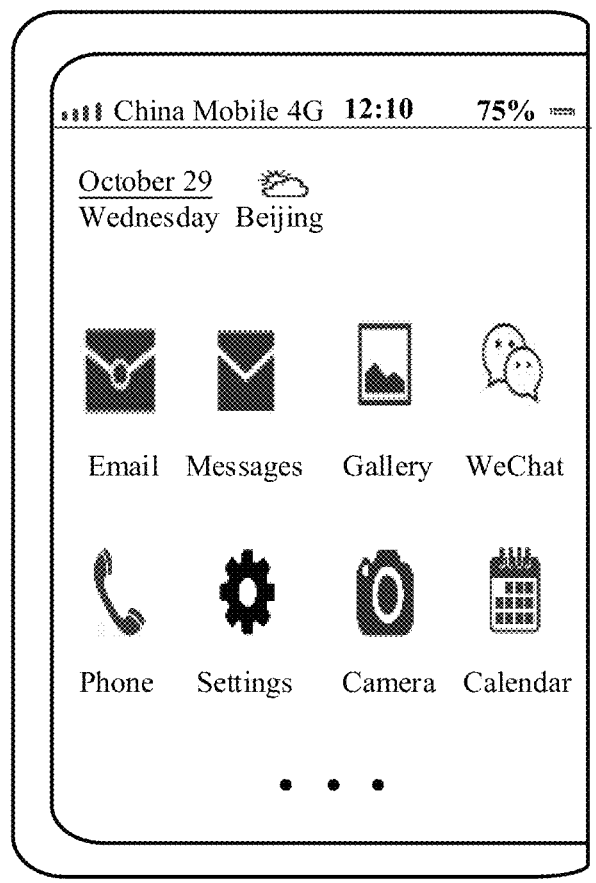

In some embodiments, before and after the state switching of the foldable display screen, a display direction of the screen drawing area may not change or may change, as shown in FIG. 3A or FIG. 3B. In FIG. 3A, a folding manner of the foldable display screen is left-right folding shown in FIG. 2A. In FIG. 3B, a folding manner of the foldable display screen is up-down folding shown in FIG. 2B.

For example, as shown in FIG. 3A(a) and FIG. 3A(b), in the unfolded state of the foldable display screen in FIG. 3A(a), the screen drawing area is the entire foldable display screen, and in the folded state of the foldable display screens in FIG. 3A(b) and FIG. 3A(c), the screen drawing area is a right half screen part (the second screen part). Upon comparison between the screen drawing area shown in FIG. 3A(a) and the screen drawing area shown in FIG. 3A(b), the display direction does not change, that is, a width of the screen drawing area changes, while a height does not change. Upon comparison between the screen drawing area shown in FIG. 3A(a) and the screen drawing area shown in FIG. 3A(c), the display direction changes, that is, both a width and a height of the screen drawing area change.

For another example, as shown in FIG. 3B(a) and FIG. 3B(b), in the unfolded state of the foldable display screen in FIG. 3B(a), the screen drawing area is the entire foldable display screen, and in the folded state of the foldable display screens in FIG. 3B(b) and FIG. 3B(c), the screen drawing area is an upper half screen part (the first screen part). Upon comparison between the screen drawing area shown in FIG. 3B(a) and the screen drawing area shown in FIG. 3B(b), the display direction does not change, that is, a height of the screen drawing area changes, while a width does not change. Upon comparison between the screen drawing area shown in FIG. 3B(a) and the screen drawing area shown in FIG. 3B(c), the display direction changes, that is, both a width and a height of the screen drawing area change.

It should be noted that, when the display direction of the screen drawing area changes before and after the state switching of the foldable display screen, the user needs to rotate the electronic device after the state switching, so as to view an interface, for example, as shown in FIG. 3A(c) and FIG. 3A(d), and FIG. 3B(c) and FIG. 3B(d).

In some embodiments, in the state switching process, the size of the screen drawing area may gradually change from a size of an initial state to a size of a target state. If the display direction of the screen drawing area (or a position of the screen drawing area) also changes, when the state switching process starts, the electronic device may first adjust the display direction of the screen drawing area (in this case, the size of the screen drawing area is still the size of the initial state, but the width and the height of the screen drawing area are switched, and certainly, a direction of an interface displayed in the screen drawing area is also adjusted correspondingly). Then, the size of the screen drawing area after the display direction is adjusted gradually changes from the size of the initial state to the size of the target state.

In some other embodiments, when the state switching process starts, the electronic device directly adjusts the screen drawing area to the size of the target state.

In still some other embodiments, in the entire state switching process of the electronic device, the size of the screen drawing area is not adjusted. Optionally, when the state switching process ends, the screen drawing area is directly adjusted to the size of the target state.

The following describes a display principle of the screen drawing area. It should be understood that the following display principle is merely described as an example, to understand an implementation process of this application. In another technology or a technology developed in the future, there may be another display method. This is not limited in this application.

Figure 3C:
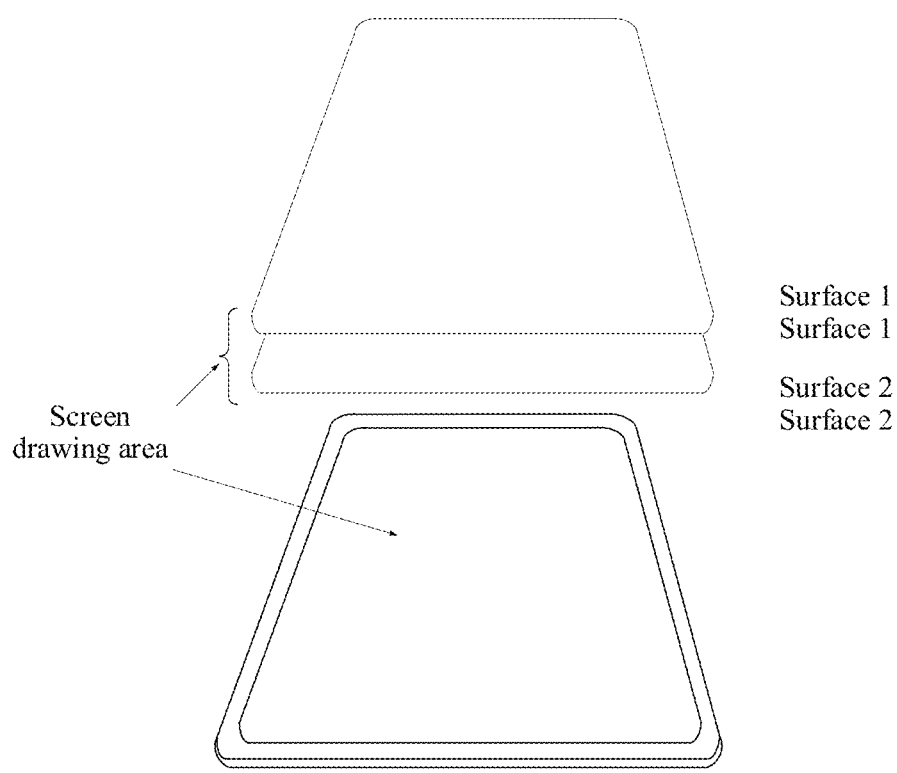
FIG. 3C is an example diagram of a screen drawing area according to an embodiment of this application.

The screen drawing area includes one or more surfaces, as shown in FIG. 3C. A size of each surface is the same as the size of the screen drawing area, and when the screen drawing area includes a plurality of surfaces, the plurality of surfaces overlap each other. Each surface is used to draw an interface, and an interface finally displayed in the screen drawing area is essentially an interface in which interfaces on surfaces included in the screen drawing area are superposed.

Figure 3D:
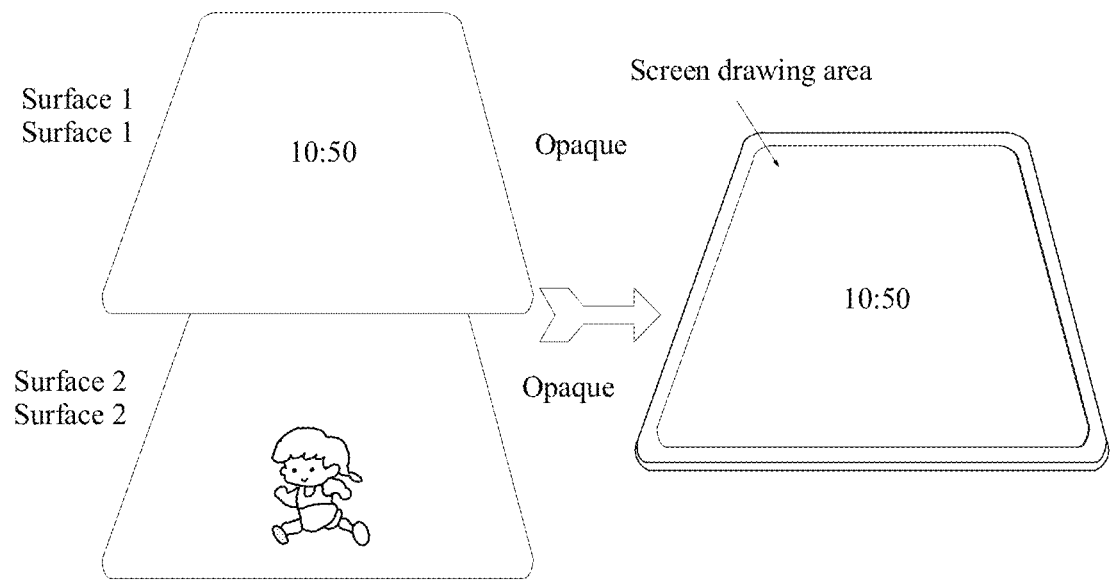
FIG. 3D(a) to FIG. 3D(c) are example diagrams of a screen drawing area according to an embodiment of this application.
Figure 3D:
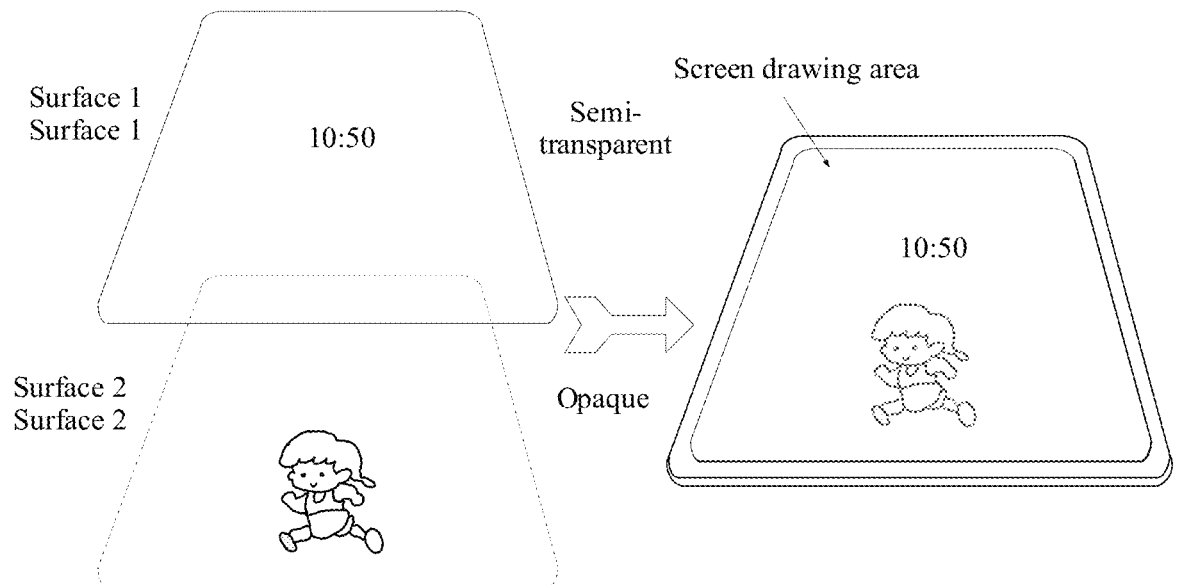
Figure 3D:
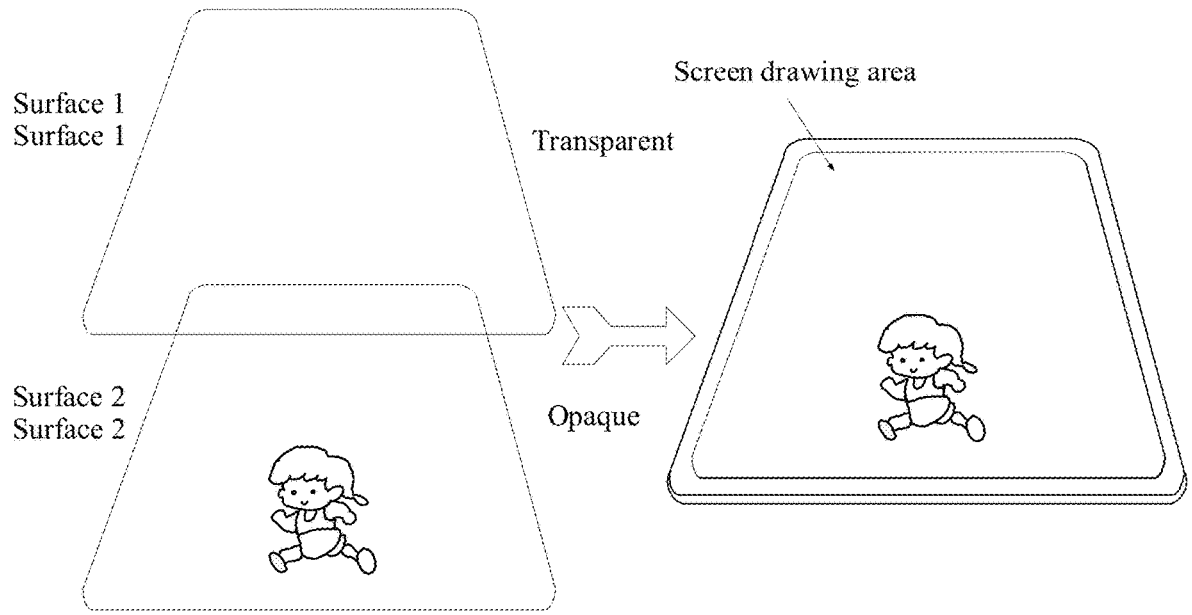

Referring to FIG. 3D, for example, the screen drawing area includes two surfaces: a surface 1 and a surface 2. When an interface on the upper surface 1 is opaque, an interface actually displayed (that is, visible to the user) in the screen drawing area is the interface on the surface 1, as shown in FIG. 3D(a). When an interface on the upper surface 1 is translucent, and an interface on the lower surface 2 is opaque, an interface actually displayed in the screen drawing area is the interface on the surface 1 and the interface on the surface 2, as shown in FIG. 3D(b). When an interface on the upper surface 1 is transparent, and an interface on the lower surface 2 is opaque, an interface actually displayed in the screen drawing area is the interface on the surface 2, as shown in FIG. 3D(c). It should be noted that some areas may be transparent and some areas may be opaque or translucent on the surface 1 or the surface 2.

It should be further noted that the foldable display screen described in the foregoing embodiments and related drawings is merely used to explain but not limit the technical solutions of this application. Shapes, appearances, and materials of each screen part of the foldable display screen, a quantity of screen parts, a connection manner between the screen parts, and a folding manner are not limited in this application.

(4) The interface is a user interface (UI), presented on the foldable display screen, which is a medium for interaction and information exchange between the electronic device and the user, and may implement information conversion between an internal data form of the device and a visual form of the user.

Figure 4A:
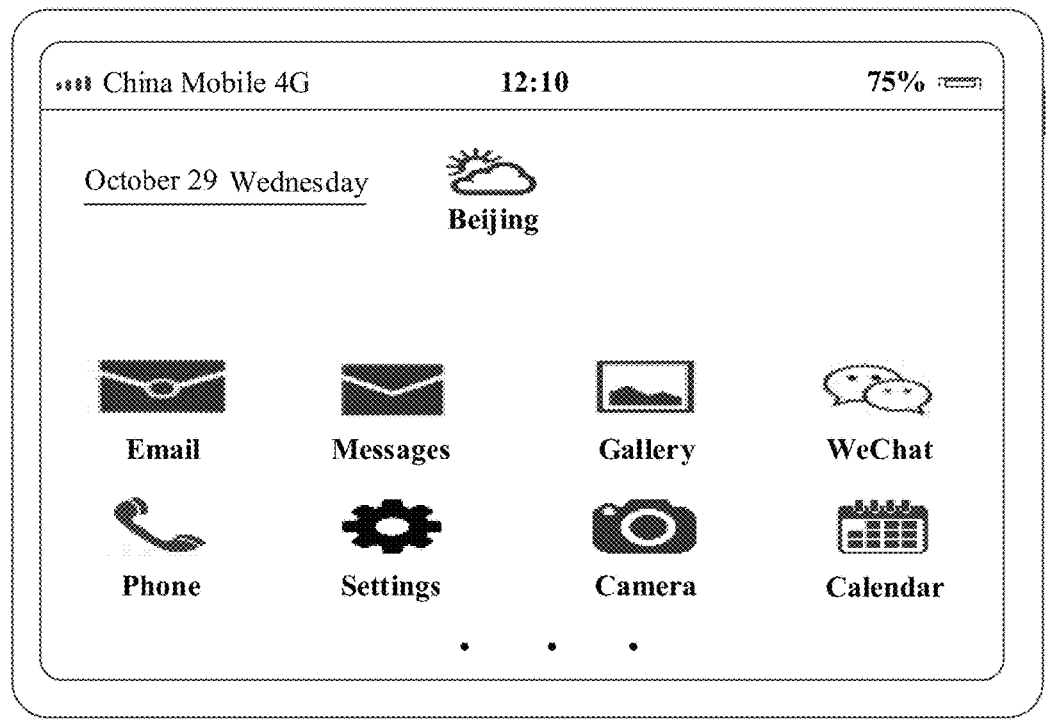
FIG. 4(a) to FIG. 4(c) are example diagrams of an interface according to an embodiment of this application.
Figure 4B:
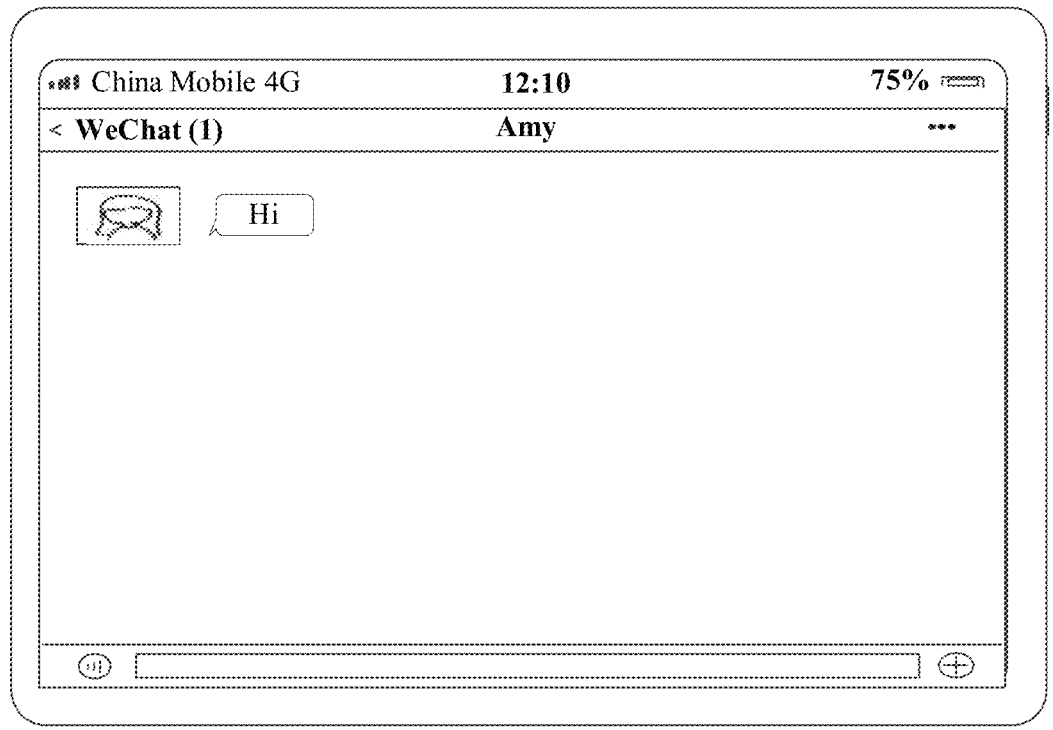
Figure 4C:
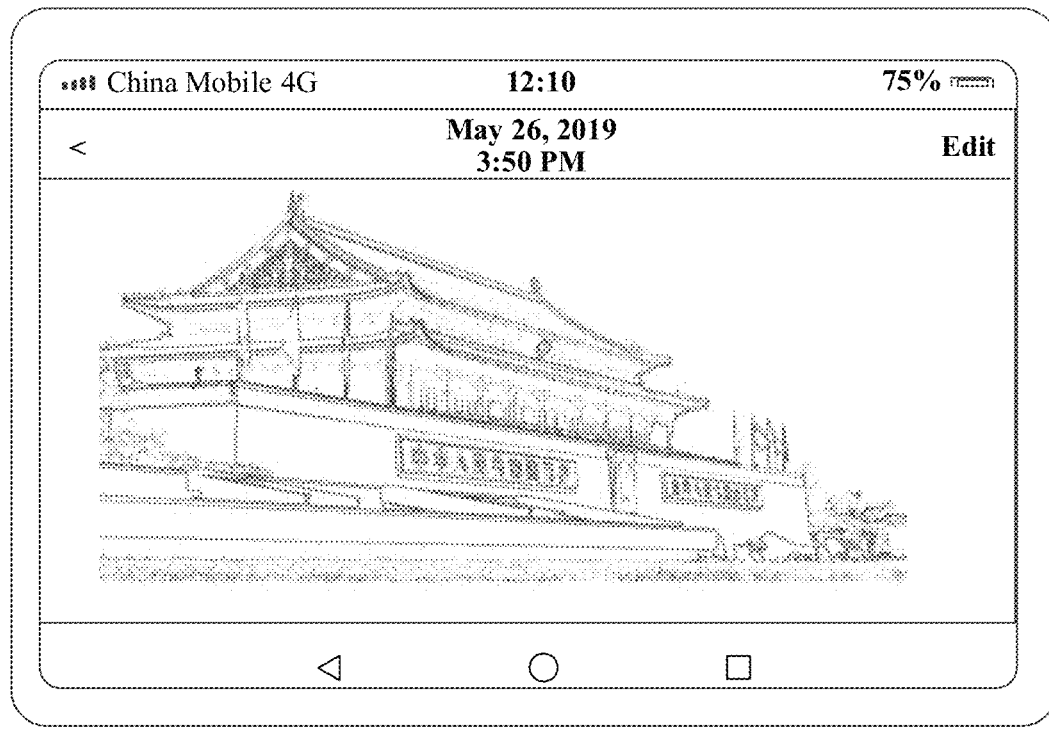

A specific representation form of the interface may be an image or a window. When a displayed interface is an image, the user generally cannot perform any editing processing on the image, but may exit the interface by some operations. The window is responsible for displaying and processing information. The user can operate in the window. Using a mobile phone as an example, the window includes a home screen window, an application window, and the like. The home screen window includes a wallpaper and icons, displayed on the wallpaper, of a plurality of applications, for example, an icon of a camera application and an icon of a gallery application, as shown in FIG. 4(a). The application window is a window displayed after the user opens a WeChat application, as shown in FIG. 4(b). It should be noted that an image may also be displayed in an application window. For example, when the user opens the gallery application, after the user selects a picture that needs to be opened, the image may be displayed in a display area in the gallery application window, as shown in FIG. 4(c).

The method embodiments provided in this application are specifically described below with reference to the accompanying drawings.

Figure 5:
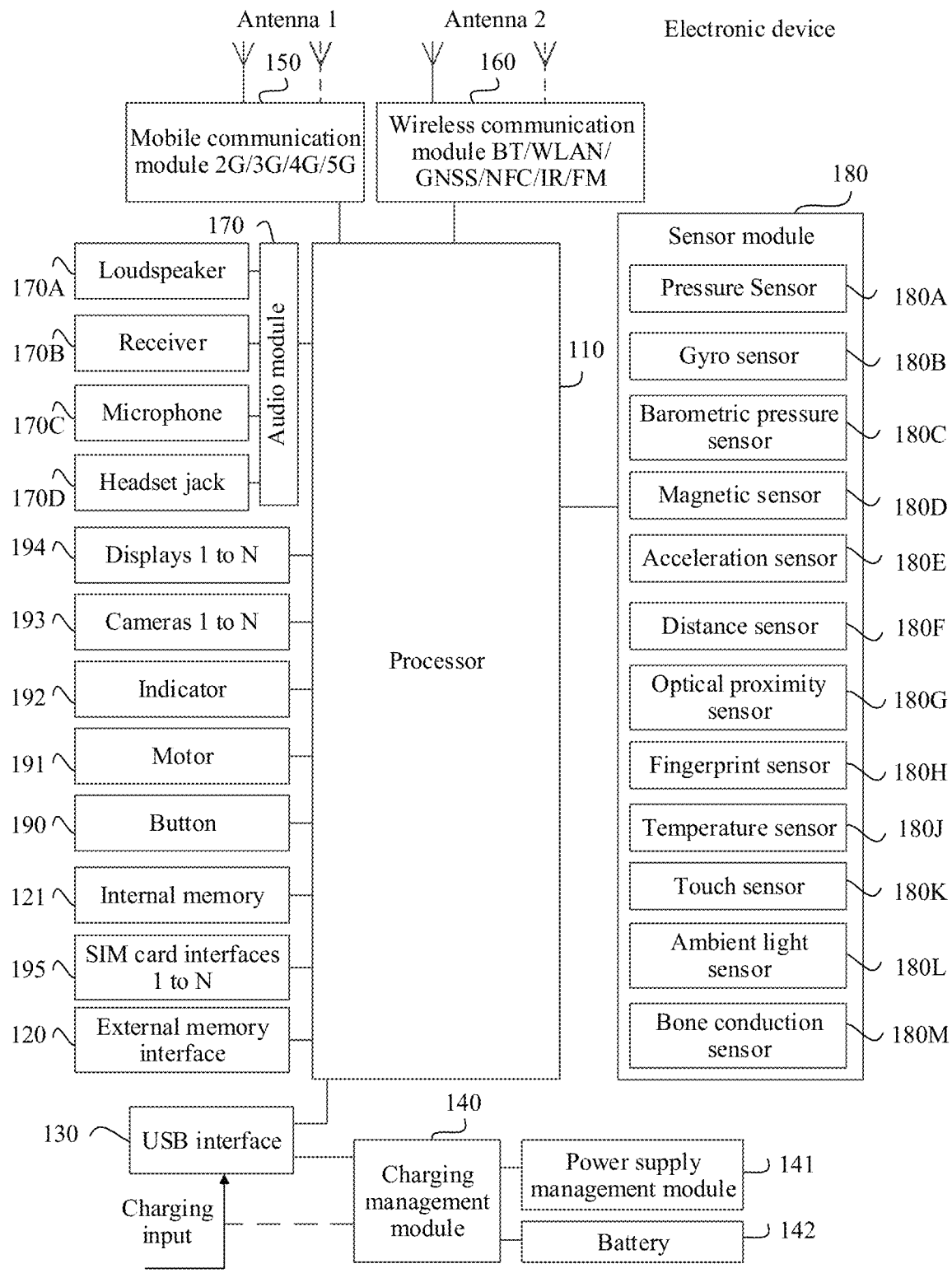
FIG. 5 is a diagram of a structure of an electronic device according to an embodiment of this application.

Embodiments of this application provide a display method. The method may be applied to any electronic device equipped with a foldable display screen. FIG. 5 shows a structure of an electronic device.

As shown in FIG. 5, an electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors. The controller may be a nerve center and a command center of the electronic device. The controller may generate an operation control signal based on an instruction operation code and a time sequence signal, to control to read instructions and execute instructions. The memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

The USB interface 130 is an interface that complies with a USB standard specification, and may be specifically a mini USB interface, a micro USB interface, a USB Type-C interface, or the like. The USB interface 130 may be configured to connect to a charger to charge the electronic device, or may be configured to transmit data between the electronic device and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like.

A wireless communication function of the electronic device may be implemented through the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna of the electronic device may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution that is for wireless communication including 2G/3G/4G/5G and the like and that is used in the electronic device. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal to an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same device as at least some modules in the processor 110.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like and that is applied to the electronic device. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device is coupled to the mobile communication module 150, and the antenna 2 is coupled to the wireless communication module 160, so that the electronic device can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The display 194 is a foldable display screen, configured to display an interface. The display 194 includes a display panel. The display panel may use a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1.

The camera 193 is configured to capture a static image or a video. In some embodiments, the camera 193 may include at least one camera, for example, one front-facing camera and one rear-facing camera.

The internal memory 121 may be configured to store computer-executable program code. The executable program code includes instructions. The processor 110 runs the instructions stored in the internal memory 121, to implement various functional applications and data processing of the electronic device. The internal memory 121 may include a program storage area and a data storage area. The program storage area may store an operating system, software code of at least one application program (for example, an iQIYI application or a WeChat application), and the like. The operating system may be iOS®, Android®, Microsoft®, or the like. The data storage area may store data (for example, an image or a video) generated in a process of using the electronic device, and the like. In addition, the internal memory 121 may include a high-speed random access memory, or may include a nonvolatile memory, for example, at least one magnetic disk storage device, a flash memory, or a universal flash storage (UFS).

The external memory interface 120 may be configured to connect to an external storage card, for example, a micro SD card, to extend a storage capability of the electronic device. The external memory card communicates with the processor 110 through the external memory interface 120, to implement a data storage function. For example, files such as an image and a video are stored in the external memory card.

The electronic device may implement audio functions, for example, music playing and recording, by using the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The optical proximity sensor 180G may include, for example, a light-emitting diode (LED) and an optical detector such as a photodiode. The light-emitting diode may be an infrared light-emitting diode. The electronic device emits infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event, and to provide a visual output related to the touch operation by using the display 194. In some other embodiments, the touch sensor 180K may be alternatively disposed on a surface of the electronic device, and is located at a location different from that of the display 194.

The button 190 includes a power button, a volume button, and the like. The button 190 may be a mechanical button, or may be a touch-sensitive button. The electronic device may receive a button input, and generate a button signal input related to user setting and function control of the electronic device. The motor 191 may generate a vibration prompt. The motor 191 may be configured to produce an incoming call vibration prompt and a touch vibration feedback. The indicator 192 may be an indicator, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or be separated from the electronic device.

It may be understood that the structure shown in FIG. 5 does not constitute a specific limitation on the electronic device, and the electronic device to which the display method provided in this application is applicable may include more or fewer components than those shown in the figure, or some components may be combined, or some components may be split, or a component may be deployed differently. In the following embodiments, the electronic device shown in FIG. 5 is used as an example for description.

A software system of the electronic device shown in FIG. 5 in this application may use a hierarchical architecture, an event-driven architecture, a microcore architecture, a microservice architecture, or a cloud architecture. In embodiments of this application, the software structure of the electronic device is described by using an Android system with a hierarchical architecture as an example.

Figure 6:
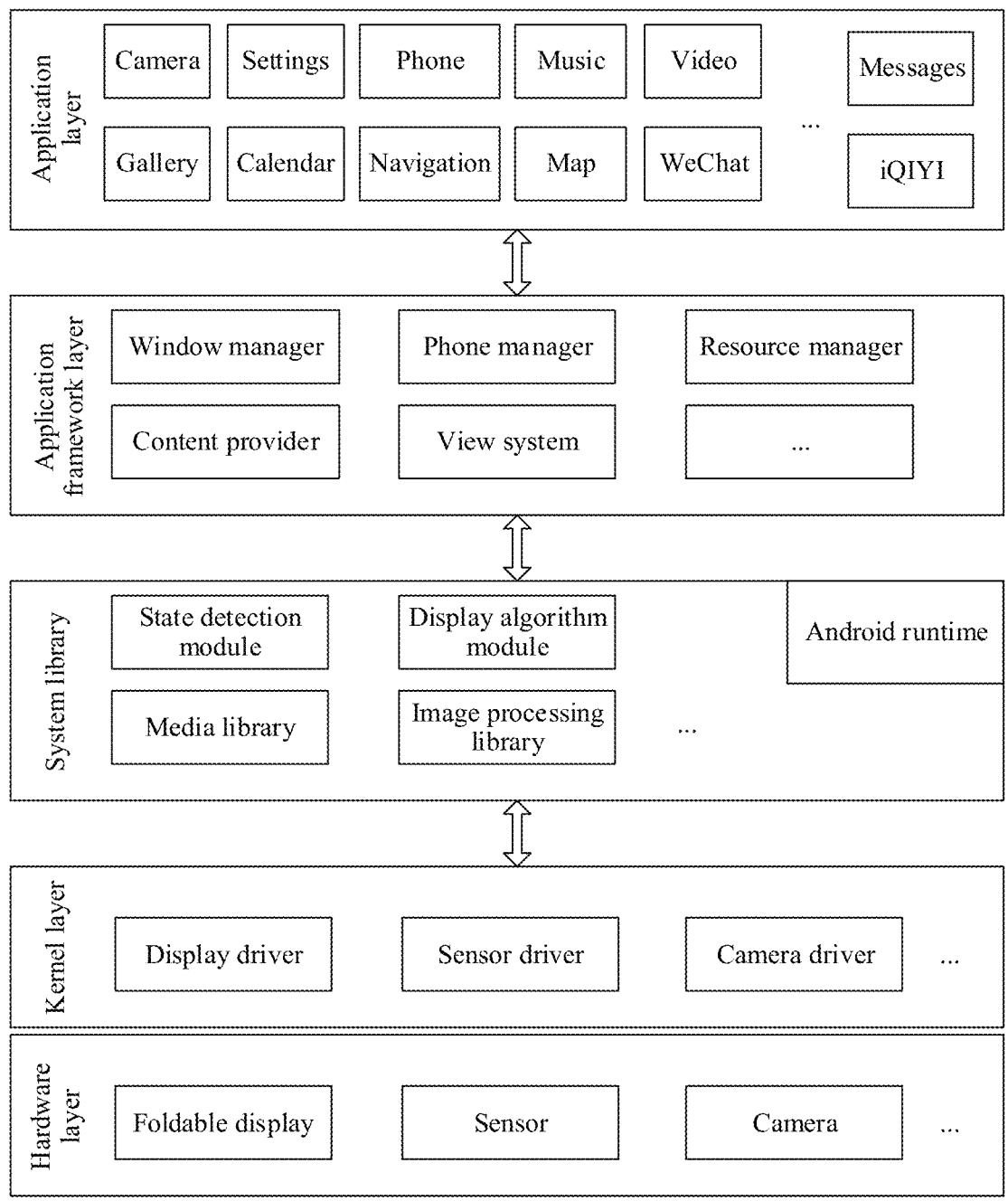
FIG. 6 is a schematic diagram of a software structure of an electronic device according to an embodiment of this application.

FIG. 6 is a block diagram of a software structure of an electronic device according to an embodiment of this application. As shown in FIG. 6, the software structure of the electronic device may be a layered architecture. For example, software may be divided into several layers, and each layer has a clear role and task. The layers communicate with each other through a software interface. In some embodiments, the Android system is divided into four layers: an application layer, an application framework (FWK) layer, an Android runtime and system library, and a kernel layer from top to bottom.

The application layer may include a series of applications. As shown in FIG. 6, the application layer may include camera, settings, phone, SMS, gallery, calendar, a three-party application, and the like. The three-party application program may include WeChat, map, navigation, music, video, iQIYI, and the like.

The application framework layer provides an application programming interface (API) and a programming framework for an application at the application layer. The application framework layer may include some predefined functions. As shown in FIG. 6, the application program framework layer may include a window manager, a content provider, a view system, a phone manager, a resource manager, a notification manager, and the like.

The window manager provides a window manager service. The window manager may obtain a size of the display, determine whether there is a status bar, lock a screen, take a screenshot, and the like. For example, the window manager includes a plurality of specific management functions, for example, a surface control function (Surface Control.Transaction). The surface control function may obtain values of some parameters from the following functions, to implement an animation effect of an interface displayed on a surface: a transparency animation function (AlphaAnimation), a scale animation function (ScaleAnimation), and a translation animation function (TranslateAnimation). The transparency animation function is configured to set transparency of the interface. The electronic device may change the transparency of the interface by changing a value of a transparency variable (or an opacity variable) in the transparency animation function. The scale animation function is configured to set a scale of the interface. The electronic device may change the scale of the interface by changing a value of a scale ratio variable in the scale animation function. The translation animation function is configured to set the position and the size of the screen drawing area. The electronic device may change the position and the size of the screen drawing area by changing values of a translation variable and a size variable in the translation animation function. Optionally, the surface control function may further include another animation function, configured to implement another change of the interface, for example, a color change, a shape change, a position change, or an angle change.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying a picture. The view system may be configured to construct an application. The interface may include one or more controls. For example, an interface including an SMS notification icon may include a control for displaying a text and a control for displaying a picture.

The phone manager is configured to provide a communication function of the electronic device, for example, management of a call status (including answering, declining, or the like).

The resource manager provides various resources such as a localized character string, an icon, an image, a layout file, and a video file for an application.

The Android runtime includes a kernel library and a virtual machine. The Android runtime is responsible for scheduling and management of the Android system. The kernel library includes two parts: one part is a function that a Java language needs to invoke, and the other part is a kernel library of the Android system. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a state detection module, a display algorithm module, a media library, and an image processing library.

The state detection module is configured to recognize a physical form of a foldable display screen of the electronic device. For example, the state detection module may be configured to determine the physical form of the foldable display screen based on sensor data uploaded by various sensors in a hardware layer. For example, the state detection module may calculate an unfolded angle between two adjacent screen parts based on the sensor data uploaded by various sensors in the hardware layer, and then determine a state of the foldable display screen based on the unfolded angle. The physical form may include a folded state, an unfolded state, a semi-folded intermediate state, and the like.

The display algorithm module is configured to adjust, based on different states of the foldable display screen detected by the state detection module, a display effect of the foldable display screen, to implement the display method provided in embodiments of this application. For example, based on a state of the foldable display screen, a screen in a displaying state is determined, a screen drawing area on the screen is adjusted, and an interface displayed in the screen drawing area is displayed. Specifically, the display algorithm module may invoke the window manager in the application framework layer, to implement the display method provided in embodiments of this application.

The media library supports playback and recording of audio and videos in a plurality of formats, and supports opening of still images in a plurality of formats. The media library may support a plurality of audio and video coding formats, such as MPEG-4, H.264, MP3, AAC, AMR, JPG, and PNG.

The kernel layer is a layer between hardware and software. The kernel layer includes at least a display driver, a sensor driver, a camera driver, an audio driver, and the like, and is configured to drive hardware in the hardware layer.

The hardware layer may include various sensors, the foldable display screen, a camera, and the like.

The following describes, by using an example, working procedures of software and hardware of the electronic device with reference to the display method in embodiments of this application.

An embodiment of this application provides a display method. The method is applicable to the electronic device equipped with the foldable display screen shown in FIG. 5. The following describes the method by using the electronic device having the structure shown in FIG. 5 as an example. For example, in description of the method, the foldable display screen shown in FIG. 2A is used as an example for description.

The method is as follows: The processor in the electronic device displays a target interface whose size changes on the foldable display screen in a process in which the foldable display screen switches from a first state to a second state (referred to as a state switching process for short below). When the first state is an unfolded state, the second state is a folded state. When the first state is the folded state, the second state is the unfolded state. The target interface is a first interface (or referred to as the target interface) that needs to be displayed after the foldable display screen switches to the second state.

It should be noted that, before the state switching of the foldable display screen, the foldable display screen is in the first state and is displaying an interface (or referred to as an initial interface). In this way, it can be ensured that the foldable display screen switches from displaying the initial interface to displaying the target interface in the state switching process, and the size of the target interface changes as the state switching process progresses. Therefore, in the method, a smooth transition of interface switching in the state switching process of the foldable display screen can be achieved, so that a visual effect in which a size change of the target interface coincides with an actual state switching process of the foldable display screen is implemented, thereby improving visual experience of a user.

In an implementation, the processor may determine, in the following manner, that the foldable display screen is in the state switching process:

The processor continuously detects a state of the foldable display screen, and when detecting for the first time that the foldable display screen is an intermediate state, determines that the foldable display screen is in the state switching process. Then, the processor continues to detect the state of the foldable display screen, and when detecting for the first time that the state of the foldable display screen is the unfolded state or the folded state, determines that the state switching process ends.

For example, the processor may detect the state of the foldable display screen by performing the following steps:

The processor receives sensor data uploaded in real time by various sensors, and then calculates an unfolded angle between the first screen part and the second screen part based on the received sensor data.

When the unfolded angle is within an interval (that is, a preset unfolded state condition) from a first threshold to 180 degrees, the processor determines that the state of the foldable display screen is the unfolded state.

When the unfolded angle is within an interval (that is, a preset folded state condition) from 0 degree to a second threshold, the processor determines that the state of the foldable display screen is the folded state.

When the unfolded angle is within an interval (that is, a preset intermediate state condition) from the second threshold to the first threshold, the processor determines that the state of the foldable display screen is the intermediate state.

A value of the first threshold is generally greater than a value of the second threshold, and the first threshold and the second threshold may be specifically set based on an actual application. For example, the first threshold is 180 degrees, 170 degrees, or 150 degrees, and the second threshold is 0 degree, 5 degrees, 45 degrees, or 90 degrees.

Because the state switching process depends on a speed of external force operating the foldable display screen (for example, a user unfolds or folds the foldable display screen by hand), a time of the state switching process is not fixed. Based on a relationship between the state switching process and a size change process of the target interface, this embodiment of this application provides the following implementations:

In a first implementation, a process in which the processor controls the size change of the target interface is consistent with the state switching process, that is, the processor controls the size of the target interface to change as the state switching process progresses. That is, when detecting for the first time that the unfolded angle meets the preset intermediate state condition, the processor controls the target interface to start changing, and when detecting that the unfolded angle does not meet the preset intermediate state condition, keeps the size of the target interface no longer changed.

In this implementation, the processor may adjust a size change speed of the target interface based on a change speed of the unfolded angle.

In a second implementation, when the state switching process starts, that is, when the processor detects for the first time that the foldable display screen is in the intermediate state, the processor starts to display the target interface at a preset size change speed until the size of the target interface changes to a target size. The target size may be a size adapted to the second state. For example, the size adapted to the second state is a size of a screen that is in the foldable display screen and that is in a displaying state when the foldable display screen is in the second state. For example, when the second state is the unfolded state, the target size is a size of a full screen. When the second state is the folded state, if the second screen part is in the displaying state, the target size is a size of the second screen part.

In this implementation, an end time of the size change of the target interface is irrelevant to the state switching process.

In a third implementation, a start time of the size change of the target interface is after a start time of the state switching process, and an end time of the size change of the target interface is before an end time of the state switching process, or is the same as the end time of the state switching process.

Optionally, in this embodiment of this application, the size change of the target interface may be, but not limited to, the following manners:

A first manner is gradually changing from a size adapted to the first state to the size adapted to the second state.

For example, the size adapted to the first state is a size of a screen that is in the foldable display screen and that is in the displaying state when the foldable display screen is in the first state. For example, when the first state is the unfolded state, the size adapted to the first state is the size of the full screen. When the first state is the folded state, if the second screen part is in the displaying state, the size adapted to the first state is the size of the second screen part.

For example, as shown in FIG. 7A (a shadowed part in the figure is a target interface), when the first state is the unfolded state and the second state is the folded state, in the state switching process, as the unfolded angle decreases, the size of the target interface gradually changes from the full screen to the size of the second screen part. FIG. 7A(a) shows a foldable display screen at a start moment of the state switching process. FIG. 7A(d) shows a foldable display screen at an end moment of the state switching process. As shown in FIG. 7A(b) and FIG. 7A(c), in the state switching process, the foldable display screen is in the intermediate state, and an unfolded angle 2 is greater than an unfolded angle 3. In this case, the size of the target interface in FIG. 7A(b) is greater than the size of the target interface in FIG. 7A(c).

FIG. 7A is still used as an example. On the contrary, when the first state is the folded state and the second state is the unfolded state, in the state switching process, as the unfolded angle increases, the size of the target interface gradually changes from the size of the second screen part to the size of the full screen.

It should be noted that, generally, when designing the target interface, a designer sets a default size for the target interface. For example, because the target interface is a first interface that needs to be displayed after the foldable display screen switches to the second state, generally, the default size of the target interface is the size adapted to the second state.

Therefore, in the first manner, when the default size of the target interface is different from the size adapted to the first state, before displaying the target interface whose size changes on the foldable display screen, the processor adjusts, in background, the size of the target interface from the default size to the size adapted to the first state. That is, when determining that the foldable display screen enters the state switching process, the processor constructs the target interface of the default size, adjusts the target interface of the default size to the size adapted to the first state, and then displays the target interface on the foldable display screen.

For example, when the first state is the unfolded state and the second state is the folded state, before displaying the target interface, the processor first adjusts the size of the target interface from a size adapted to the folded state to a size adapted to the unfolded state. Then, the processor displays, on the foldable display screen, the target interface that gradually changes from the size adapted to the unfolded state to the size (default size) adapted to the folded state.

For example, when the first state is the folded state and the second state is the unfolded state, before displaying the target interface, the processor first adjusts the size of the target interface from the size adapted to the unfolded state to the size adapted to the folded state. Then, the processor displays, on the foldable display screen, the target interface that gradually changes from the size adapted to the folded state to the size (default size) adapted to the unfolded state.

A second manner is gradually changing from a preset interface size to the size adapted to the second state.

A value of the preset interface size may not depend on the size of the screen in the displaying state in the first state. For example, the preset interface size may be one or more pixels. In this way, in the state switching process of the foldable display screen, the user may see the target interface gradually changing from a dark dot to the size adapted to the second state. It should be noted that a start position of the target interface may be a central position, an upper left corner, a lower left corner, a lower right corner, or the like of the screen in the displaying state in the second state. This is not limited in this embodiment of this application.

For example, as shown in FIG. 7B (a shadowed part in the figure is a target interface), the foldable display screen switches from the unfolded state to the folded state. When the state switching of the foldable display screen occurs (or at a start moment of the state switching process), the processor first determines that a screen part that is in the displaying state after the switching to the folded state is the second screen part, and then displays, on the second screen part, the target interface that gradually changes from a dark dot to the size adapted to the folded state. As shown in FIG. 7B(b) and FIG. 7B(c), as a folding operation of the user progresses, the unfolded angle decreases, and the size of the target interface increases.

Figure 7C:
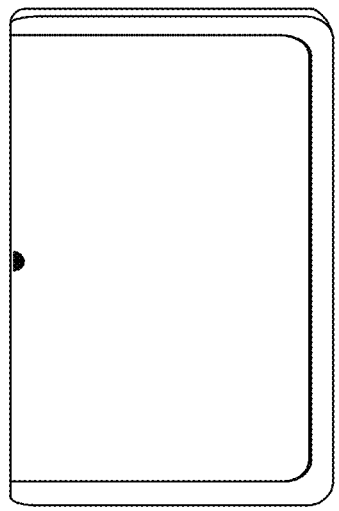
FIG. 7C(a) to FIG. 7C (d) are example diagrams of a dynamic change of a target interface according to an embodiment of this application.
Figure 7C:
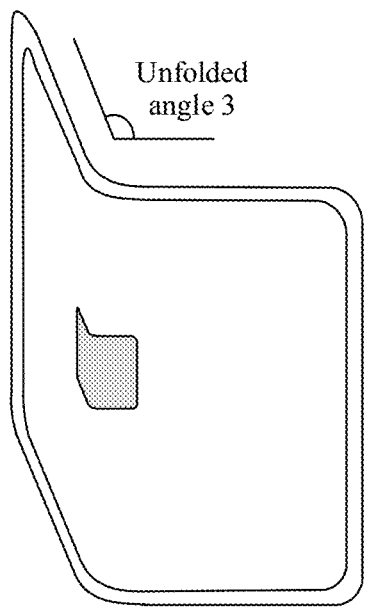
Figure 7C:
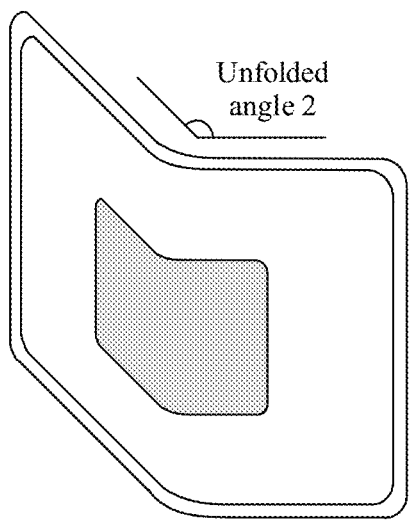
Figure 7C:
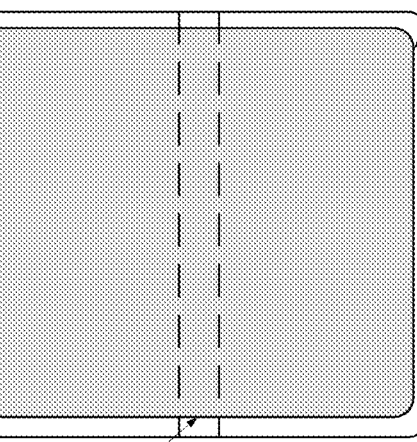

For another example, as shown in FIG. 7C (a shadowed part in the figure is a target interface), the foldable display screen switches from the folded state to the unfolded state. When the state switching of the foldable display screen occurs (or at a start moment of the state switching process), the processor first determines that a screen that is in the displaying state after the switching to the unfolded state is the full screen, and then displays, on the full screen, the target interface that gradually changes from a dark dot to the size adapted to the unfolded state. As shown in FIG. 7C(b) and FIG. 7C(c), as a folding operation of the user progresses, the unfolded angle increases, and the size of the target interface increases.

In another implementation of this embodiment of this application, in the state switching process of the foldable display screen, when displaying the target interface whose size changes on the foldable display screen, the processor may further control the target interface to generate at least one of the following dynamic changes, so as to diversify a display effect of the target interface:

A. a gradual transparency change from transparent to opaque; B. a color change; and C. a shape change.

Figure 7D:
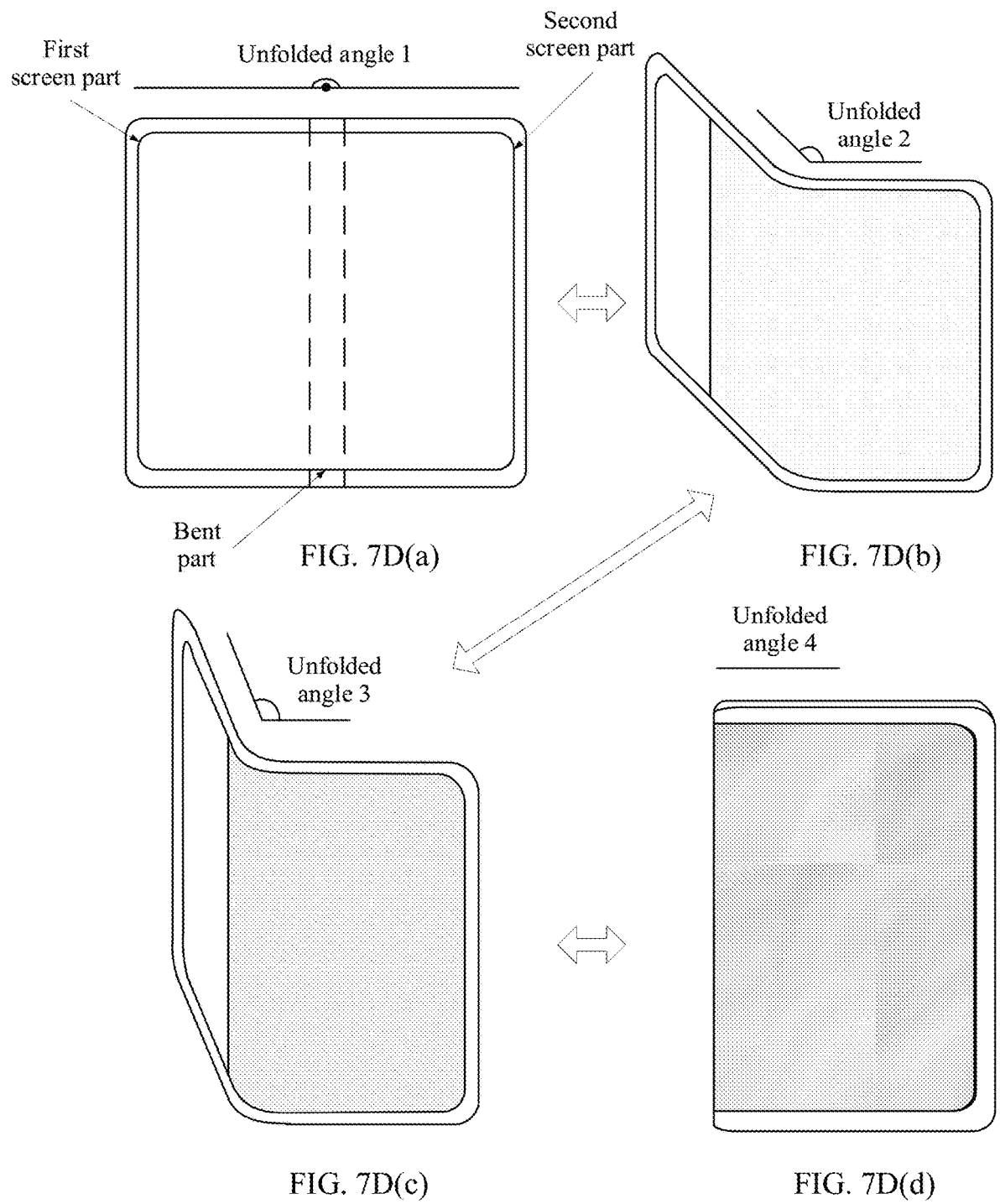
FIG. 7D(a) to FIG. 7D(d) are example diagrams of a dynamic change of a target interface according to an embodiment of this application.
Figure 7E:
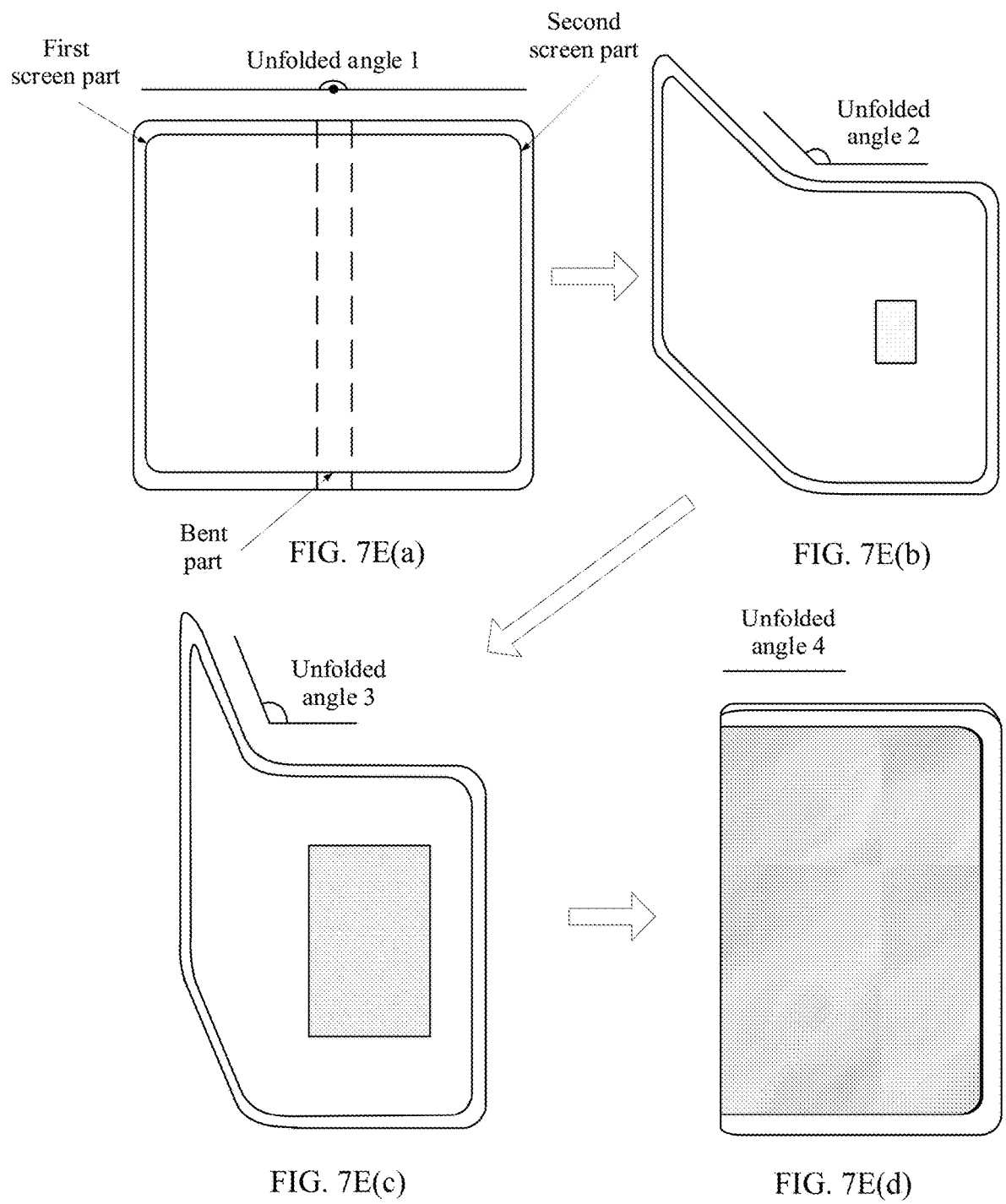
FIG. 7E(a) to FIG. 7E(d) are example diagrams of a dynamic change of a target interface according to an embodiment of this application.
Figure 7F:
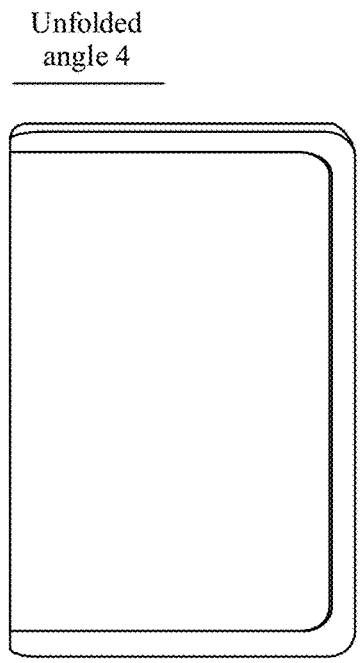
FIG. 7F(a) to FIG. 7F(d) are example diagrams of a dynamic change of a target interface according to an embodiment of this application.
Figure 7F:
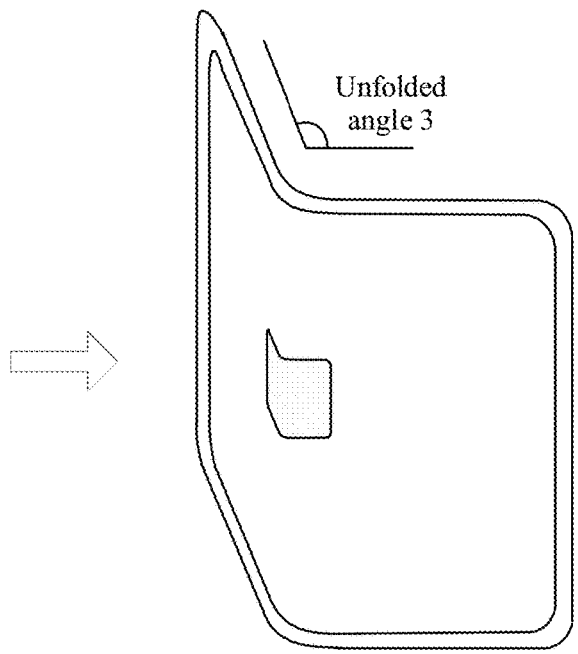
Figure 7F:
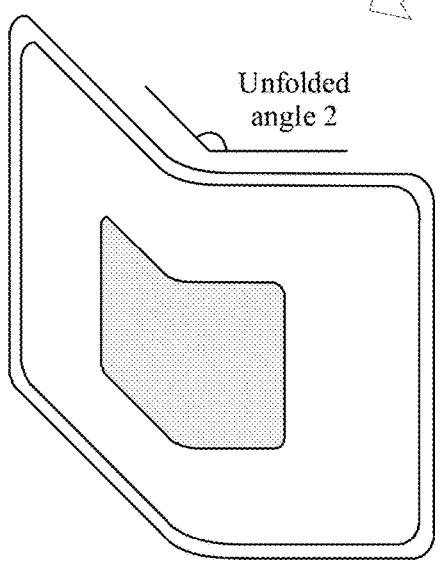
Figure 7F:
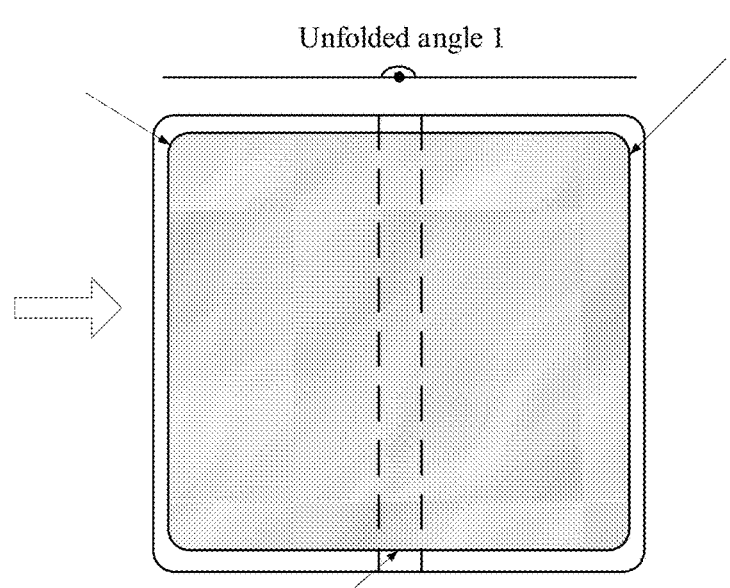

For example, the size changes of the target interface in the state switching process shown in FIG. 7A to FIG. 7C are still used as examples. Referring to FIG. 7D to FIG. 7F, when controlling the size change of the target interface, the processor controls the target interface to gradually change from transparent to opaque. As shown in FIG. 7D(a), FIG. 7E(a), and FIG. 7F(a), in an initial stage of the state switching process, the target interface is transparent and invisible. As the state switching process progresses, as shown in FIG. 7D(b) to FIG. 7D(d), FIG. 7E(b) to FIG. 7E(d), and FIG. 7F(b) to FIG. 7F(d), the target interface is increasingly clear and gradually becomes opaque.

For example, when displaying the target interface whose size changes, the processor may gradually change a color of the target interface to a default color. Specifically, the processor adjusts parameters such as a grayscale and a red-green-blue (RGB) value of the target interface, to implement the color change of the target interface.

For example, when controlling the size change of the target interface, the processor controls the shape change of the target interface, for example, gradually changing from a shape adapted to the first state, for example, a fixed shape such as a circular shape, a star shape, or an irregular shape, to a shape adapted to the second state. The shape adapted to the first state may be a shape of the screen that is in the foldable display screen and that is in the displaying state in the first state, and the shape adapted to the second state may be a shape of the screen that is in the foldable display screen and that is in the displaying state in the second state. For example, as shown in FIG. 7A, at the start moment of the state switching process, the shape of the target interface is the same as a shape of the full screen, and four corners are all rounded corners, as shown in FIG. 7A(a). As the state switching process progresses, the shape of the target interface changes, and finally, both an upper left corner and a lower left corner of the target interface become right angles, as shown in FIG. 7A(d). For another example, as shown in FIG. 7G, at the start moment of the state switching process, the shape of the target interface is a circle (circular dot). As the state switching process progresses, the shape and the size of the target interface change, as shown in FIG. 7G(b) and FIG. 7G(c), and finally, the shape of the target interface changes to the shape adapted to the second state.

An embodiment of this application further provides another display method. The method is applicable to the electronic device equipped with the foldable display screen shown in FIG. 5. The following describes the method by using the electronic device having the structure shown in FIG. 5 and the software architecture shown in FIG. 6 as an example. For example, in description of the method, the foldable display screen shown in FIG. 2A is used as an example for description.

In the method, the processor in the electronic device displays a target interface whose size changes and an initial interface that dynamically changes on the foldable display screen in a process in which the foldable display screen switches from a first state to a second state (referred to as a state switching process for short below). The initial interface is a last interface displayed in the first state before the state switching of the foldable display screen.

In this embodiment, for a process and manner in which the processor displays the target interface whose sizes changes (optionally, there may be other changes such as a transparency change, a color change, and a shape change) on the foldable display screen, refer to the description in the previous embodiment. Details are not described herein again.

Based on a relationship between the state switching process and a dynamic change process of the initial interface, this embodiment of this application provides the following implementations:

In a first implementation, a process in which the processor controls the dynamic change of the initial interface is consistent with the state switching process, that is, the processor controls the initial interface to dynamically change as the state switching process progresses. That is, when detecting for the first time that an unfolded angle meets a preset intermediate state condition, the processor controls the initial interface to start dynamically changing, and when detecting that the unfolded angle does not meet the preset intermediate state condition, keeps the initial interface no longer changed. In this implementation, the processor may adjust a dynamic change speed of the initial interface based on a change speed of the unfolded angle.

In a second implementation, when the state switching process starts, that is, when detecting for the first time that the foldable display screen is an intermediate state, the processor starts to display the initial interface at a preset dynamic change speed until the initial interface changes to a state. In this implementation, an end time of the dynamic change of the initial interface is irrelevant to the state switching process.

In a third implementation, a start time of the dynamic change of the initial interface is after a start time of the state switching process, and an end time of the dynamic change of the initial interface is before an end time of the state switching process, or is the same as the end time of the state switching process.

Figure 8A:
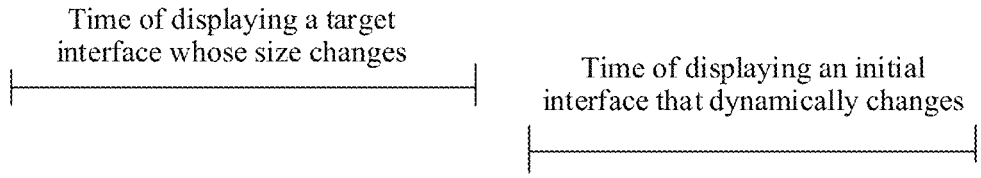
FIG. 8(a) to FIG. 8(e) are schematic diagrams of a time relationship between displaying an initial interface that dynamically changes and displaying a target interface whose size changes according to an embodiment of this application.
Figure 8B:
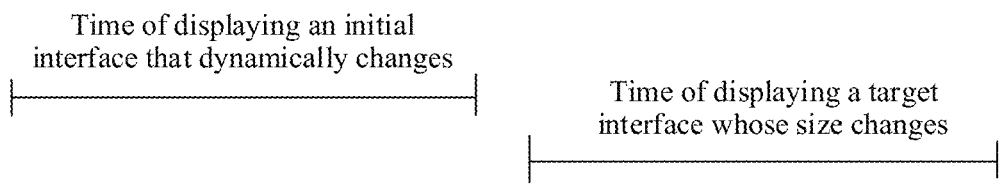
Figure 8C:
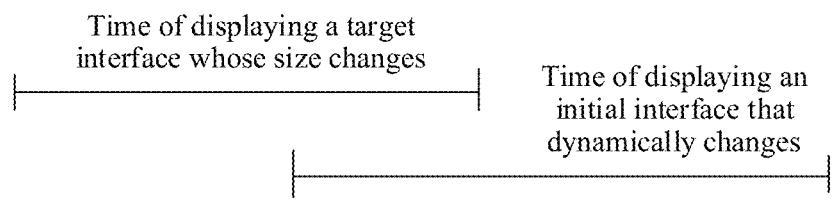
Figure 8D:
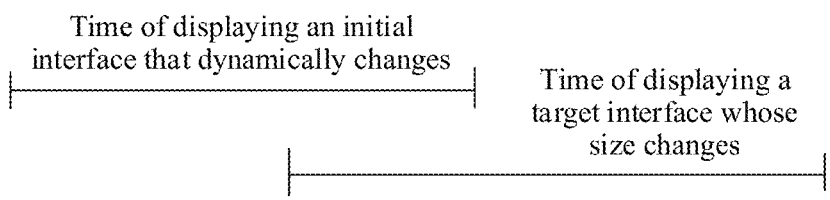
Figure 8E:
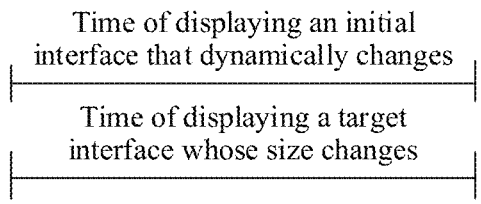

It should be noted that, a time relationship between displaying the initial interface that dynamically changes and displaying the target interface whose size changes on the foldable display screen by the processor is not limited in this embodiment of this application. For example, referring to FIG. 8(a), the processor may first display the target interface whose size changes, and then display the initial interface that dynamically changes. For example, referring to FIG. 8(b), the processor may first display the initial interface that dynamically changes, and then display the target interface whose size changes. For example, a time of displaying the initial interface that dynamically changes overlaps a time of displaying the target interface whose size changes, as shown in FIG. 8(c) to FIG. 8(e). The time of displaying the initial interface that dynamically changes may partially overlap the time of displaying the target interface whose size changes, as shown in FIG. 8(c) and FIG. 8(d). Alternatively, the time of displaying the initial interface that dynamically changes completely overlaps the time of displaying the target interface whose size changes. That is, the processor simultaneously displays the initial interface that dynamically changes and the target interface whose size changes.

Optionally, in this embodiment of this application, the dynamic change of the initial interface may be, but not limited to, any one or a combination of the following manners:

A. a size change; B. a gradual transparency change from opaque to transparent; C. a color change; and D. a shape change.

In this way, the processor may display the initial interface that flexibly and dynamically changes on the foldable display screen, to diversify a display effect of the initial interface.

The size change of the initial interface may include, but not limited to, the following two manners: A first manner is gradually changing from a size adapted to the first state to a size adapted to the second state. A second manner is gradually shrinking from the size adapted to the first state until disappearing.

In the first manner, for a process in which the processor internally implements the size change of the initial interface, refer to the process in which the processor implements the size change of the target interface in the foregoing embodiment. Details are not described herein again. For a change process of the initial interface, refer to FIG. 9A.

As shown in FIG. 9A (a shadowed part in the figure is an initial interface), when the first state is the unfolded state and the second state is the folded state, in the state switching process, as the unfolded angle decreases, the size of the initial interface gradually changes from the full screen to the size of the second screen part. FIG. 9A(a) shows a foldable display screen at a start moment of the state switching process. FIG. 9A(d) shows a foldable display screen at an end moment of the state switching process. As shown in FIG. 9A(b) and FIG. 9A(c), in the state switching process, the foldable display screen is in the intermediate state, and an unfolded angle 2 is greater than an unfolded angle 3. In this case, the size of the initial interface in FIG. 9A(b) is greater than the size of the initial interface in FIG. 9A(c).

FIG. 9A is still used as an example. On the contrary, when the first state is the folded state and the second state is the unfolded state, in the state switching process, as the unfolded angle increases, the size of the initial interface gradually changes from the size of the second screen part to the size of the full screen.

In the second manner, the processor may determine a reference point on the foldable display screen, and then shrink the initial interface toward the reference point by using the reference point as a center. Optionally, the reference point may be a center point, a corner, or another preset point of the screen that is in the displaying state when the foldable display screen is in the first state, or a center point, a corner, or another preset point of the screen that is in the displaying state when the foldable display screen is in the second state. This is not limited in this application.

Figure 9C:
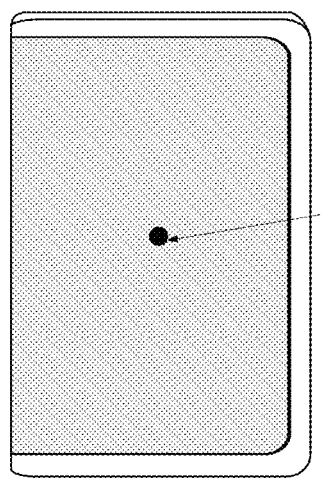
FIG. 9C(a) to FIG. 9C(d) are example diagrams of a dynamic change of a target interface according to an embodiment of this application.
Figure 9C:
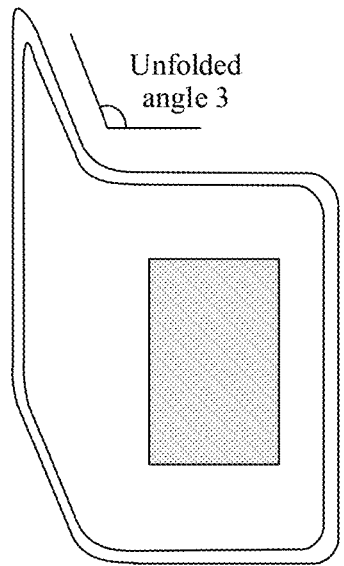
Figure 9C:
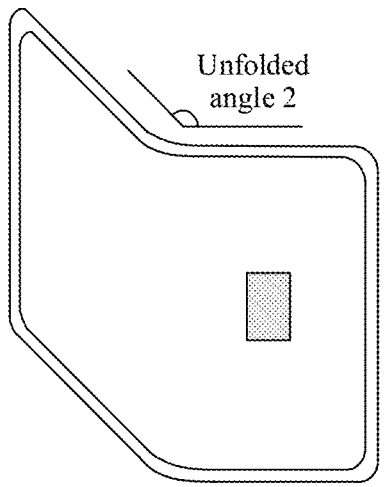
Figure 9C:
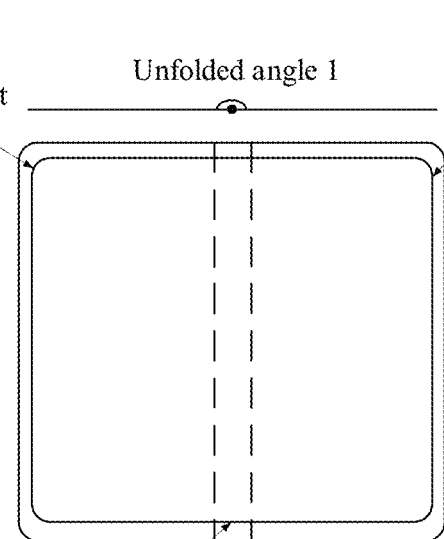

For example, in FIG. 9B and FIG. 9C, an example in which the reference point is the central point of the screen that is in the displaying state when the foldable display screen is in the first state is used for description.

As shown in FIG. 9B (a shadowed part in the figure is an initial interface), the foldable display screen switches from the unfolded state to the folded state. When the state switching of the foldable display screen occurs (or at a start moment of the state switching process), the processor first determines a central point of a screen (full screen) that is in the displaying state when the foldable display screen is in the unfolded state as a reference point, as shown by a dark dot in FIG. 9B(a). Then, as the state switching process progresses, the processor gradually shrinks the initial interface toward the reference point until the initial interface disappears. As shown in FIG. 9B(b) and FIG. 7B(c), as a folding operation of the user progresses, the unfolded angle decreases, and the initial interface is smaller.

As shown in FIG. 9C (a shadowed part in the figure is an initial interface), the foldable display screen switches from the folded state to the unfolded state. When the state switching of the foldable display screen occurs (or at a start moment of the state switching process), the processor first determines a central point of the second screen part that is in the displaying state when the foldable display screen is in the folded state as a reference point, as shown by a dark dot in FIG. 9C(a). Then, as the state switching process progresses, the processor gradually shrinks the initial interface toward the reference point until the initial interface disappears. As shown in FIG. 9C(b) and FIG. 9C(c), as an unfolding operation of the user progresses, the unfolded angle increases, and the initial interface is smaller.

Figure 9F:
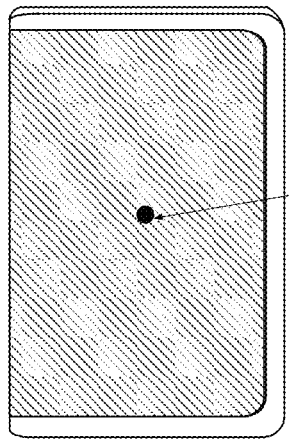
FIG. 9F(a) to FIG. 9F(d) are example diagrams of a dynamic change of a target interface according to an embodiment of this application.
Figure 9F:
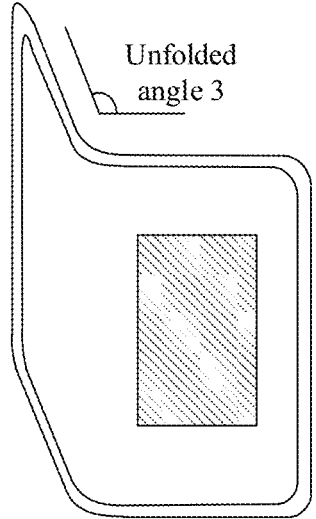
Figure 9F:
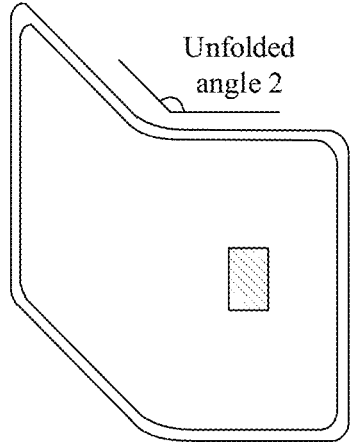
Figure 9F:
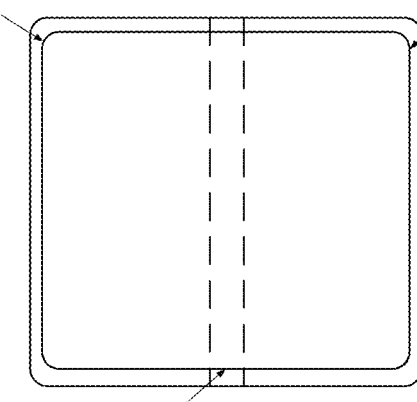

In an implementation, when adjusting the size change of the initial interface, the processor may control the initial interface to gradually change from opaque to transparent. For example, the size changes of the initial interface shown in FIG. 9A to FIG. 9C are still used as examples. Referring to FIG. 9D to FIG. 9F, when controlling the size change of the initial interface, the processor controls the initial interface to gradually change opaque from to transparent. As shown in FIG. 9D(a), FIG. 9E(a), and FIG. 9F(a), in an initial stage of the state switching process, the initial interface is opaque and visible. As the state switching process progresses, as shown in FIG. 9D(b) to FIG. 9D(d), FIG. 9E(b) to FIG. 9E(d), and FIG. 9F(b) to FIG. 9F(d), the initial interface is increasingly transparent and gradually becomes invisible.

In an implementation, when adjusting the size change of the initial interface, the processor may gradually change a color of the initial interface to a specified color. Specifically, the processor may adjust parameters such as a grayscale and an RGB value of the initial interface, to implement the color change of the initial interface. For example, the specified color may be white or gray.

Figure 9G:
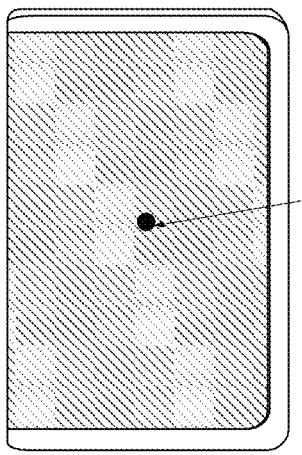
FIG. 9G(a) to FIG. 9G(d) are example diagrams of a dynamic change of a target interface according to an embodiment of this application.
Figure 9G:
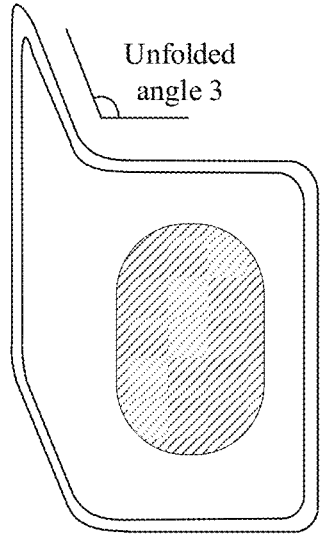
Figure 9G:
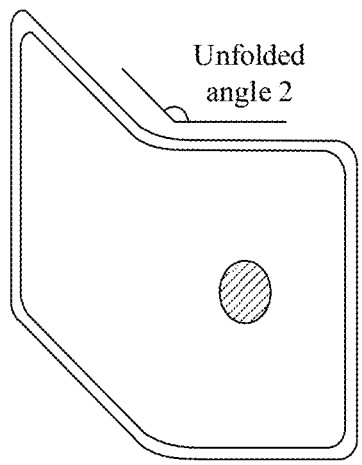
Figure 9G:
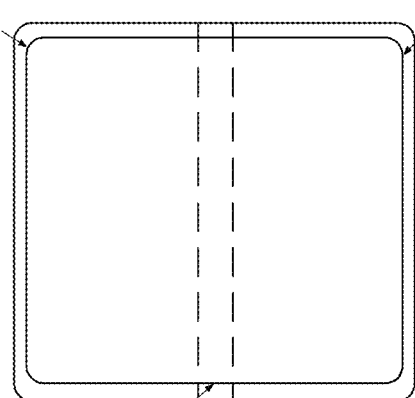

In an implementation, when adjusting the size change of the initial interface, the processor may control the shape change of the initial interface, for example, gradually changing from a shape adapted to the first state to a shape adapted to the second state, for example, a fixed shape such as a circular shape, a star shape, or an irregular shape. For example, as shown in FIG. 9A, at the start moment of the state switching process, the shape of the initial interface is the same as a shape of the full screen, and four corners are all rounded corners, as shown in FIG. 9A(a). As the state switching process progresses, the shape of the initial interface changes, and finally, both an upper left corner and a lower left corner of the initial interface become right angles, as shown in FIG. 9A(d). For another example, as shown in FIG. 9G, at the start moment of the state switching process, the shape of the initial interface is the shape adapted to the first state. As the state switching process progresses, the shape of the initial interface is more round and the initial interface is smaller, as shown in FIG. 9G(b) and FIG. 9G(c), and finally, the initial interface disappears, as shown in FIG. 9G(d).

It should be noted that FIG. 7A to FIG. 7G and FIG. 9A to FIG. 9G in the foregoing embodiments are only used to schematically explain dynamic change effects of the target interface and the initial interface, but do not limit a visual effect of the user.

The following describes an internal principle and implementation of dynamically changing the target interface and/or the initial interface by the processor in the foregoing embodiments.

When the size change manner of the target interface/initial interface is gradually changing from the size adapted to the first state to the size adapted to the second state, the processor may display the target interface/initial interface on the foldable display screen by using, but not limited to, the following methods:

Method 1: In a scenario in which the processor displays the target interface/initial interface on the foldable display screen based on a display ratio of the target interface/initial interface, the processor displays the target interface/initial interface whose size changes on the foldable display screen based on a display ratio that gradually changes from a first ratio to a second ratio. The first ratio is a ratio between the size adapted to the first state and the default size of the target interface/initial interface, and the second ratio is a ratio between the size adapted to the second state and the default size of the target interface/initial interface.

Method 2: In a scenario in which the target interface/initial interface is displayed by drawing on a surface included in a screen drawing area:

In an implementation, if the processor determines that the size of the target interface/initial interface is bound to/associated with a size of the surface (that is, when the size of the surface changes, a size of an interface displayed on the surface also changes correspondingly), the processor may adjust the size of the surface on which the target interface/ initial interface is displayed, to change the size of the target interface/initial interface. To enable the target interface/initial interface to gradually change from the size adapted to the first state to the size adapted to the second state, the processor also needs to control the surface on which the target interface/initial interface is displayed to gradually change from the size adapted to the first state to the size adapted to the second state.

In another implementation, if the processor determines that the size of the target interface/initial interface is not bound to/associated with a size of a corresponding surface, the processor needs to adjust the size of the target interface/initial interface, and displays the target interface/initial interface whose size changes on the corresponding surface.

In some cases, when a current size of the surface (a size of the surface in the first state of the foldable display screen) is enough to display the target interface/initial interface adapted to the size of the second state (for example, when the foldable display screen switches from the unfolded state to the folded state), to improve efficiency and reduce power consumption, the processor may not adjust the size of the surface, that is, adjust only the size of the target interface/initial interface.

In some other cases, when a current size of the surface is not enough to display the target interface/initial interface adapted to the size of the second state (for example, when the foldable display screen switches from the folded state to the unfolded state), the processor may directly adjust, at a start moment of the state switching process, the size of the surface to the size adapted to the second state. The size adapted to the second state is the size of the screen that is in the foldable display screen and that is in the displaying state in the second state, and when the second state is the unfolded state, the size adapted to the second state may be the size of the full screen.

In still some other cases, to ensure a display effect of the target interface/initial interface, the processor may adjust the size of the corresponding surface when adjusting the size of the target interface/initial interface. That is, the processor needs to control both the surface on which the target interface/initial interface is displayed and the target interface/initial interface to gradually change from the size adapted to the first state to the size adapted to the second state.

It should be noted that, in an implementation, the size of the surface is the same as a size of a screen drawing area in which the surface is located. Therefore, the processor may adjust the size of the surface by directly adjusting the size of the screen drawing area on the foldable display screen.

For example, in Method 2, when the processor internally adjusts the size of the screen drawing area, the processor may invoke the window manager, then create a translation animation function TranslateAnimation for the screen drawing area, and then adjust a translation variable and/or a size variable in the translation animation function, so that the size of the screen drawing area (and the surface included in the screen drawing area) may gradually change from the size adapted to the first state to the size adapted to the second state. Optionally, the size variable may include a width and a height of the screen drawing area.

For example, referring to FIG. 9A, it is assumed that the translation variable is a left boundary of the screen drawing area. When the foldable display screen is in the unfolded state, a value of the translation variable of the screen drawing area is 0. When the foldable display screen is in the folded state, the screen drawing area is the second screen part on the right side of the foldable display screen. In this case, the value of the translation variable of the screen drawing area is a. In a process in which the foldable display screen switches from the unfolded state to the folded state, the processor adjusts the translation variable gradually from 0 to a, so that the size of the screen drawing area may gradually change from the full screen to the size of the second screen part. Similarly, in a process in which the foldable display screen switches from the folded state to the unfolded state, the processor may adjust the translation variable of the screen drawing area gradually from a to 0, so that the size of the screen drawing area may gradually change from the size of the second screen part to the full screen.

For example, when the processor internally implements Method 2, the processor may invoke the window manager, then create a ScaleAnimation function for the target interface/initial interface, and set a scale ratio in the ScaleAnimation function to gradually change from a first scale ratio to a second scale ratio, so that the target interface/initial interface gradually changes from the size adapted to the first state to the size adapted to the second state.

The first scale ratio is a ratio between a length of a target boundary when the target interface/initial interface is adapted to the size of the first state and a length of the target boundary when the target interface/initial interface has the default size. The second scale ratio is a ratio between a length of the target boundary when the target interface/initial interface is adapted to the size of the second state and the length of the target boundary when the target interface/initial interface has the default size. The target boundary is a boundary whose length changes in the target interface/initial interface after the state switching of the foldable display screen. When a display direction of the screen drawing area does not change before or after the state switching of the foldable display screen, the target boundary is a width or a height of the target interface/initial interface. When the display direction of the screen drawing area changes, the target boundary is the width and the height of the target interface/initial interface.

The following describes a value of the scale ratio by using specific examples. In Example 1 to Example 4, the processor executes the size change of the initial interface. In Example 5 to Example 8, the processor executes the size change of the target interface. It should be noted that, in the following Example 1 to Example 8, a folding manner of left-right folding is used as an example. Because value principles are similar, when the folding manner of the foldable display screen is up-down folding, refer to these examples, and details are not described herein again.

Figure 10A:
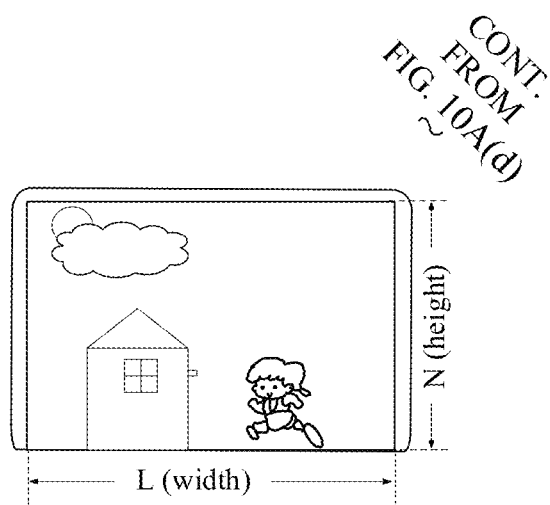
FIG. 10A(a) to FIG. 10A(e) are example diagrams of a dynamic change of an initial interface according to an embodiment of this application.

Example 1: As shown in FIG. 10A(a) to FIG. 10A(e), for example, the folding manner of the foldable display screen is left-right folding, and the display direction of the screen drawing area does not change before or after the state switching of the foldable display screen.

In the unfolded state of the foldable display screen, a width of the screen drawing area is M, and a height is L, as shown in FIG. 10A(a). In the folded state of the foldable display screen, the screen drawing area is the second screen part on the right side, a width is N, and a height is still L, as shown in FIG. 10A(b).

A size of the initial interface adapted to the unfolded state is the same as a size of the screen drawing area of the foldable display screen in the unfolded state, and is a default size of the initial interface, as shown in FIG. 10A(a). A size of the initial interface adapted to the folded state is the same as a size of the screen drawing area of the foldable display screen in the folded state, as shown in FIG. 10A(b).

In this case, as shown in FIG. 10A(a) and FIG. 10A(b), when the foldable display screen switches from the unfolded state to the folded state, a target boundary that changes is the width of the initial interface. In this case, the processor may invoke the window manager, then create a ScaleAnimation function for the initial interface, and set a scale ratio of the width in the ScaleAnimation function to gradually change from 1.0 (M/M) to N/M, to compress the initial interface in a width direction, so that the initial interface gradually changes from the size adapted to the unfolded state to the size adapted to the folded state.

Example 2: As shown in FIG. 10A(a) to FIG. 10A(e), for example, the folding manner of the foldable display screen is left-right folding, and the display direction of the screen drawing area changes before and after the state switching of the foldable display screen.

In the unfolded state of the foldable display screen, a width of the screen drawing area is M, and a height is L, as shown in FIG. 10A(a). In the folded state of the foldable display screen, the screen drawing area is the second screen part on the right side, a width is L, and a height is N, as shown in FIG. 10A(d).

A size of the initial interface adapted to the unfolded state is the same as a size of the screen drawing area of the foldable display screen in the unfolded state, and is a default size of the initial interface, as shown in FIG. 10A(a). A size of the initial interface adapted to the folded state is the same as a size of the screen drawing area of the foldable display screen in the folded state, as shown in FIG. 10A(d).

When the electronic device determines that the foldable display screen enters a process of switching from the unfolded state to the folded state, the processor first changes the display direction of the screen drawing area by setting a position of the screen drawing area, and resets the initial interface, as shown in FIG. 10A(c). Compared with the initial interface shown in FIG. 10A(a), in this case, a scale ratio of a height of the reset initial interface is M/L, and a scale ratio of a width of the reset initial interface is L/M.

Then, as shown in FIG. 10A(c) and FIG. 10A(d), as the process in which the foldable display screen switches from the unfolded state to the folded state further progresses, a target boundary that changes is the height of the initial interface. In this case, the processor may invoke the window manager, then create a ScaleAnimation function for the initial interface, and set a scale ratio of the height in the ScaleAnimation function to gradually change from M/L to N/L (that is, (M/L)*(N/M)), to compress the initial interface in a height direction, so that the initial interface gradually changes from the size adapted to the unfolded state to the size adapted to the folded state.

Finally, when the state switching process of the foldable display screen ends, and the state of the foldable display screen is the folded state, a final scale ratio of the initial interface is L/M in a width direction, and N/L in the height direction. Subsequently, the user needs to rotate the electronic device, so as to view the interface, as shown in FIG. 10A(d) and FIG. 10A(e).

Figure 10B:
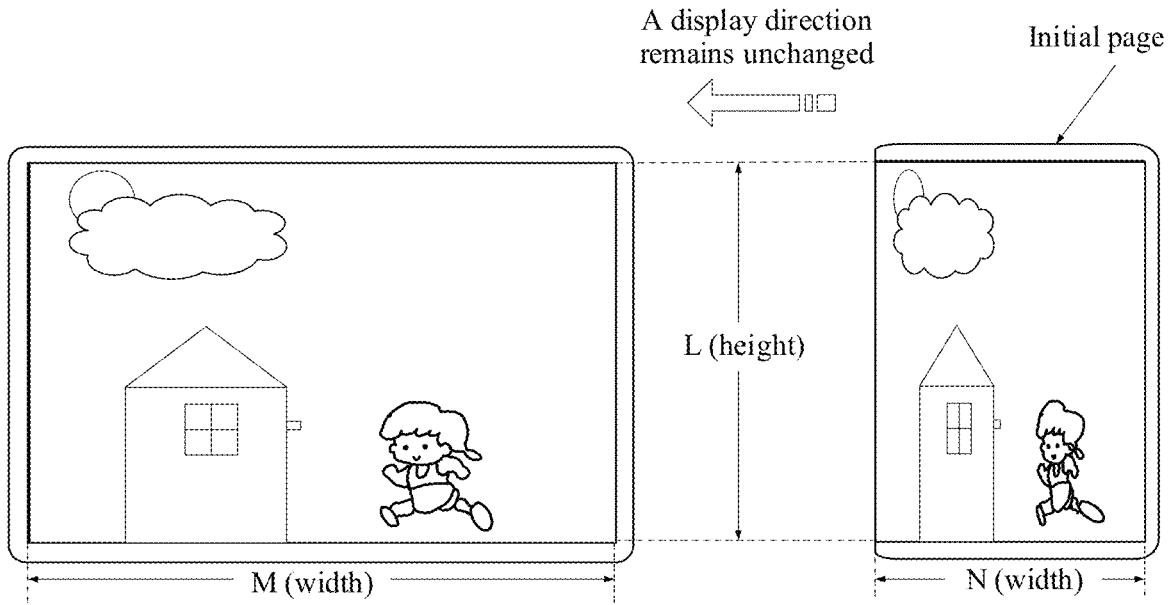
FIG. 10B(a) to FIG. 10B(e) are example diagrams of a dynamic change of an initial interface according to an embodiment of this application.
Figure 10B:
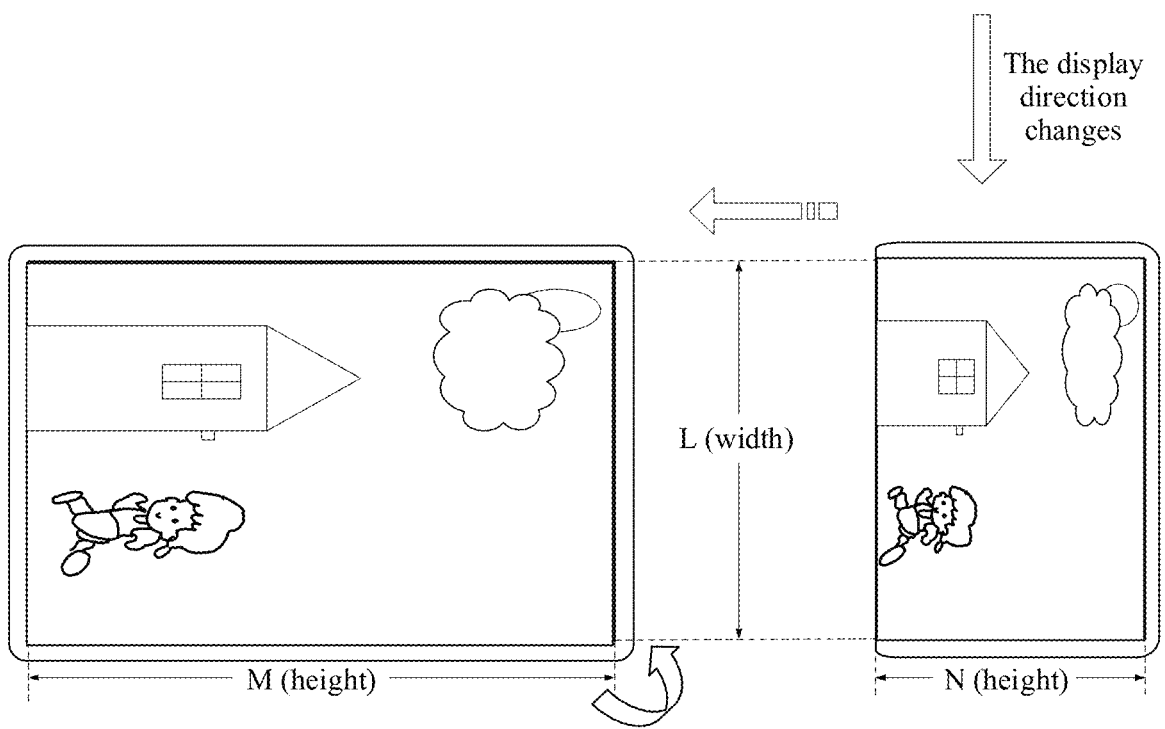
Figure 10B:
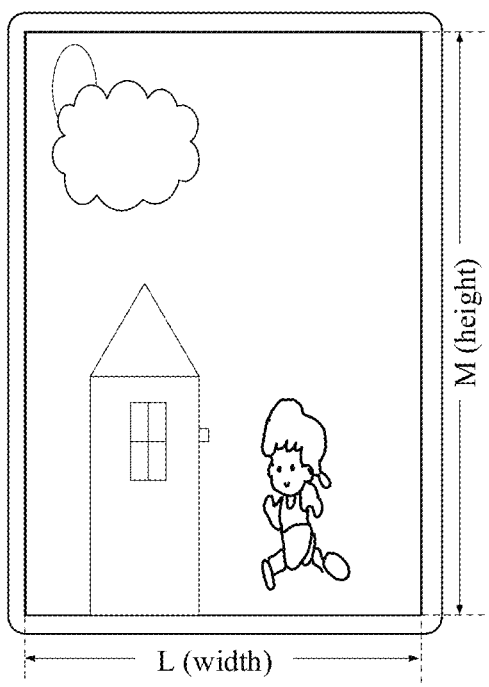

Example 3: As shown in FIG. 10B(a) to FIG. 10B(e), for example, the folding manner of the foldable display screen is left-right folding, and the display direction of the screen drawing area does not change before or after the state switching of the foldable display screen.

In the folded state of the foldable display screen, the screen drawing area is the second screen part on the right side of the foldable display screen, a width is N, and a height is L, as shown in FIG. 10B(a). In the unfolded state of the foldable display screen, the screen drawing area is the full screen, a width is M, and a height is still L, as shown in FIG. 10B(b).

A size of the initial interface adapted to the folded state is the same as a size of the screen drawing area of the foldable display screen in the folded state, and is a default size of the initial interface, as shown in FIG. 10B(a). A size of the initial interface adapted to the unfolded state is the same as a size of the screen drawing area of the foldable display screen in the unfolded state, as shown in FIG. 10B(b).

In this case, as shown in FIG. 10B(a) and FIG. 10B(b), when the foldable display screen switches from the folded state to the unfolded state, a target boundary that changes is the width of the initial interface. In this case, the processor may invoke the window manager, then create a ScaleAnimation function for the initial interface, and set a scale ratio of the width in the ScaleAnimation function to gradually change from 1.0 (N/N) to M/N, to stretch the initial interface in a width direction, so that the initial interface gradually changes from the size adapted to the folded state to the size adapted to the unfolded state.

Example 4: As shown in FIG. 10B(a) to FIG. 10B(e), for example, the folding manner of the foldable display screen is left-right folding, and the display direction of the screen drawing area changes before and after the state switching of the foldable display screen.

In the folded state of the foldable display screen, the screen drawing area is the second screen part on the right side of the foldable display screen, a width is N, and a height is L, as shown in FIG. 10B(a). In the unfolded state of the foldable display screen, the screen drawing area is the full screen, a width is L, and a height is M, as shown in FIG. 10B(d).

A size of the initial interface adapted to the folded state is the same as a size of the screen drawing area of the foldable display screen in the folded state, and is a default size of the initial interface, as shown in FIG. 10B(a). A size of the initial interface adapted to the unfolded state is the same as a size of the screen drawing area of the foldable display screen in the unfolded state, as shown in FIG. 10B(d).

When the electronic device determines that the foldable display screen enters a process of switching from the folded state to the unfolded state, the processor first changes the display direction of the screen drawing area by setting a position of the screen drawing area, and resets the initial interface, as shown in FIG. 10B(c). Compared with the initial interface shown in FIG. 10B(a), in this case, a scale ratio of a height of the reset initial interface is N/L, and a scale ratio of a width of the reset initial interface is L/N.

Then, as shown in FIG. 10B(c) and FIG. 10B(d), as the process in which the foldable display screen switches from the folded state to the unfolded state further progresses, a target boundary that changes is the height of the initial interface. In this case, the processor may invoke the window manager, then create a ScaleAnimation function for the initial interface, and set a scale ratio of the height in the ScaleAnimation function to gradually change from N/L to M/L (that is, (N/L)*(M/N)), to stretch the initial interface in a height direction, so that the initial interface gradually changes from the size adapted to the folded state to the size adapted to the unfolded state.

Finally, when the state switching process of the foldable display screen ends, and the state of the foldable display screen is the unfolded state, a final scale ratio of the initial interface is L/N in a width direction, and M/L in the height direction. Subsequently, the user needs to rotate the electronic device, so as to view the interface, as shown in FIG. 10B(d) and FIG. 10B(e).

Example 5: As shown in FIG. FIG. 10C(a) to FIG. 10C(e), for example, the folding manner of the foldable display screen is left-right folding, and the display direction of the screen drawing area does not change before or after the state switching of the foldable display screen. A default size of the target interface is the size adapted to the second state (the state after the state switching).

Figure 10C:
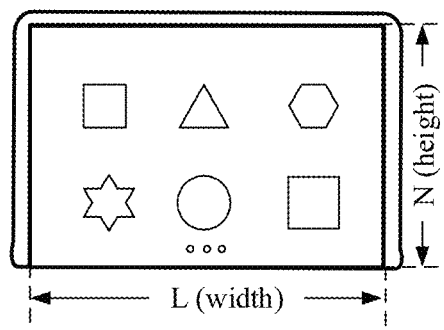
FIG. 10C(a) to FIG. 10C(e) are example diagrams of a dynamic change of a target interface according to an embodiment of this application.

In the unfolded state of the foldable display screen, a width of the screen drawing area is M, and a height is L, as shown in FIG. 10C(a). In the folded state of the foldable display screen, the screen drawing area is the second screen part on the right side, a width is N, and a height is still L, as shown in FIG. 10C(b).

A size of the target interface adapted to the unfolded state is the same as a size of the screen drawing area of the foldable display screen in the unfolded state, as shown in FIG. 10C(a). A size of the target interface adapted to the folded state is the same as a size of the screen drawing area of the foldable display screen in the folded state, and is the default size of the target interface, as shown in FIG. 10C(b).

When the processor determines that the foldable display screen enters a process of switching from the unfolded state to the folded state, after obtaining the target interface of the default size, the processor first adjusts the target interface of the default size to the size adapted to the unfolded state, and then displays the target interface on the foldable display screen, as shown in FIG. 10C(a). In this case, a scale ratio of the width of the target interface is M/N.

Then, as shown in FIG. 10C(a) and FIG. 10C(b), as the process in which the foldable display screen switches from the unfolded state to the folded state further progresses, a target boundary that changes is the width of the target interface. In this case, the processor may invoke the window manager, then create a ScaleAnimation function for the target interface, and set a scale ratio of the width in the ScaleAnimation function to gradually change from M/N to 1.0 (that is, N/N), to compress the target interface in a width direction, so that the target interface gradually changes from the size adapted to the unfolded state to the size adapted to the folded state.

Example 6: As shown in FIG. 10C(a) to FIG. 10C(e), for example, the folding manner of the foldable display screen is left-right folding, and the display direction of the screen drawing area changes before and after the state switching of the foldable display screen. A default size of the target interface is the size adapted to the second state (the state after the state switching).

In the unfolded state of the foldable display screen, a width of the screen drawing area is M, and a height is L, as shown in FIG. 10C(a). In the folded state of the foldable display screen, the screen drawing area is the second screen part on the right side, a width is L, and a height is N, as shown in FIG. 10C(d).

A size of the target interface adapted to the unfolded state is the same as a size of the screen drawing area of the foldable display screen in the unfolded state, as shown in FIG. 10C(a). A size of the target interface adapted to the folded state is the same as a size of the screen drawing area of the foldable display screen in the folded state, and is the default size of the target interface, as shown in FIG. 10C(d).

When the processor determines that the foldable display screen enters a process of switching from the unfolded state to the folded state, the processor obtains the target interface of the default size, adjusts the target interface of the default size to the size adapted to the unfolded state, and then displays the target interface on the foldable display screen, as shown in FIG. 10C(a). In this case, a scale ratio of the width of the target interface is M/L, and a scale ratio of the height is L/N. Then, the processor changes the display direction of the screen drawing area by setting a position of the screen drawing area, and resets the target interface, as shown in FIG. 10C(c). Compared with the target interface shown in FIG. 10C(a), in this case, a scale ratio of a height of the reset target interface is M/N (that is, (L/N)*(M/L)), and a scale ratio of a width is 1.0 (that is, (M/L)*(L/M)).

Further, as shown in FIG. 10C(c) and FIG. 10C(d), as the process in which the foldable display screen switches from the unfolded state to the folded state further progresses, a target boundary that changes is the height of the target interface. In this case, the processor may invoke the window manager, then create a ScaleAnimation function for the target interface, and set a scale ratio of the height in the ScaleAnimation function to gradually change from M/N to 1.0 (that is, (M/N)*(N/M)), to compress the target interface in a height direction, so that the target interface gradually changes from the size adapted to the unfolded state to the size adapted to the folded state.

Finally, when the state switching process of the foldable display screen ends, and the state of the foldable display screen is the folded state, a final scale ratio of the target interface is 1.0 in a width direction, and 1.0 in the height direction (that is, the target interface is finally adjusted to the default size). Subsequently, the user needs to rotate the electronic device, so as to view the interface, as shown in FIG. 10C(d) and FIG. 10C(e).

Figure 10D:
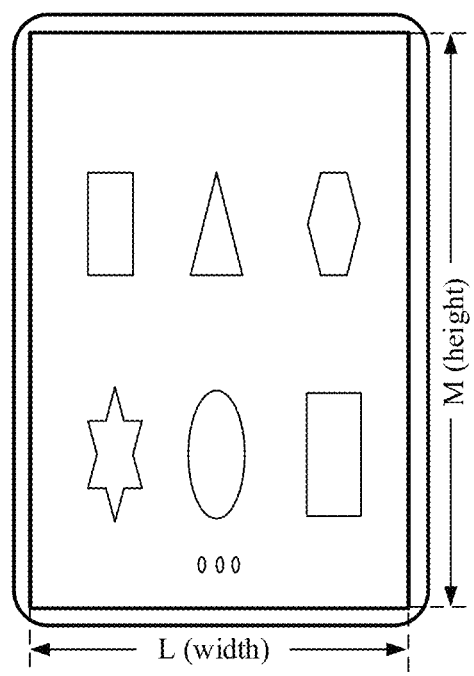
FIG. 10D(a) to FIG. 10D(e) are example diagrams of a dynamic change of a target interface according to an embodiment of this application.

Example 7: As shown in FIG. 10D(a) to FIG. 10D(e), for example, the folding manner of the foldable display screen is left-right folding, and the display direction of the screen drawing area does not change before or after the state switching of the foldable display screen. A default size of the target interface is the size adapted to the second state (the state after the state switching).

In the folded state of the foldable display screen, the screen drawing area is the second screen part on the right side of the foldable display screen, a width is N, and a height is L, as shown in FIG. 10D(a). In the unfolded state of the foldable display screen, the screen drawing area is the full screen, a width is M, and a height is still L, as shown in FIG. 10D(b).

A size of the target interface adapted to the folded state is the same as a size of the screen drawing area of the foldable display screen in the folded state, as shown in FIG. 10D(a). A size of the target interface adapted to the unfolded state is the same as a size of the screen drawing area of the foldable display screen in the unfolded state, and is the default size of the target interface, as shown in FIG. 10D(b).

When the processor determines that the foldable display screen enters a process of switching from the folded state to the unfolded state, after obtaining the target interface of the default size, the processor first adjusts the target interface of the default size to the size adapted to the folded state, and then displays the target interface on the foldable display screen, as shown in FIG. 10D(a). In this case, a scale ratio of the width of the target interface is N/M.

In this case, as shown in FIG. 10D(a) and FIG. 10D(b), when the foldable display screen switches from the folded state to the unfolded state, a target boundary that changes is the width of the target interface. In this case, the processor may invoke the window manager, then create a ScaleAnimation function for the target interface, and set a scale ratio of the width in the ScaleAnimation function to gradually change from N/M to 1.0 (that is, (N/M)*(M/N)), to stretch the target interface in a width direction, so that the target interface gradually changes from the size adapted to the folded state to the size adapted to the unfolded state.

Example 8: As shown in FIG. 10D(a) to FIG. 10D(e), for example, the folding manner of the foldable display screen is left-right folding, and the display direction of the screen drawing area changes before and after the state switching of the foldable display screen. A default size of the target interface is the size adapted to the second state (the state after the state switching).

In the folded state of the foldable display screen, the screen drawing area is the second screen part on the right side of the foldable display screen, a width is N, and a height is L, as shown in FIG. 10D(a). In the unfolded state of the foldable display screen, the screen drawing area is the full screen, a width is L, and a height is M, as shown in FIG. 10D(d).

A size of the target interface adapted to the folded state is the same as a size of the screen drawing area of the foldable display screen in the folded state, as shown in FIG. 10D(a). A size of the target interface adapted to the unfolded state is the same as a size of the screen drawing area of the foldable display screen in the unfolded state, and is the default size of the target interface, as shown in FIG. 10D(d).

When the processor determines that the foldable display screen enters a process of switching from the folded state to the unfolded state, the processor obtains the target interface of the default size, adjusts the target interface of the default size to the size adapted to the folded state, and then displays the target interface on the foldable display screen, as shown in FIG. 10D(a). In this case, a scale ratio of the width of the target interface is N/L, and a scale ratio of the height is L/M. Then, the processor changes the display direction of the screen drawing area by setting a position of the screen drawing area, and resets the target interface, as shown in FIG. 10D(c). Compared with the target interface shown in FIG. 10D(a), in this case, a scale ratio of a height of the reset target interface is N/M (that is, (L/M)*(N/L)), and a scale ratio of a width is 1.0 (that is, (N/L)*(L/N)).

Further, as shown in FIG. 10D(c) and FIG. 10D(d), as the process in which the foldable display screen switches from the folded state to the unfolded state further progresses, a target boundary that changes is the height of the target interface. In this case, the processor may invoke the window manager, then create a ScaleAnimation function for the target interface, and set a scale ratio of the height in the ScaleAnimation function to gradually change from N/M to 1.0 (that is, (N/M)*(M/N)), to stretch the target interface in a height direction, so that the target interface gradually changes from the size adapted to the folded state to the size adapted to the unfolded state.

Finally, when the state switching process of the foldable display screen ends, and the state of the foldable display screen is the unfolded state, a final scale ratio of the target interface is 1.0 in a width direction, and 1.0 in the height direction (that is, the target interface is finally adjusted to the default size). Subsequently, the user needs to rotate the electronic device, so as to view the interface, as shown in FIG. 10D(d) and FIG. 10D(e).

When the size change manner of the target interface is gradually changing from the preset interface size to the size adapted to the second state, the processor may adjust the display ratio of the target interface by performing the following step: displaying the target interface whose size changes on the foldable display screen based on a display ratio that gradually changes from a third ratio to a fourth ratio. The third ratio is a ratio between the preset interface size and the default size of the target interface, and the fourth ratio is a ratio between the size adapted to the second state and the default size of the target interface.

When the size change manner of the initial interface is gradually shrinking from the size adapted to the first state to disappearing, the processor may adjust the display ratio of the initial interface by performing the following step: displaying the initial interface whose size changes on the foldable display screen based on a display ratio that gradually changes from a fifth ratio to 0. The fifth ratio is a ratio between the size adapted to the first state and the default size of the initial interface.

In the state switching process, when the dynamic change of the target interface further includes the transparency change from transparent to opaque, the processor may invoke the window manager, then create a transparency animation function AlphaAnimation for the target interface, then adjust a transparency variable in the transparency animation function to change from 0.0 to 1.0, and display the target interface based on the adjusted transparency variable, so that the target interface gradually changes from transparent to opaque.

Similarly, in the state switching process, when the dynamic change of the initial interface includes the transparency change from opaque to transparent, the processor may invoke the window manager, then create a transparency animation function AlphaAnimation for the initial interface, then adjust a transparency variable in the transparency animation function to change from 0.0 to 1.0, and display the initial interface based on the adjusted transparency variable, so that the initial interface gradually changes from opaque to transparent.

In the state switching process, when the dynamic change of the initial interface/target interface includes another change such as the color change or the shape change, the processor may invoke the window manager, then create a corresponding animation function for the initial interface/target interface, and adjust a value of a variable in the animation function, so that the initial interface/target interface generates the another change such as the color change or the shape change.

It should be noted that, in a scenario in which both the target interface and the initial interface are displayed by drawing on surfaces included in the screen drawing area, the target interface and the initial interface are respectively displayed on different surfaces of the screen drawing area. For example, as shown in FIG. 3C and FIG. 3D, the initial interface is displayed on the surface 1 and the target interface is displayed on the surface 2. From the description of the display principle of the screen drawing area, it is learned that an interface finally displayed in the screen drawing area is essentially a comprehensive interface in which interfaces displayed on surfaces included in the screen drawing area are superposed. In addition, when the initial interface on the surface 1 is opaque, an interface finally displayed in the screen drawing area is the initial interface, that is, the user can view only the initial interface and cannot view the target interface. The target interface can be displayed in the screen drawing area only when transparency of the initial interface on the surface 1 changes. In this case, a visual effect of the user is superposition of the initial interface and the target interface.

The following describes, by using an example, a visual effect of superposing the initial interface and the target interface in the state switching process of the foldable display screen.

Figure 11A:
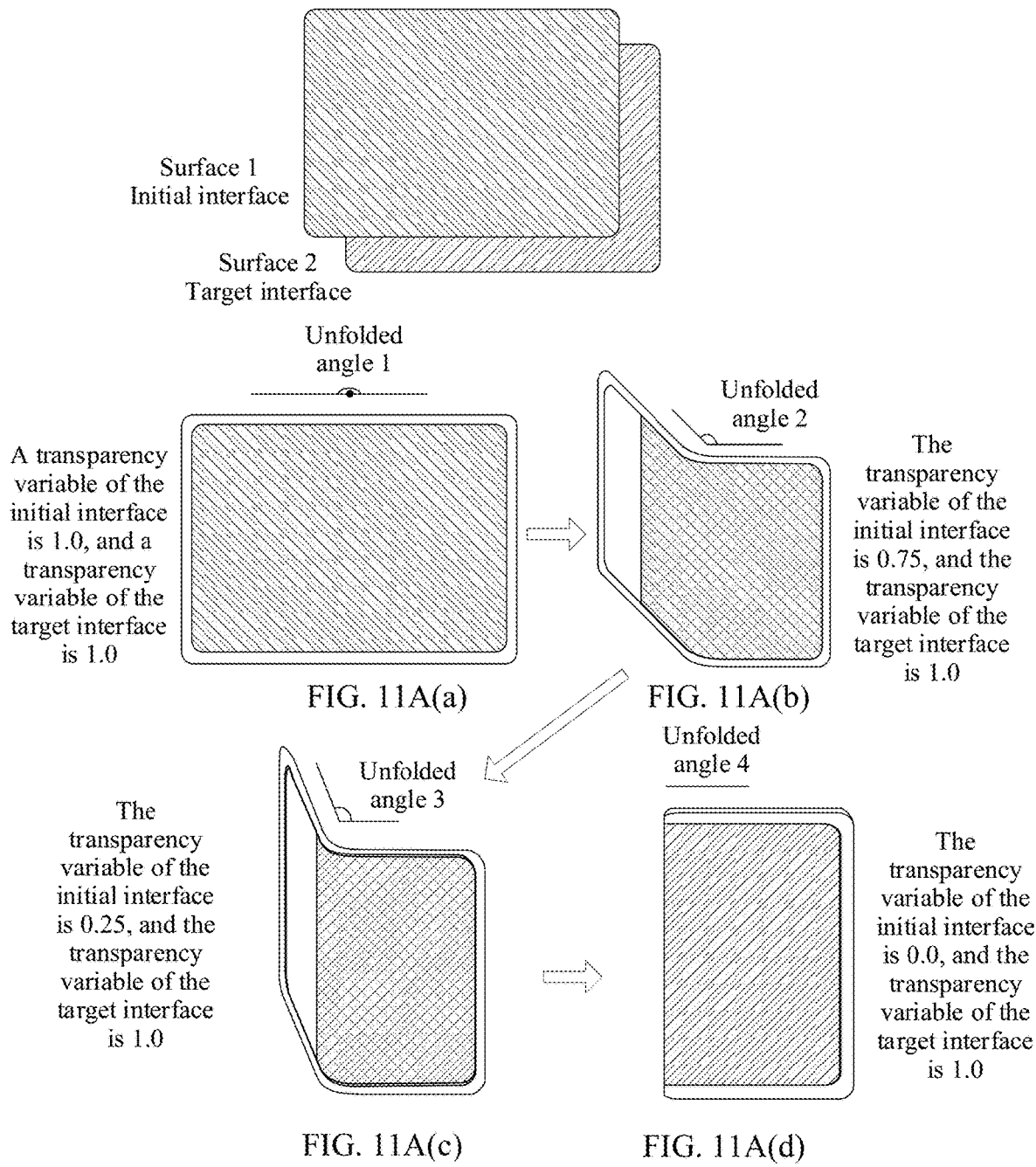
FIG. 11A(a) to FIG. 11A(d) are example diagrams of a display effect according to an embodiment of this application.

Referring to FIG. 11A, in a state switching process in which the foldable display screen switches from the unfolded state to the folded state, both the target interface displayed on the surface 2 in the screen drawing area and the initial interface displayed on the surface 1 gradually change from the size adapted to the unfolded state to the size adapted to the folded state. In addition, in the state switching process, as the unfolded angle decreases, the transparency variable of the initial interface gradually decreases, and the initial interface gradually changes to transparent from opaque. After the state of the foldable display screen is the folded state, the initial interface is no longer visible, and the user can view only the clear target interface.

Referring to FIG. 11B, in a state switching process in which the foldable display screen switches from the unfolded state to the folded state, both the target interface displayed on the surface 2 in the screen drawing area and the initial interface displayed on the surface 1 gradually change from the size adapted to the unfolded state to the size adapted to the folded state. In addition, in the state switching process, as the unfolded angle decreases, the transparency variable of the initial interface gradually decreases, and the initial interface gradually changes to transparent from opaque. At the same time, the transparency variable of the target interface gradually increases, and the target interface gradually changes to opaque from transparent. Finally, after the state of the foldable display screen is the folded state, the initial interface is no longer visible, and the user can view only the clear target interface.

It should be noted that, in other embodiments, alternatively, the target interface may be displayed on the surface 1, and the initial interface may be displayed on the surface 2. The interface transparency may be adjusted based on a requirement. Details are not described in this application.

In the foregoing embodiments of this application, the target interface may be an image, or may be a window. The initial interface may be an image or a window. This is not limited in this application. The specific implementations provided in the foregoing embodiments of this application are merely examples. Especially, for some presentation effects, persons of ordinary skill in the art can easily adjust the implementations to achieve a same or similar effect. Such adjustment shall also fall within the protection scope of this application.

To ensure that an interface displayed to the user by the foldable display screen when the state switching process starts does not change abruptly, when determining that the foldable display screen enters the process of switching from the first state to the second state, the processor generates a screenshot of a last interface (initial interface) displayed on the foldable display screen in the first state, and then performs the dynamic change by using the screenshot. That is, in the foregoing embodiments, the electronic device may display the initial interface that dynamically changes to the user by displaying the initial interface screenshot that dynamically changes, to implement a smooth transition of interface switching in the state switching process of the foldable display screen.

In addition, when the target interface is a window, the processor may present the target interface that dynamically changes to the user by displaying a window with a size change (and another change such as a transparency change). The window may display a plurality of types of content such as an icon, a picture, and a text. In a process in which the processor controls the window to dynamically change, the content displayed in the window also needs to change synchronously.

Figure 12:
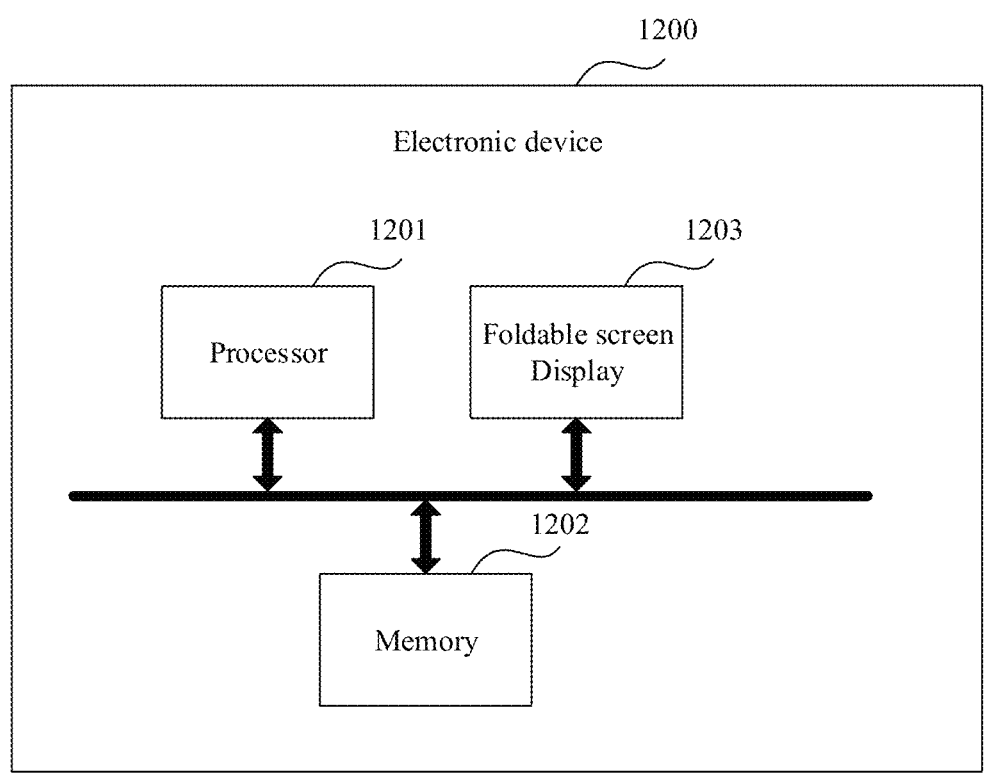
FIG. 12 is a diagram of a structure of an electronic device according to an embodiment of this application.

Based on a same technical concept, this application further provides an electronic device. The electronic device is configured to implement the display method provided in the foregoing embodiments. Referring to FIG. 12, the electronic device includes a processor 1201, a memory 1202, and a foldable display screen 1203.

The processor 1201 is interconnected to another component. Optionally, the processor 1201 may be interconnected to the another component by using a bus. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

The foldable display screen 1203 is configured to display an interface, and may include at least one display screen.

The processor 1201 is configured to implement the display method provided in the foregoing embodiments. For details, refer to the description in the foregoing embodiments. Details are not described herein again.

In some implementations, the terminal device 1200 may further include a camera, various sensors, a transceiver, and the like. The transceiver is configured to receive and send data. For example, the transceiver may be the mobile communication module 150 and/or the wireless communication module 160 in the electronic device shown in FIG. 5.

The memory 1202 is configured to store a computer program, data, and the like. Specifically, the computer program may include program code, and the program code includes instructions for computer operations. The memory 1202 may include a random access memory (RAM), or may include a nonvolatile memory, for example, at least one magnetic disk memory. The processor 1201 executes program instructions stored in the memory 1202, and implements the foregoing functions by using the foregoing components, to finally implement the display method provided in the foregoing embodiments.

Based on the foregoing embodiments, an embodiment of this application further provides a computer program. When the computer program is run on a computer, the computer is enabled to perform the display method provided in the foregoing embodiments.

Based on the foregoing embodiments, an embodiment of this application further provides a computer storage medium. The computer storage medium stores a computer program. When the computer program is executed by a computer, the computer is enabled to perform the display method provided in the foregoing embodiments.

Based on the foregoing embodiments, an embodiment of this application further provides a chip. The chip is configured to read a computer program stored in a memory, to implement the display method provided in the foregoing embodiments.

Based on the foregoing embodiments, an embodiment of this application provides a chip system. The chip system includes a processor, configured to support functions related to the electronic device in the foregoing embodiments. In a possible design, the chip system further includes a memory, and the memory is configured to store a program and data that are necessary for the computer apparatus. The chip system may be constituted by a chip, or may include a chip and another discrete device.

Based on the foregoing embodiments, an embodiment of this application further provides a graphical user interface on an electronic device. The electronic device has a foldable display screen, a memory, and a processor, the processor is configured to execute a computer program stored in the memory, and the graphical user interface includes a graphical user interface displayed when the electronic device performs the display method provided in the foregoing embodiments.

In conclusion, this application provides a display method and an electronic device. In a state switching process of a foldable display screen of the electronic device, the electronic device may display a target interface whose size changes on the foldable display screen. In this way, according to the solution, a smooth transition of interface switching in the state switching process of the foldable display screen can be achieved, so that a visual effect in which a size change of the target interface coincides with an actual state switching process of the foldable display screen is implemented, thereby improving visual experience of a user.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including, but not limited to, a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In addition, it should be understood that, in the descriptions of this application, the terms such as "first" and "second" are only used for the purpose of distinguishing and description, but cannot be understood as an indication or implication of relative importance, and cannot be understood as an indication or implication of a sequence.

Terms used in the following embodiments are merely intended to describe particular embodiments, but are not intended to limit this application. As used in the specification and appended claims of this application, words "a", "an", "the", "above", "this", and "this one" of singular forms are intended to also include plural forms, for example, "one or more", unless otherwise clearly specified in the context. It should be further understood that, in the embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "an embodiment", "some embodiments", or the like described in this specification means that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A display method applied to an electronic device equipped with a foldable display screen, the method comprising:
   displaying a target interface whose size changes on the foldable display screen in a process in which the foldable display screen switches from a first state to a second state,
   wherein based on the first state being an unfolded state, the second state is a folded state,
   wherein based on the first state being the folded state, the second state is the unfolded state,
   wherein the target interface is a first interface that needs to be displayed after the foldable display screen switches to the second state, and
   wherein the target interface gradually changes from a color to a default color.

2. The method according to claim 1, wherein displaying the target interface whose size changes on the foldable display screen comprises the target interface gradually changing from transparent to opaque.

3. The method according to claim 1, wherein in the process of the foldable display screen switching from the first state to the second state, the method further comprises:
   displaying an initial interface that dynamically changes on the foldable display screen, wherein the initial interface is a last interface displayed in the first state before state switching of the foldable display screen.

4. The method according to claim 3, wherein the dynamic change comprises a size change, and/or a change from opaque to transparent.

5. The method according to claim 3, wherein a time of displaying the initial interface that dynamically changes overlaps a time of displaying the target interface whose size changes.

6. The method according to claim 1, wherein the size change comprises gradually changing from a size adapted to the first state to a size adapted to the second state.

7. The method according to claim 1, wherein displaying the target interface whose size changes on the foldable display screen comprises:
 displaying the target interface whose size changes on the foldable display screen based on a display ratio that gradually changes from a first ratio to a second ratio,
  wherein the first ratio is a ratio between the size adapted to the first state and a default size of the target interface, and
  wherein the second proportion is a ratio between the size adapted to the second state and the default size of the target interface.

8. The method according to claim 1, wherein the target interface is displayed on a surface of the foldable display screen, and displaying the target interface whose size changes on the foldable display screen comprises:
 adjusting a size of the surface on which the target interface is displayed; or
 adjusting the size of the target interface, and displaying the target interface whose size changes on the surface.

9. An electronic device comprising a foldable display screen and a processor,
 wherein the foldable display screen is configured to display an interface,
 wherein the processor is configured to cooperate with the foldable display screen to display a target interface whose size changes on the foldable display screen in a process of the foldable display screen switching from a first state to a second state,
 wherein based on the first state being an unfolded state, the second state is a folded state,
 wherein based on the first state being the folded state, the second state is the unfolded state,
 wherein the target interface is a first interface that needs to be displayed after the foldable display screen switches to the second state, and
 wherein the target interface gradually changes from a color to a default color.

10. The electronic device according to claim 9, wherein in the process of displaying the target interface whose size changes on the foldable display screen, the processor is configured to cause the target interface to gradually change from transparent to opaque.

11. The electronic device according to claim 9, wherein the processor is further configured to:
 display an initial interface that dynamically changes on the foldable display screen in the process of the foldable display screen switching from the first state to the second state,
  wherein the initial interface is a last interface displayed in the first state before state switching of the foldable display screen.

12. The electronic device according to claim 11, wherein the dynamic change comprises a size change, and/or a change from opaque to transparent.

13. The electronic device according to claim 11, wherein a time of displaying the initial interface that dynamically changes overlaps a time of displaying the target interface whose size changes.

14. The electronic device according to claim 9, wherein the size change comprises gradually changing from a size adapted to the first state to a size adapted to the second state.

15. The electronic device according to claim 9, wherein for the process of displaying the target interface whose size changes on the foldable display screen, the processor is further configured to:
 display the target interface whose size changes on the foldable display screen based on a display ratio that gradually changes from a first ratio to a second ratio,
  wherein the first ratio is a ratio between the size adapted to the first state and a default size of the target interface, and
  wherein the second proportion is a ratio between the size adapted to the second state and the default size of the target interface.

16. The electronic device according to claim 9, wherein the target interface is displayed on a surface of the foldable display screen, and in the process of the target interface whose size changes on the foldable display screen, the processor is further configured to:
 adjust a size of the surface on which the target interface is displayed; or
 adjust the size of the target interface, and display the target interface whose size changes on the surface.

17. An electronic device comprising a foldable display screen, a processor, and a memory, wherein the memory stores a computer program comprising instructions that, when executed by the processor, and cause the electronic device to perform a method including:
 displaying a target interface whose size changes on the foldable display screen in a process in which the foldable display screen switches from a first state to a second state,
  wherein based on the first state being an unfolded state, the second state is a folded state,
  wherein based on the first state being the folded state, the second state is the unfolded state,
  wherein the target interface is a first interface that needs to be displayed after the foldable display screen switches to the second state, and
  wherein the target interface gradually changes from a color to a default color.

18. The electronic device according to claim 17, wherein the target interface gradually changes from transparent to opaque.

19. The electronic device according to claim 17, wherein for the process of the foldable display screen switching from the first state to the second state, the method further comprises:
 displaying an initial interface that dynamically changes on the foldable display screen, wherein the initial interface is a last interface displayed in the first state before state switching of the foldable display screen.

20. The electronic device according to claim 19, wherein the dynamic change comprises a size change, and/or a change from opaque to transparent.

* * * * *